US012573237B1

(12) United States Patent
Lan et al.

(10) Patent No.: US 12,573,237 B1
(45) Date of Patent: Mar. 10, 2026

(54) DETECTING EVENTS BY ACTORS USING DYNAMICALLY CROPPED IMAGES

(71) Applicant: Amazon Technologies, Inc., Seattle, WA (US)

(72) Inventors: Tian Lan, Seattle, WA (US); Hui Liang, Issaquah, WA (US); Samuel Nathan Hallman, Marina del Rey, CA (US); Vijaya Naga Jyoth Sumanth Chennupati, Bothell, WA (US); Chuhang Zou, Seattle, WA (US); Hao Pan, Seattle, WA (US); Suyu Sang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 18/344,519

(22) Filed: Jun. 29, 2023

(51) Int. Cl.
    *G06V 40/20*        (2022.01)
    *G06T 7/10*         (2017.01)
    (Continued)

(52) U.S. Cl.
    CPC ............... *G06V 40/28* (2022.01); *G06T 7/10* (2017.01); *G06T 7/20* (2013.01); *G06T 7/70* (2017.01);
    (Continued)

(58) Field of Classification Search
    CPC .. G06V 40/28; G06T 7/10; G06T 7/20; G06T 7/70; G06T 2207/20132; G06T 2207/30196
    See application file for complete search history.

(56) References Cited

U.S. PATENT DOCUMENTS

| | | | |
|---|---|---|---|
| 6,154,559 | A | 11/2000 | Beardsley |
| 7,050,624 | B2 | 5/2006 | Dialameh et al. |

(Continued)

FOREIGN PATENT DOCUMENTS

| | | |
|---|---|---|
| CN | 104778690 B | 6/2017 |
| CN | 111626681 A | 9/2020 |

(Continued)

OTHER PUBLICATIONS

Zhang, Z., "A Flexible New Technique for Camera Calibration," Technical Report MSR-TR-98-71, Dec. 2, 1998, Microsoft Research, Microsoft Corporation, URL: https://www.microsoft.com/en-us/research/wp-content/uploads/2016/02/tr98-71.pdf, 22 pages.

(Continued)

*Primary Examiner* — Bobbak Safaipour
(74) *Attorney, Agent, or Firm* — Athorus, PLLC

(57) ABSTRACT

Systems within materials handling facilities or retail establishments are programmed to receive images from cameras, process clips of the images to generate sets of features representing product spaces and actors depicted within such images, and to classify the clips as depicting or not depicting a shopping event. The images are dynamically cropped to reduce amounts of data that must be processed to in order to determine whether the images depict shopping events. The images are cropped by calculating a center point based on positions of points on product spaces and detected overlaps of hands and the product spaces. Features of clips determined to depict a shopping event are combined into a sequence and transferred, along with classifications of such clips, to a multi-camera system that generates a shopping hypothesis based on such features.

20 Claims, 29 Drawing Sheets

CROPPING WINDOW DEFINED WITH RESPECT TO CROP CENTER IDENTIFIED
BASED ON SCORES AND FRONT POINTS

(51) Int. Cl.
    *G06T 7/20*         (2017.01)
    *G06T 7/70*         (2017.01)
(52) U.S. Cl.
    CPC .............. *G06T 2207/20132* (2013.01); *G06T 2207/30196* (2013.01)

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,863 B1 | 8/2011 | Sharma et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,285,060 B2 | 10/2012 | Cobb et al. | |
| 8,369,622 B1 | 2/2013 | Hsu et al. | |
| 8,423,431 B1 | 4/2013 | Rouaix et al. | |
| RE44,225 E | 5/2013 | Aviv | |
| 8,577,705 B1 | 11/2013 | Baboo et al. | |
| 8,630,924 B2 | 1/2014 | Groenevelt et al. | |
| 8,688,598 B1 | 4/2014 | Shakes et al. | |
| 8,943,441 B1 | 1/2015 | Patrick et al. | |
| 9,158,974 B1 | 10/2015 | Laska et al. | |
| 9,160,979 B1 | 10/2015 | Ulmer | |
| 9,208,675 B2 | 12/2015 | Xu et al. | |
| 9,336,456 B2 | 5/2016 | Delean | |
| 9,449,233 B2 | 9/2016 | Taylor | |
| 9,473,747 B2 | 10/2016 | Kobres et al. | |
| 9,536,177 B2 | 1/2017 | Chalasani et al. | |
| 9,582,891 B2 | 2/2017 | Geiger et al. | |
| 9,727,838 B2 | 8/2017 | Campbell | |
| 9,846,840 B1 | 12/2017 | Lin et al. | |
| 9,881,221 B2 | 1/2018 | Bala et al. | |
| 9,898,677 B1 | 2/2018 | Anjelković et al. | |
| 9,911,290 B1 | 3/2018 | Zalewski et al. | |
| 10,055,853 B1 | 8/2018 | Fisher et al. | |
| 10,133,933 B1 | 11/2018 | Fisher et al. | |
| 10,147,210 B1 | 12/2018 | Desai et al. | |
| 10,192,415 B2 | 1/2019 | Heitz et al. | |
| 10,318,917 B1 | 6/2019 | Goldstein et al. | |
| 10,354,262 B1 | 7/2019 | Hershey et al. | |
| 10,438,164 B1 | 10/2019 | Xiong et al. | |
| 10,474,992 B2 | 11/2019 | Fisher et al. | |
| 10,510,219 B1 | 12/2019 | Zalewski et al. | |
| 10,535,146 B1 | 1/2020 | Buibas et al. | |
| 10,635,844 B1 | 4/2020 | Roose et al. | |
| 10,699,421 B1 | 6/2020 | Cherevatsky et al. | |
| 10,839,203 B1 | 11/2020 | Guigues et al. | |
| 11,030,442 B1 * | 6/2021 | Bergamo | G06F 18/214 |
| 11,087,273 B1 | 8/2021 | Bergamo | |
| 11,195,146 B2 | 12/2021 | Fisher et al. | |
| 11,232,294 B1 | 1/2022 | Banerjee et al. | |
| 11,270,260 B2 | 3/2022 | Fisher et al. | |
| 11,284,041 B1 * | 3/2022 | Bergamo | G06T 7/251 |
| 11,367,083 B1 | 6/2022 | Saurabh et al. | |
| 11,468,681 B1 * | 10/2022 | Kumar | G06V 40/10 |
| 11,468,698 B1 | 10/2022 | Kim et al. | |
| 11,482,045 B1 | 10/2022 | Kim et al. | |
| 11,538,186 B2 | 12/2022 | Fisher et al. | |
| 11,734,949 B1 | 8/2023 | Kviatkovsky et al. | |
| 12,131,539 B1 * | 10/2024 | Broaddus | G06V 10/82 |
| 12,283,201 B2 | 4/2025 | Adato et al. | |
| 2003/0002712 A1 | 1/2003 | Steenburgh et al. | |
| 2003/0002717 A1 | 1/2003 | Hamid | |
| 2003/0107649 A1 | 6/2003 | Flickner et al. | |
| 2003/0128337 A1 | 7/2003 | Jaynes et al. | |
| 2004/0181467 A1 | 9/2004 | Raiyani et al. | |
| 2005/0251347 A1 | 11/2005 | Perona et al. | |
| 2006/0018516 A1 | 1/2006 | Masoud et al. | |
| 2006/0061583 A1 | 3/2006 | Spooner et al. | |
| 2006/0222206 A1 | 10/2006 | Garoutte | |
| 2007/0092133 A1 | 4/2007 | Luo | |
| 2007/0156625 A1 | 7/2007 | Visel | |
| 2007/0182818 A1 | 8/2007 | Buehler | |
| 2007/0242066 A1 | 10/2007 | Rosenthal | |

| | | |
|---|---|---|
| 2007/0276776 A1 | 11/2007 | Sagher et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2008/0137989 A1 | 6/2008 | Ng et al. |
| 2008/0159634 A1 | 7/2008 | Sharma et al. |
| 2008/0166019 A1 | 7/2008 | Lee |
| 2008/0193010 A1 | 8/2008 | Eaton et al. |
| 2008/0195315 A1 | 8/2008 | Hu et al. |
| 2009/0060352 A1 | 3/2009 | Distante et al. |
| 2009/0083815 A1 | 3/2009 | McMaster et al. |
| 2009/0121017 A1 | 5/2009 | Cato et al. |
| 2009/0132371 A1 | 5/2009 | Strietzel et al. |
| 2009/0210367 A1 | 8/2009 | Armstrong et al. |
| 2009/0245573 A1 | 10/2009 | Saptharishi et al. |
| 2009/0276705 A1 | 11/2009 | Ozdemir et al. |
| 2010/0002082 A1 | 1/2010 | Buehler et al. |
| 2010/0033574 A1 | 2/2010 | Ran et al. |
| 2011/0011936 A1 | 1/2011 | Morandi et al. |
| 2011/0205022 A1 | 8/2011 | Cavallaro et al. |
| 2012/0106800 A1 | 5/2012 | Khan et al. |
| 2012/0148103 A1 | 6/2012 | Hampel et al. |
| 2012/0159290 A1 | 6/2012 | Pulsipher et al. |
| 2012/0257789 A1 | 10/2012 | Lee et al. |
| 2012/0284132 A1 | 11/2012 | Kim et al. |
| 2012/0327220 A1 | 12/2012 | Ma |
| 2013/0076898 A1 | 3/2013 | Philippe et al. |
| 2013/0095961 A1 | 4/2013 | Marty et al. |
| 2013/0156260 A1 | 6/2013 | Craig |
| 2013/0253700 A1 | 9/2013 | Carson et al. |
| 2013/0322767 A1 | 12/2013 | Chao et al. |
| 2014/0139633 A1 | 5/2014 | Wang et al. |
| 2014/0139655 A1 | 5/2014 | Mimar |
| 2014/0259056 A1 | 9/2014 | Grusd |
| 2014/0279294 A1 | 9/2014 | Field-Darragh et al. |
| 2014/0282162 A1 | 9/2014 | Fein et al. |
| 2014/0334675 A1 | 11/2014 | Chu et al. |
| 2014/0362195 A1 | 12/2014 | Ng-Thow-Hing et al. |
| 2014/0362223 A1 | 12/2014 | LaCroix et al. |
| 2014/0379296 A1 | 12/2014 | Nathan et al. |
| 2015/0019391 A1 | 1/2015 | Kumar et al. |
| 2015/0039458 A1 | 2/2015 | Reid |
| 2015/0073907 A1 | 3/2015 | Purves et al. |
| 2015/0131851 A1 | 5/2015 | Bernal et al. |
| 2015/0199824 A1 | 7/2015 | Kim et al. |
| 2015/0206188 A1 | 7/2015 | Tanigawa et al. |
| 2015/0262116 A1 | 9/2015 | Katircioglu et al. |
| 2015/0269143 A1 | 9/2015 | Park et al. |
| 2015/0294483 A1 | 10/2015 | Wells et al. |
| 2016/0003636 A1 | 1/2016 | Ng-Thow-Hing et al. |
| 2016/0012465 A1 | 1/2016 | Sharp |
| 2016/0059412 A1 | 3/2016 | Oleynik |
| 2016/0125245 A1 | 5/2016 | Saitwal et al. |
| 2016/0127641 A1 | 5/2016 | Gove |
| 2016/0292881 A1 | 10/2016 | Bose et al. |
| 2016/0307335 A1 | 10/2016 | Perry et al. |
| 2017/0116473 A1 | 4/2017 | Sashida et al. |
| 2017/0206669 A1 | 7/2017 | Saleemi et al. |
| 2017/0262994 A1 | 9/2017 | Kudriashov et al. |
| 2017/0278255 A1 | 9/2017 | Shingu et al. |
| 2017/0309136 A1 | 10/2017 | Schoner |
| 2017/0323376 A1 | 11/2017 | Glaser et al. |
| 2017/0345165 A1 | 11/2017 | Stanhill et al. |
| 2017/0352234 A1 | 12/2017 | Awaysheh et al. |
| 2017/0353661 A1 | 12/2017 | Kawamura |
| 2018/0025175 A1 | 1/2018 | Kato |
| 2018/0070056 A1 | 3/2018 | DeAngelis et al. |
| 2018/0084242 A1 | 3/2018 | Rublee et al. |
| 2018/0164103 A1 | 6/2018 | Hill |
| 2018/0165728 A1 | 6/2018 | McDonald et al. |
| 2018/0218515 A1 | 8/2018 | Terekhov et al. |
| 2018/0315329 A1 | 11/2018 | D'Amato et al. |
| 2018/0343442 A1 | 11/2018 | Yoshikawa et al. |
| 2019/0043003 A1 | 2/2019 | Fisher et al. |
| 2019/0073627 A1 | 3/2019 | Nakdimon et al. |
| 2019/0102044 A1 | 4/2019 | Wang et al. |
| 2019/0156273 A1 | 5/2019 | Fisher et al. |
| 2019/0156274 A1 | 5/2019 | Fisher et al. |
| 2019/0156277 A1 | 5/2019 | Fisher et al. |

(56)                References Cited

U.S. PATENT DOCUMENTS

| | | | |
|---|---|---|---|
| 2019/0158801 A1 | 5/2019 | Matsubayashi | |
| 2019/0236531 A1 | 8/2019 | Adato et al. | |
| 2019/0315329 A1 | 10/2019 | Adamski et al. | |
| 2020/0005490 A1 | 1/2020 | Paik et al. | |
| 2020/0043086 A1 | 2/2020 | Sorensen | |
| 2020/0090484 A1 | 3/2020 | Chen et al. | |
| 2020/0134701 A1 | 4/2020 | Zucker et al. | |
| 2020/0279382 A1 | 9/2020 | Zhang et al. | |
| 2020/0320287 A1 | 10/2020 | Porikli et al. | |
| 2020/0381111 A1 | 12/2020 | Huang et al. | |
| 2021/0019914 A1 | 1/2021 | Lipchin et al. | |
| 2021/0027485 A1 | 1/2021 | Zhang | |
| 2021/0124936 A1 | 4/2021 | Mirza et al. | |
| 2021/0182922 A1 | 6/2021 | Zheng et al. | |
| 2021/0287013 A1 | 9/2021 | Carter et al. | |
| 2021/0350555 A1 | 11/2021 | Fischetti et al. | |
| 2021/0398097 A1 | 12/2021 | Wu | |
| 2022/0028230 A1 | 1/2022 | Srinivasan et al. | |
| 2022/0101007 A1 | 3/2022 | Kadav et al. | |
| 2023/0185386 A1* | 6/2023 | Bosworth | G06T 7/246 |
| | | | 345/156 |
| 2023/0298351 A1 | 9/2023 | Lee et al. | |
| 2025/0131805 A1* | 4/2025 | Yamayoshi | G08B 29/186 |

FOREIGN PATENT DOCUMENTS

| | | | |
|---|---|---|---|
| EP | 1574986 B1 | 7/2008 | |
| JP | 2013196199 A | 9/2013 | |
| JP | 201489626 A | 5/2014 | |
| JP | 2018207336 A | 12/2018 | |
| JP | 2019018743 A | 2/2019 | |
| JP | 2019096996 A | 6/2019 | |
| KR | 20170006097 A | 1/2017 | |
| WO | 0021021 A1 | 4/2000 | |
| WO | 02059836 A2 | 8/2002 | |
| WO | 2017151241 A2 | 9/2017 | |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Black, J. et al., "Multi View Image Surveillance and Tracking," IEEE Proceedings of the Workshop on Motion and Video Computing, 2002, https://www.researchgate.net/publication/4004539_Multi_view_image_surveillance_and_tracking/link/0c96051ac521f09b5b000000/download, pp. 1-6.

Ciplak G, Telceken S., "Moving Object Tracking Within Surveillance Video Sequences Based on EDContours," 2015 9th International Conference on Electrical and Electronics Engineering (ELECO), Nov. 26, 2015 (pp. 720-723). IEEE.

Cristian Pop, "Introduction to the BodyCom Technology", Microchip AN1391, May 2, 2011, pp. 1-24, vol. AN1391, No. DS01391A, Publisher: 2011 Microchip Technology Inc.

Fuentes et al., "People tracking in surveillance applications," Proceedings 2nd IEEE Int. Workshop on PETS, Kauai, Hawaii, USA, Dec. 9, 2001, 6 pages.

Grinciunaite, A., et al., "Human Pose Estimation in Space and Time Using 3D CNN," ECCV Workshop on Brave New Ideas for Motion Representations in Videos, Oct. 19, 2016, URL: https://arxiv.org/pdf/1609.00036.pdf, 7 pages.

Harville, M., "Stereo Person Tracking with Adaptive Plan-View Templates of Height and Occupancy Statistics," Image and Vision Computing, vol. 22, Issue 2, Feb. 1, 2004, https://www.researchgate.net/publication/223214495_Stereo_person_tracking_with_adaptive_plan-view_templates_of_height_and_occupancy_statistics/link/5e294888a6fdcc70a1437262/download, pp. 127-142.

He, K., et al., "Identity Mappings in Deep Residual Networks," ECCV 2016 Camera-Ready, URL: https://arxiv.org/pdf/1603.05027.pdf, Jul. 25, 2016, 15 pages.

Huang, K. S. et al. "Driver's View and Vehicle Surround Estimation Using Omnidirectional Video Stream," IEEE IV2003 Intelligent Vehicles Symposium. Proceedings (Cal. No.03TH8683), Jun. 9-11, 2003, http://cvrr.ucsd.edu/VOW2/papers/IV03DrView_Final_Header.pdf, pp. 444-449.

Lee, K. and Kacorri, H., (May 2019), "Hands Holding Clues for Object Recognition in Teachable Machines", In Proceedings of the 2019 CHI Conference on Human Factors in Computing Systems (pp. 1-12).

Liu, C., et al. "Accelerating Vanishing Point-Based Line Sampling Scheme for Real-Time People Localization", IEEE Transactions on Circuits and Systems for Video Technology. vol 27. No. Mar. 3, 2017 (Year: 2017).

Longuet-Higgins, H.C., "A Computer Algorithm for Reconstructing a Scene from Two Projections," Nature 293, Sep. 10, 1981, https://cseweb.ucsd.edu/classes/fa01/cse291/hclh/SceneReconstruction.pdf, pp. 133-135.

Manocha et al., "Object Tracking Techniques for Video Tracking: A Survey," The International Journal of Engineering and Science (IJES), vol. 3, Issue 6, pp. 25-29, 2014.

Phalke K, Hegadi R., "Pixel Based Object Tracking," 2015 2nd International Conference on Signal Processing and Integrated Networks (SPIN), Feb. 19, 2015 (pp. 575-578). IEEE.

Redmon, J., et al., "You Only Look Once: Unified, Real-Time Object Detection," University of Washington, Allen Institute for AI, Facebook AI Research, URL: https://arxiv.org/pdf/1506.02640.pdf, May 9, 2016, 10 pages.

Redmon, Joseph and Ali Farhadi, "YOLO9000: Better, Faster, Stronger," URL: https://arxiv.org/pdf/1612.08242.pdf, Dec. 25, 2016, 9 pages.

Rossi, M. and Bozzoli, E. A., "Tracking and Counting Moving People," IEEE Int'l Conf. on Image Processing, ICIP-94, Nov. 13-16, 1994, http://citeseerx.ist.psu.edu/viewdoc/download;jsessionid=463D09F419FA5595DBF9DEF30D7EC663?doi=10.1.1.331.6672&rep=rep1&type=pdf, 5 pages.

Sikdar A, Zheng YF, Xuan D., "Robust Object Tracking in the X-Z Domain," 2016 IEEE International Conference on Multisensor Fusion and Integration for Intelligent Systems (MFI), Sep. 19, 2016 (pp. 499-504). IEEE.

Toshev, Alexander and Christian Szegedy, "DeepPose: Human Pose Estimation via Deep Neural Networks," IEEE Conference on Computer Vision and Pattern Recognition, Aug. 20, 2014, URL: https://arxiv.org/pdf/1312.4659.pdf, 9 pages.

Vincze, M., "Robust Tracking of Ellipses at Frame Rate," Pattern Recognition, vol. 34, Issue 2, Feb. 2001, pp. 487-498.

Zhang, Z., "A Flexible New Technique for Camera Calibration," IEEE Transactions on Pattern Analysis and Machine Intelligence, vol. 22, No. 11, Nov. 2000, 5 pages.

Zhang, Z., "A Flexible New Technique for Camera Calibration," Technical Report MSR-TR-98-71, Microsoft Research, Microsoft Corporation, microsoft.com/en-us/research/wp-content/uploads/2016/02/tr98-71.pdf, 22 pages.

* cited by examiner

HANDS OF ACTOR 1 DETECTED IN IMAGES CAPTURED BY CAMERA

SCORE CALCULATED BASED ON OVERLAP OF HANDS AND
PRODUCT SPACES

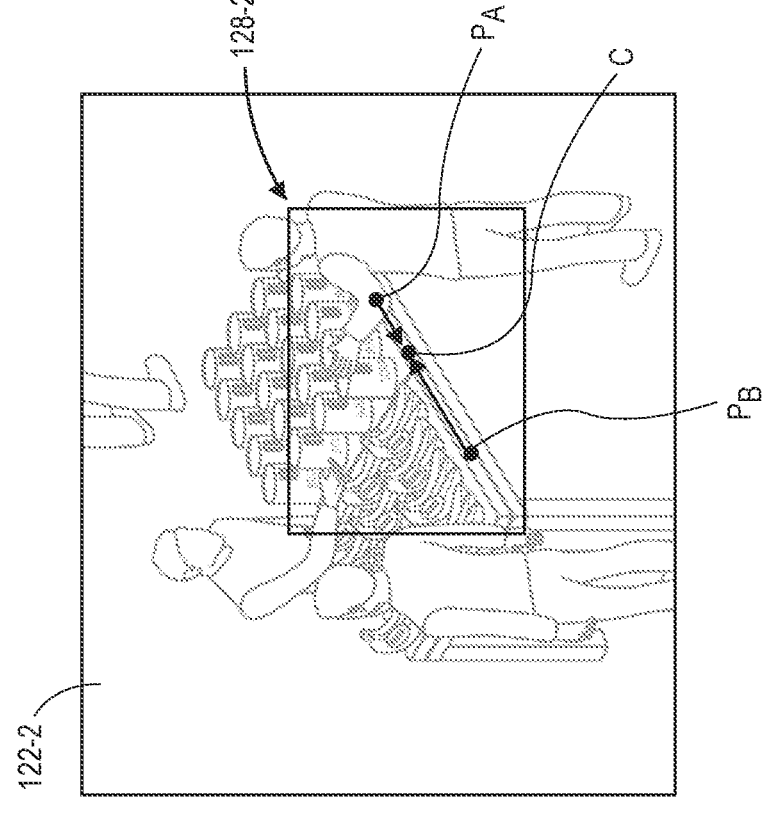
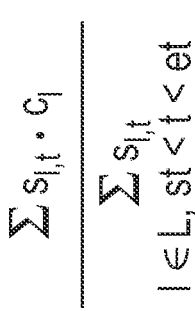
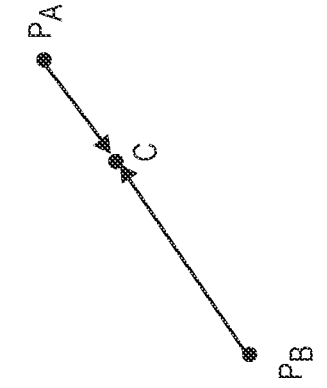
DETERMINE CENTER OF CROP WINDOW
FOR IMAGES BASED ON SCORES AND PRODUCT SPACE POINTS
FIG. 1E

CROP IMAGES ABOUT CROP WINDOW

MULTI-CHANNEL IMAGE GENERATED FOR EACH CROPPED IMAGE

FEATURES AND CLASSIFICATION OF CLIP GENERATED FOR
MULTI-CHANNEL IMAGES WITH RESPECT TO ACTIONS, ITEMS AND HANDS

CLIP FEATURES AND CLASSIFICATIONS GENERATED FOR EACH CLIP

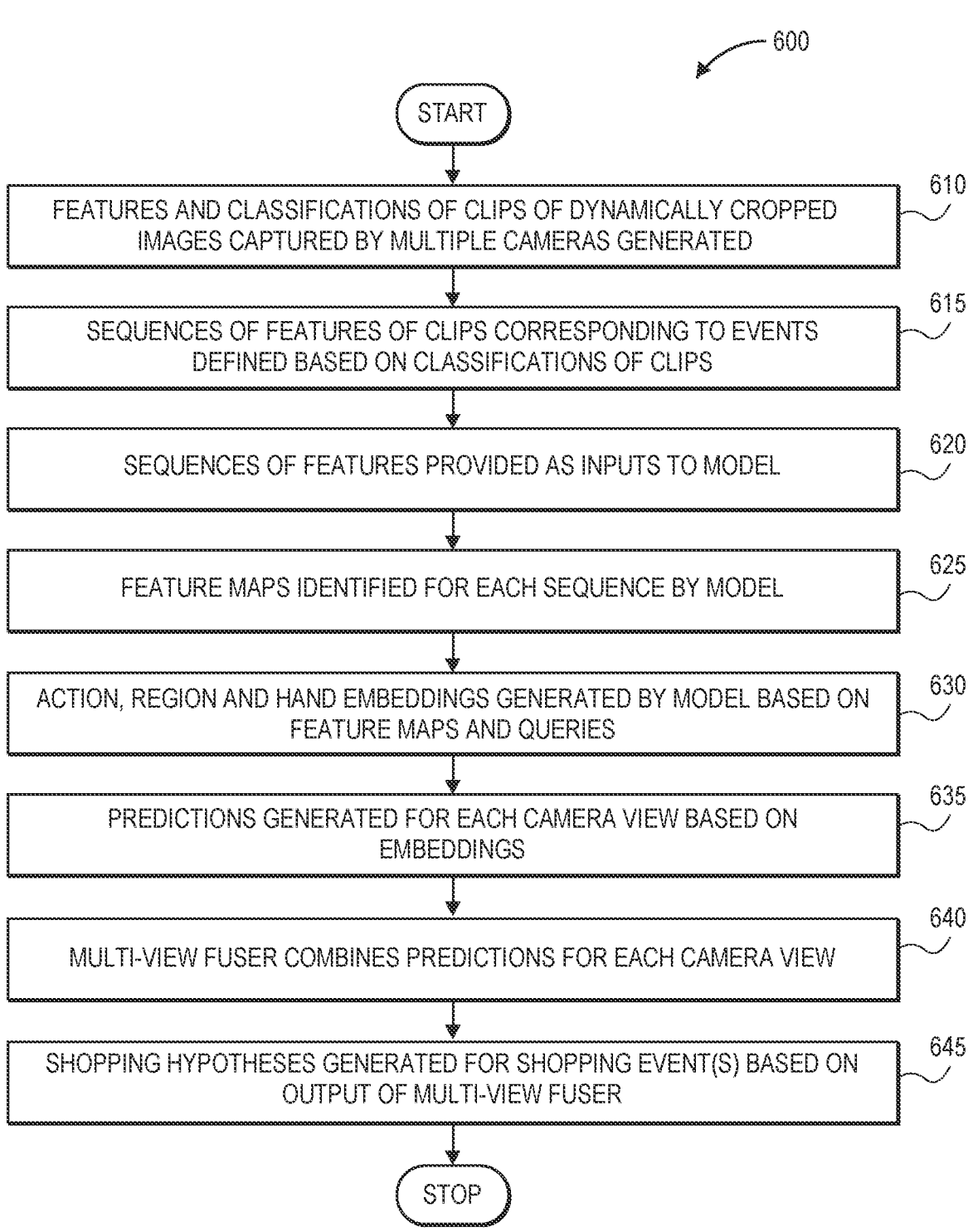

600

START

FEATURES AND CLASSIFICATIONS OF CLIPS OF DYNAMICALLY CROPPED IMAGES CAPTURED BY MULTIPLE CAMERAS GENERATED — 610

SEQUENCES OF FEATURES OF CLIPS CORRESPONDING TO EVENTS DEFINED BASED ON CLASSIFICATIONS OF CLIPS — 615

SEQUENCES OF FEATURES PROVIDED AS INPUTS TO MODEL — 620

FEATURE MAPS IDENTIFIED FOR EACH SEQUENCE BY MODEL — 625

ACTION, REGION AND HAND EMBEDDINGS GENERATED BY MODEL BASED ON FEATURE MAPS AND QUERIES — 630

PREDICTIONS GENERATED FOR EACH CAMERA VIEW BASED ON EMBEDDINGS — 635

MULTI-VIEW FUSER COMBINES PREDICTIONS FOR EACH CAMERA VIEW — 640

SHOPPING HYPOTHESES GENERATED FOR SHOPPING EVENT(S) BASED ON OUTPUT OF MULTI-VIEW FUSER — 645

STOP

FIG. 6

SYSTEM PROGRAMMED WITH
POSITIONS OF STORAGE UNITS

SEGMENTATION MAPS GENERATED FROM CLIPS OF IMAGES

SCORES CALCULATED BASED ON OVERLAP BETWEEN HANDS AND PRODUCT SPACES

CROPPING WINDOW DEFINED WITH RESPECT TO CROP CENTER IDENTIFIED
BASED ON SCORES AND FRONT POINTS

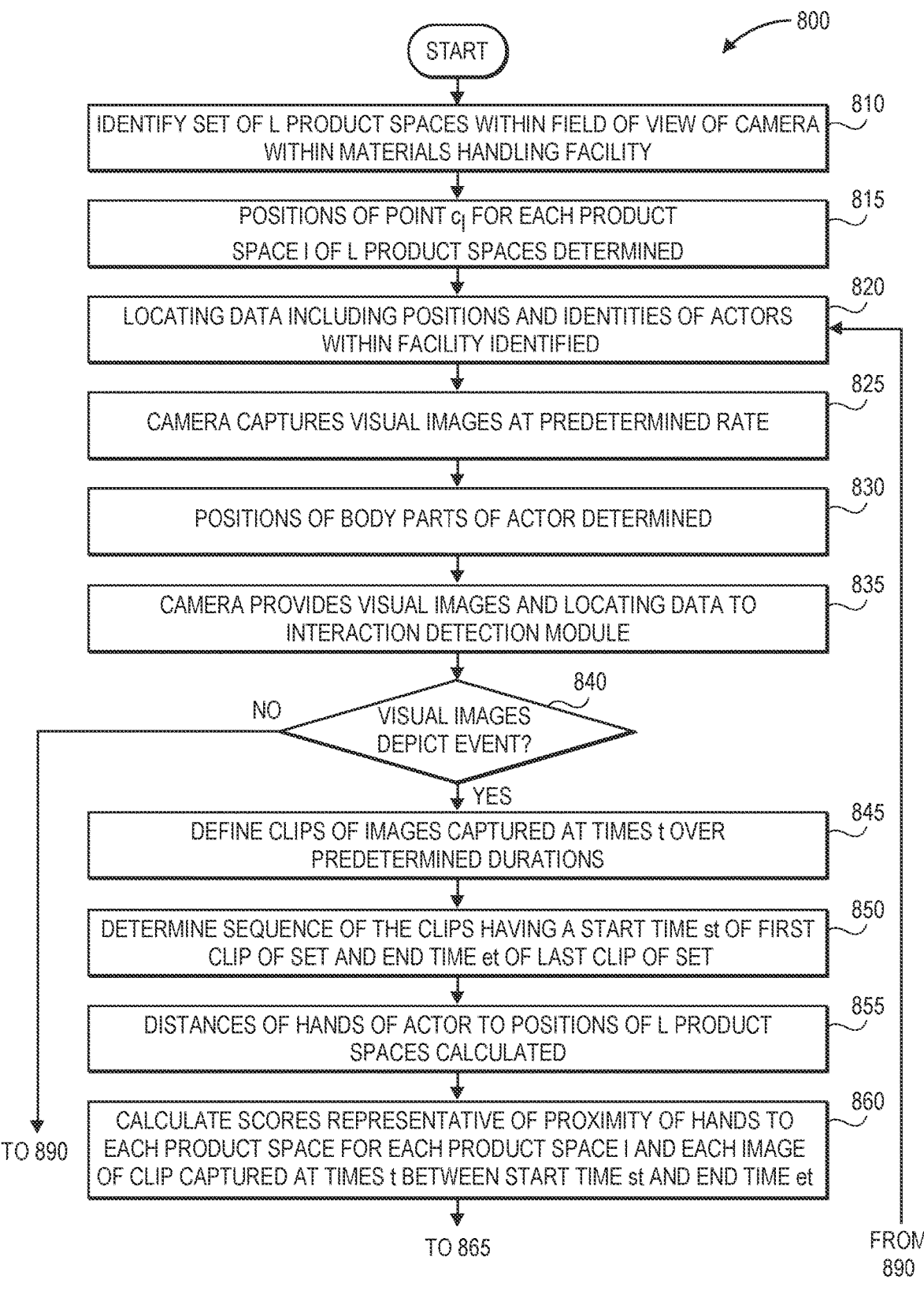

800

START

IDENTIFY SET OF L PRODUCT SPACES WITHIN FIELD OF VIEW OF CAMERA WITHIN MATERIALS HANDLING FACILITY — 810

POSITIONS OF POINT $c_i$ FOR EACH PRODUCT SPACE I OF L PRODUCT SPACES DETERMINED — 815

LOCATING DATA INCLUDING POSITIONS AND IDENTITIES OF ACTORS WITHIN FACILITY IDENTIFIED — 820

CAMERA CAPTURES VISUAL IMAGES AT PREDETERMINED RATE — 825

POSITIONS OF BODY PARTS OF ACTOR DETERMINED — 830

CAMERA PROVIDES VISUAL IMAGES AND LOCATING DATA TO INTERACTION DETECTION MODULE — 835

NO    VISUAL IMAGES DEPICT EVENT? 840

YES

DEFINE CLIPS OF IMAGES CAPTURED AT TIMES t OVER PREDETERMINED DURATIONS — 845

DETERMINE SEQUENCE OF THE CLIPS HAVING A START TIME st OF FIRST CLIP OF SET AND END TIME et OF LAST CLIP OF SET — 850

DISTANCES OF HANDS OF ACTOR TO POSITIONS OF L PRODUCT SPACES CALCULATED — 855

CALCULATE SCORES REPRESENTATIVE OF PROXIMITY OF HANDS TO EACH PRODUCT SPACE FOR EACH PRODUCT SPACE I AND EACH IMAGE OF CLIP CAPTURED AT TIMES t BETWEEN START TIME st AND END TIME et — 860

TO 890

TO 865

FROM 890

FIG. 8A

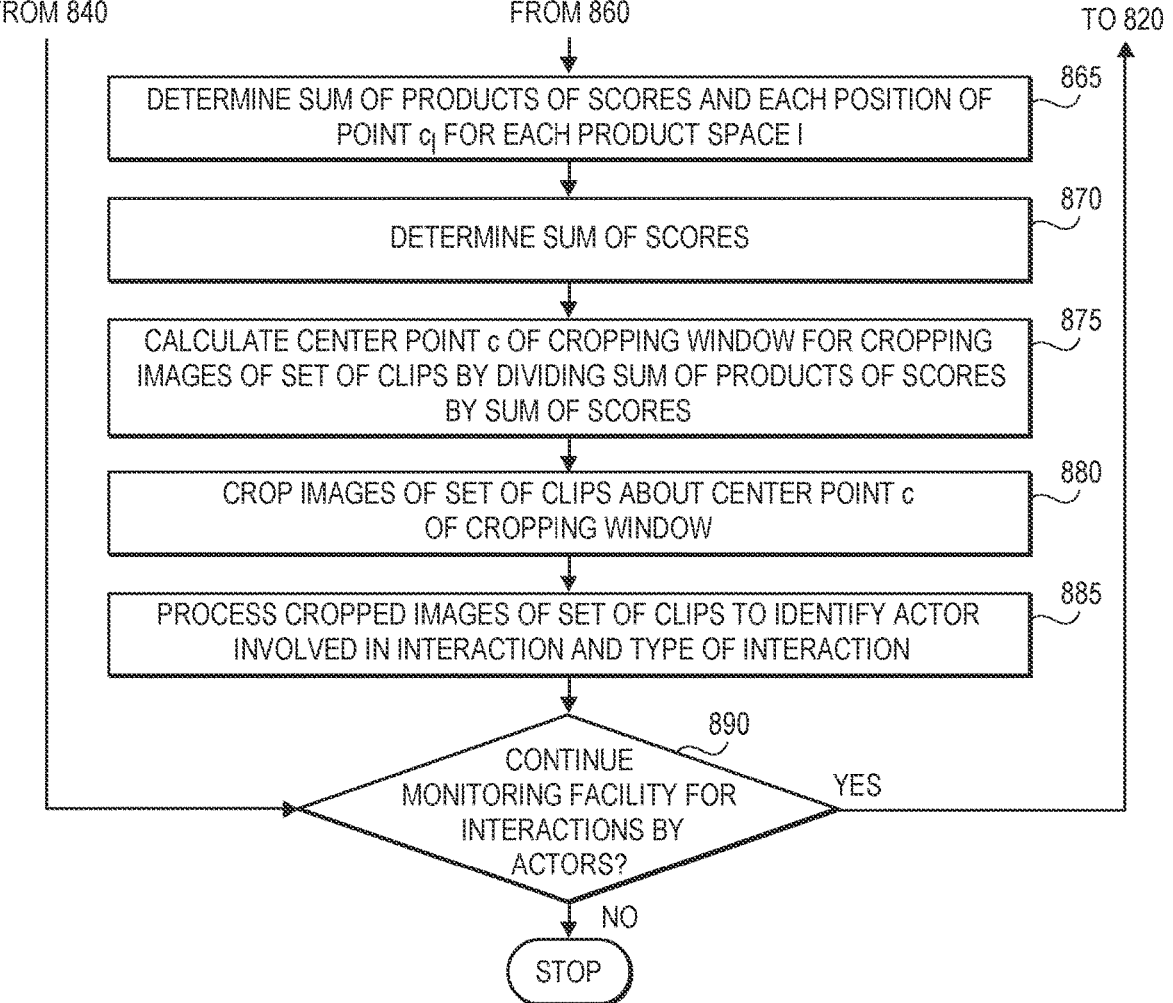

FROM 840            FROM 860            TO 820

DETERMINE SUM OF PRODUCTS OF SCORES AND EACH POSITION OF POINT $c_i$ FOR EACH PRODUCT SPACE I    865

DETERMINE SUM OF SCORES    870

CALCULATE CENTER POINT c OF CROPPING WINDOW FOR CROPPING IMAGES OF SET OF CLIPS BY DIVIDING SUM OF PRODUCTS OF SCORES BY SUM OF SCORES    875

CROP IMAGES OF SET OF CLIPS ABOUT CENTER POINT c OF CROPPING WINDOW    880

PROCESS CROPPED IMAGES OF SET OF CLIPS TO IDENTIFY ACTOR INVOLVED IN INTERACTION AND TYPE OF INTERACTION    885

CONTINUE MONITORING FACILITY FOR INTERACTIONS BY ACTORS?    890    YES

NO

STOP

FIG. 8B

DETECTING EVENTS BY ACTORS USING DYNAMICALLY CROPPED IMAGES

BACKGROUND

Today, imaging devices are used in a wide number of applications for detecting and locating objects, such as actors, that are depicted within imaging data. For example, cameras are often used to monitor arrivals or departures of goods or performances of services in materials handling facilities such as warehouses, fulfillment centers, retail establishments or other like facilities, or to monitor travels of persons or objects in locations such as airports, stadiums or other dense environments, or on one or more sidewalks, roadways or highways. Cameras are also frequently installed and used in financial settings such as banks or casinos, where money changes hands in large amounts, at high rates of speed, or between large numbers of people.

In dynamic environments such as materials handling facilities, transportation centers, financial institutions or like facilities, detecting and locating large numbers of objects or actors using cameras are frequently difficult tasks. Many systems for detecting and locating objects or actors in three-dimensional (or "3D") space rely on large numbers of individual cameras to capture imaging data (e.g., visual images of an object, or depth images or other samples of depths or ranges to the object), and to provide the captured imaging data to servers or other centralized systems. Likewise, determining whether an actor has executed a given event, e.g., a shopping event such as a taking of an object from a storage unit, a return of an object to the storage unit, or an event that involves neither a taking nor a return of an object, based on imaging data captured from large numbers of cameras may be a computationally expensive process that tends to consume or occupy substantial amounts of available data storage, processing and transmission capacities, and may require comparatively lengthy processing times.

Reducing amounts of imaging data captured by cameras that must be processed in order to detect an event, to locate an object, to determine whether an actor has executed the event, or to perform any other function regarding the vent, is a complicated endeavor. In some instances, an amount of data to be processed may be reduced by cropping images, e.g., to remove or adjust outside edges of such images. Cropping may be performed in any manner, such as by identifying a point within an image plane of an image and isolating portions of the image within a window having a predetermined size and shape, which may be centered or located on or around a point within the image. However, the effectiveness of cropping necessarily depends upon identifying an appropriate portion of an image that should be cropped. If a portion of an image that is selected for cropping is too small, or is not appropriately located within the image, then cropping the image is not only ineffective but also unhelpful.

BRIEF DESCRIPTION OF THE DRAWINGS

FIGS. 1A through 1K are views of aspects of one system for detecting events in accordance with implementations of the present disclosure.

FIG. 6 is a flow chart of one process for detecting events in accordance with implementations of the present disclosure.

FIGS. 8A and 8B are a flow chart of one process for detecting events in accordance with implementations of the present disclosure.

DETAILED DESCRIPTION

As is set forth in greater detail below, the present disclosure is directed to systems and methods for detecting events from image features that are generated from images that are captured using one or more cameras or other imaging devices and dynamically cropped. More specifically, one or more implementations of the present disclosure are directed to networks of cameras or other imaging devices that are programmed or configured to capture images of one or more product spaces or other locations for accommodating items. In some implementations, portions of the images having fixed dimensions may be cropped about points that are selected based on positions of portions of product spaces within the images and scores representative of overlaps or timing between hands or items and such product spaces. The cropped images may be masked, layered or stacked to indicate segments depicting hands or products within such hands, and processed to determine positions of body parts in 3D space.

Whether an interaction with one or more of items has occurred may be determined by processing cropped images to determine features from such images, and interpreting the features to predict whether a shopping event (e.g., a taking or picking event, a return or deposit event, or no event) involving one or more of the items has occurred, or how many of such events have occurred. In some implementations, features determined from images may be processed using one or more transformers or other machine learning models (or algorithms, systems or techniques) that may be trained to receive sets of images streamed from one or more cameras and generate a hypothesis as to a number of shopping events performed by an actor in a single forward pass, or a net change in inventory based on such events.

Figure 1A:
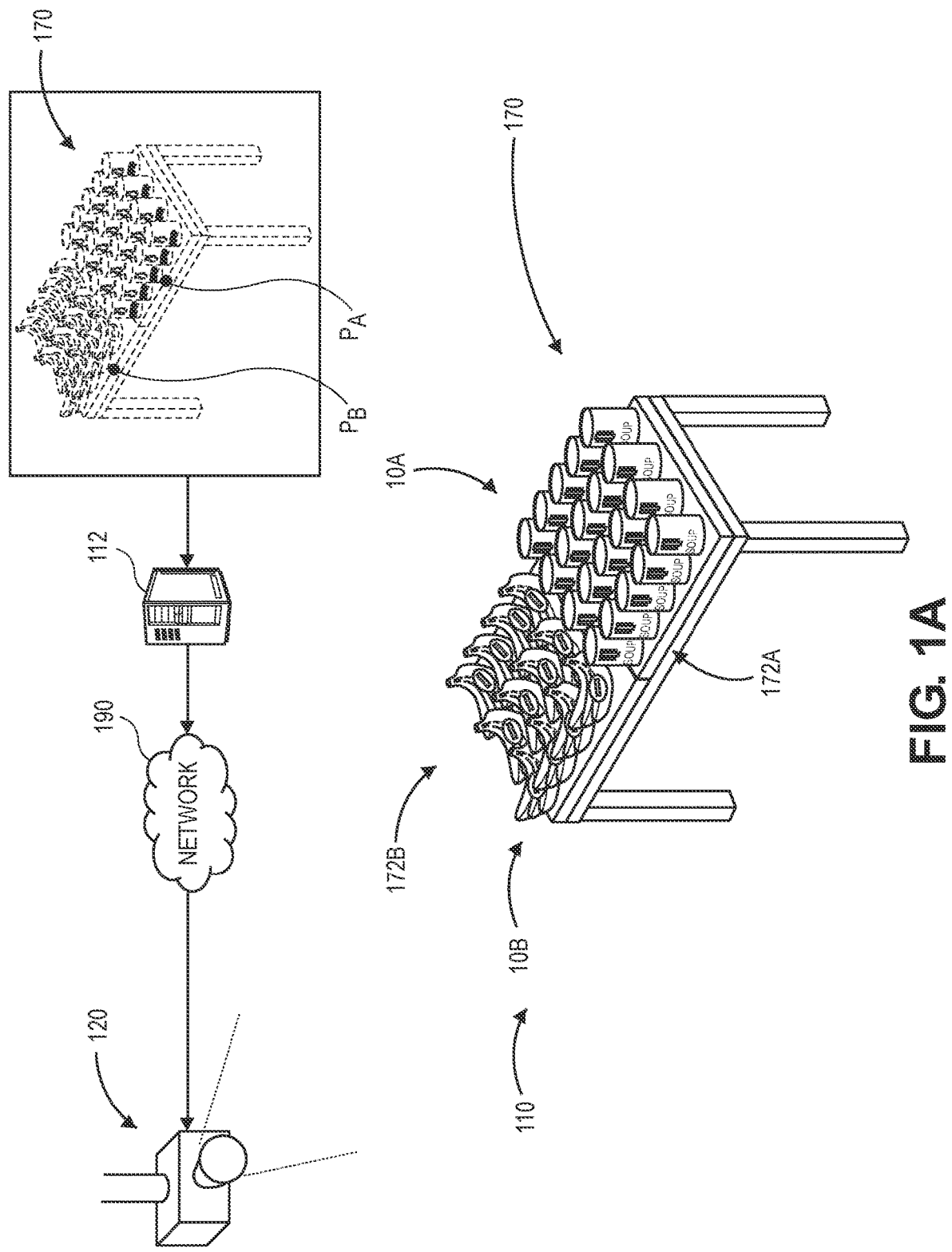

Referring to FIGS. 1A through 1K, views of aspects of one system for detecting events in accordance with implementations of the present disclosure are shown. As is shown in FIG. 1A, a scene 110 such as a materials handling facility, a fulfillment center, a warehouse, or any other like facility includes a camera 120 and a fixture 170 (e.g., a table, a rack or a set of inventory shelves). The camera 120 may be connected to a system 112 (e.g., a server) or any other devices, systems or components (not shown) over a network 190, or one or more networks, which may include the Internet in whole or in part. The system 112 may be provided in the same physical location as the scene 110, or in one or more alternate or virtual locations, e.g., in a "cloud"-based environment.

The scene 110 may be any open or enclosed environment or space in which any number of actors (e.g., customers, workers or other humans, animals or machines) may execute one or more poses, gestures, movements or other interactions within the field of view of the camera 120. The fixture 170 includes a plurality of product spaces (e.g., sections or areas having one or more surfaces for accommodating items) 172A, 172B. As is further shown in FIG. 1A, the product spaces 172A, 172B are portions (e.g., lanes or other predefined sections) of a common platform of the fixture 170, which may be a table or any other fixture. Alternatively, or additionally, either or both of the product spaces 172A, 172B or any other product spaces (not shown) may occupy a portion or an entirety of the fixture 170.

Each of the product spaces 172A, 172B includes a set of items 10A, 10B thereon. For example, the set of items 10A includes cans of soup or other food products, while the set of items 10B includes bunches of bananas or other fruits or produce. Alternatively, or additionally, the product spaces 172A, 172B may include items of any other type or form.

The camera 120 may include any number of lenses, memory or storage components, photosensitive surfaces, filters, chips, electrodes, clocks, boards, timers, power sources, connectors or any other components. In some implementations, the camera 120 may have a field of view that overlaps at least in part with another field of view of another camera (not shown) that may be aligned in a different location and at a non-parallel angle or orientation with respect to that camera. In some implementations, the camera 120 may be calibrated, and operated along with one or more other cameras, such that mappings between coordinates of imaging data captured by the respective cameras and directions relative to their respective image sensors are known. Additionally, the camera 120 may be installed or otherwise operated independently or with other cameras as components of a camera network (or an imaging device network).

The camera 120 may also be in communication with one or more other devices or systems, e.g., over the network 190. Such other devices or systems may include one or more databases or other data stores having information regarding attributes that are, have been or might be stored on the fixture 170, e.g., the sets of items 10A, 10B, and their respective locations, e.g., the product spaces 172A, 172B. In some implementations, the attributes may include, but need not be limited to, dimensions and/or masses of the items 10A, 10B, locations on the fixture 170 or the product spaces 172A, 172B where the items 10A, 10B are typically placed, colors or textures of surface elements (e.g., packaging, wrapping, coverings or the like) of the items 10A, 10B, or any other attributes.

As is further shown in FIG. 1A, the system 112 or the camera 120 may be programmed with positions of the product spaces 172A, 172B within a field of view of the camera 120. For example, as is shown in FIG. 1A, the system 112 may be programmed with positions of single points PA, PB corresponding to front portions of the product spaces 172A, 172B, which may be defined as locations in two-dimensional space within an image plane of the camera 120, or positions in 3D space and backprojected therein, where parameters of the camera 120 are known. In some other implementations, the points may be located at centers of the respective product spaces 172A, 172B, or at or near bottoms of the respective product spaces 172A, 172B. Alternatively, the positions with which the system 112 or the camera 120 is programmed may correspond to any other single point of either of the product spaces 172A, 172B, or multiple points of the product spaces 172A, 172B.

The camera 120 may be configured to capture visual images (e.g., color, grayscale, or black-and-white images), or any other type or form of imaging data (e.g., depth images). In some implementations, the camera 120 may include one or more sensors that are configured to capture visual imaging data at relatively high levels of resolution, any number of pixels (e.g., eight to nine megapixels) per image, and at relatively high frame rates, e.g., fifteen or more frames per second (fps). Such sensors may include arrays of photodetectors or photosensitive components such as charge coupled devices ("CCD"), complementary metal-oxide sensors ("CMOS"), photodiodes, or the like. The sensors may capture light scattered or reflected from objects and assign one or more quantitative values (e.g., red, green, blue or other color values, or distances or ranges to such objects) to aspects of the scattered or reflected light. Alternatively, or additionally, in some implementations, the camera 120 may be configured to capture any other imaging data, such as depth imaging data, at any levels of resolution or frame rates.

In some implementations, the camera 120 may be self-powered, e.g., by one or more power sources internal to or onboard the camera 120, such as batteries or fuel cells. In some other implementations, however, the camera 120 may receive alternating current (or AC) or direct current (or DC) power from one or more external power sources, e.g., by one or more conductors or other connectors. For example, the camera 120 may receive power by a dedicated connection to external devices or systems, or power sources, e.g., according to a Power over Ethernet (or "PoE") or a Universal Serial Bus Type-C ("USB-C") standard or system that may also be utilized to transfer information or data to or from the camera 120. Although only a single camera 120 is shown in FIG. 1A, the scene 110 may include any number of cameras 120. Such cameras 120 may have fields of view that may include all or portions of the fixture 170 or the product spaces 172A, 172B, and two or more of such fields of view may overlap at least in part.

Figure 1B:
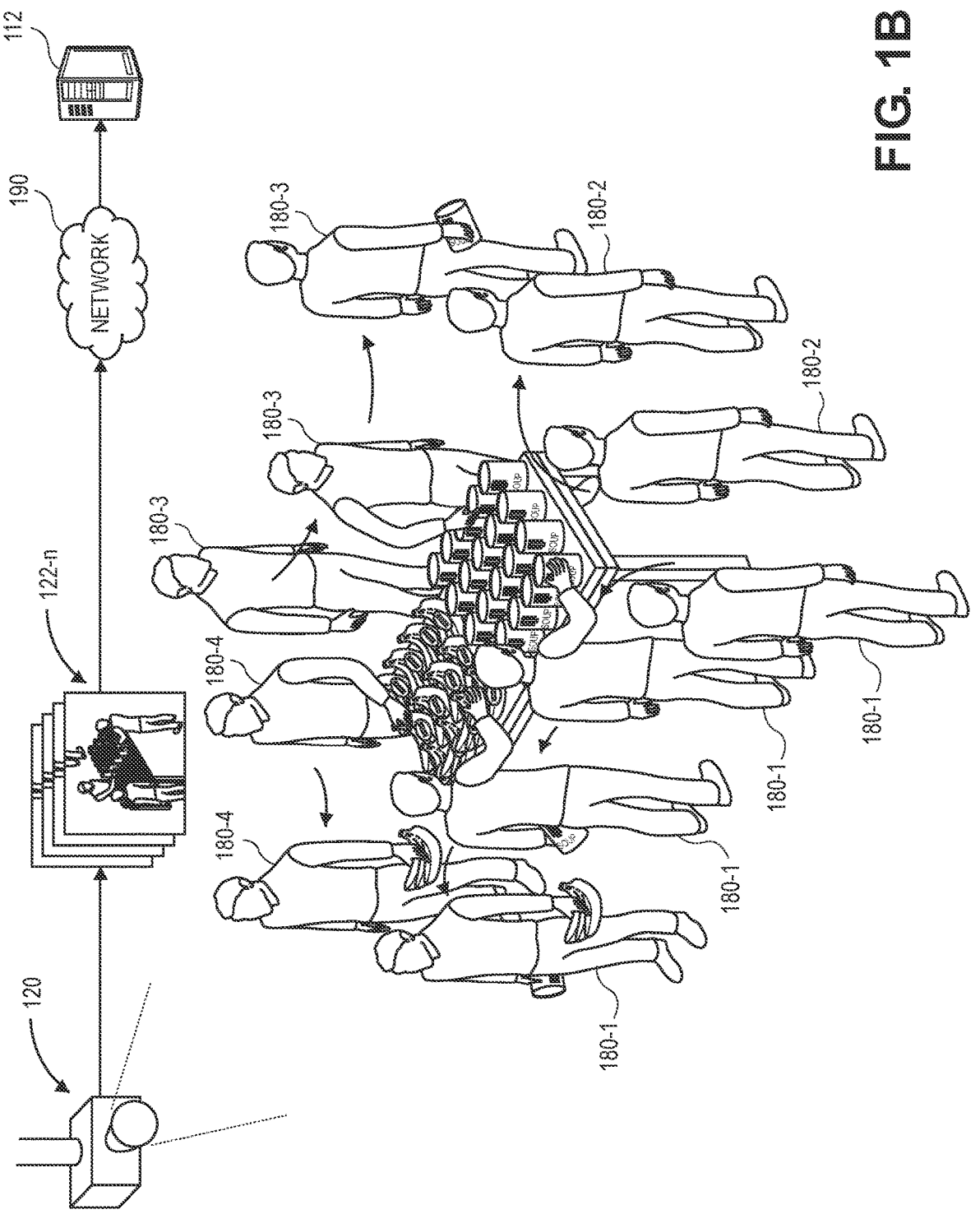

As is shown in FIG. 1B, a plurality of actors 180-1, 180-2, 180-3, 180-4 (e.g., customers, workers or other humans) execute one or more poses, gestures or other actions within a vicinity of the fixture 170, and within a field of view of the camera 120. For example, as is shown in FIG. 1B, one or more of the actors 180-1, 180-2, 180-3, 180-4 may independently walk around the fixture 170, extend one or more hands over the fixture 170 or the product spaces 172A, 172B, retrieve and manipulate one or more of the items 10A, 10B, manually and visually evaluate one or more of the items 10A, 10B, place one or more of the items 10A, 10B into a basket, a cart, a pocket or another enclosure or receptacle, return any of the items 10A, 10B to the product spaces 172A, 172B, or place any other items (not shown) onto one or both of the product spaces 172A, 172B. Alternatively, or additionally, the actors 180-1, 180-2, 180-3, 180-4 may execute any other movements or actions within a vicinity of the fixture 170. The camera 120 may capture images 122-*n* at any rate as the actors 180-1, 180-2, 180-3, 180-4 execute one or more poses, gestures or other actions.

Figure 1C:
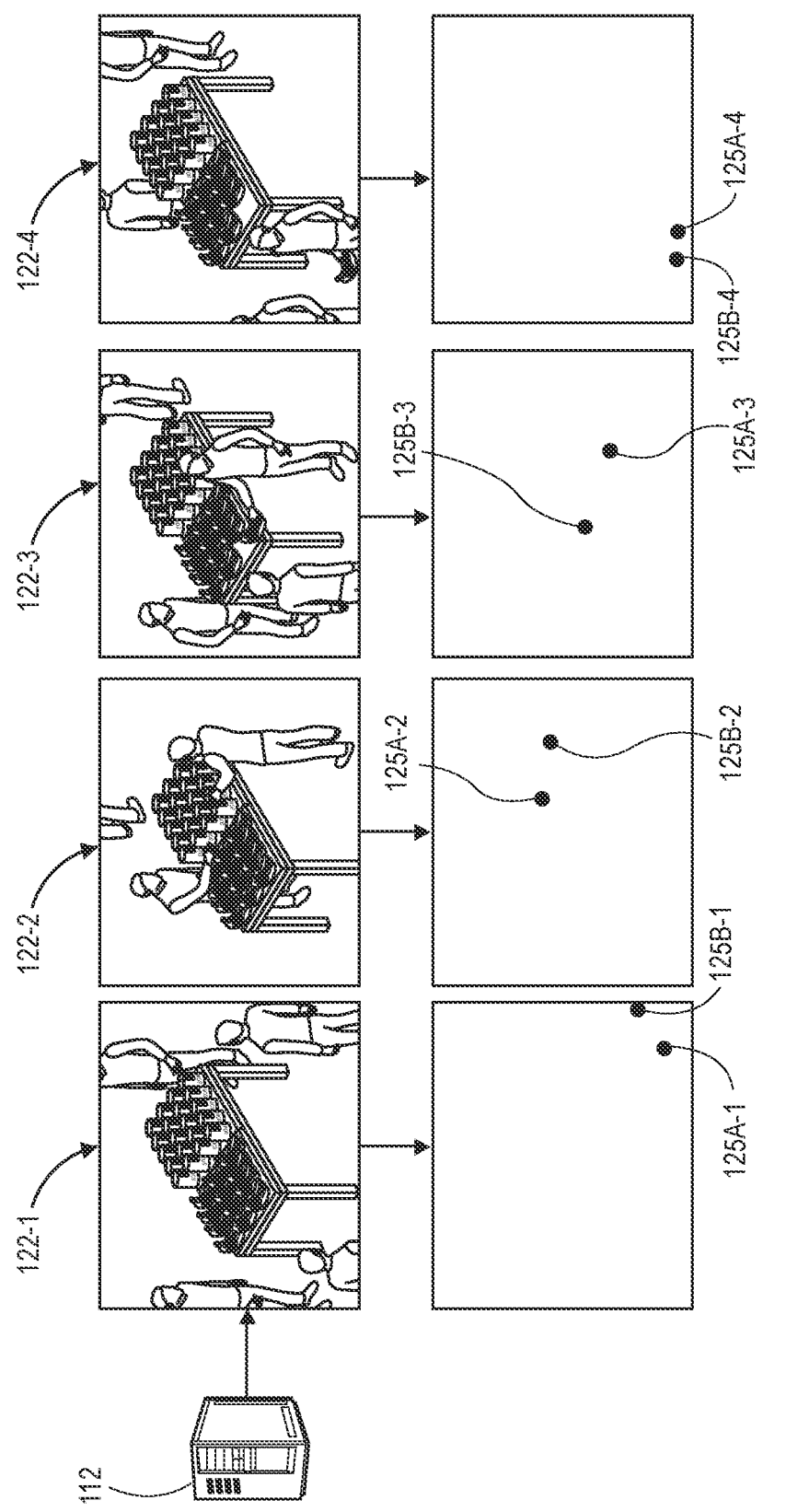

The images 122-*n* may be captured by the camera 120 and transmitted to the system 112 for processing to detect body parts of any number of actors depicted therein, and to predict whether any of such actors executed shopping events, e.g., taking or picking events, returning or depositing events, or no events at all, based on such images. As is shown in FIG. 1C, images 122-1, 122-2, 122-3, 122-4 of the images 122-*n* captured by the camera 120 as the actor 180-1 executes poses, gestures or other actions are processed to determine whether the images 122-1, 122-2, 122-3, 122-4 depict any body parts such as heads, arms, hands, torsos or portions thereof. In some implementations, the system 112 may be configured to execute a human parser module or body part detection module (e.g., an algorithm, system or technique), which may be an artificial neural network, such as a convolutional neural network, or any other machine learning model, such as a segmentation network, that is trained to detect or identify such body parts depicted within an image, or items associated with such body parts (e.g., items within hands of images). In some implementations, a human parser module or a body part detection module may generate a segmentation record identifying segments of an image depicting body parts or items and their respective locations within the image. In some implementations, a human parser module or a body part detection module may be configured to detect portions of a body part, including but not limited to multiple portions of the same body part, e.g., an upper arm and a lower arm.

For example, a human parser module or a body part detection module may be configured to process every image captured by the camera 120, or fewer than all of the images captured by the camera 120, to determine whether such images depict body parts of any actors, or body part image segments (e.g., hands, heads, shoulders, upper arms, elbows, lower arms, wrists, feet, or other body parts), or to determine locations of such body parts or segments within each image. The human parser module or body part detection module may be a machine learning system, e.g., an artificial neural network, such as a convolutional neural network, that is trained to generate, for each image, a segmentation record identifying segments of the image depicting body parts and their respective locations within the image. The human parser module or body part detection module may also generate one or more sets of regression vectors or other associations between locations of pairs of body parts, such as heads and hands, detected within one or more images, or determine 3D positions of each of the body parts detected within images, based on a position of a camera, as well as any monocular cues or other attributes of the images or the body parts depicted therein e.g., absolute or relative sizes of the body parts depicted within images, or apparent elevations of the body parts within the images with respect to floors or traveling surfaces, as well as any colors or textures of the body parts (or gradients of such colors or textures), relative motion of the body parts, or any other attributes of the body parts or the images.

Upon detecting segments of the images 122-1, 122-2, 122-3, 122-4 or others that depict body parts, or items associated with such body parts (e.g., items within hands), the system 112 may identify one or more attributes of such segments, e.g., by image segmentation, image filtering, image smoothing and/or image localization, and determine and store attributes of such sets of pixels, or the sets of pixels themselves, in one or more data stores. The system 112 may further associate two or more detections of body parts within the images 122-1, 122-2, 122-3, 122-4 with one another. For example, the system 112 may generate vectors of regression identifying pairs of body part detections or item detections that are associated with one another, and assign probabilities that the detections of the body parts or items belong to or are associated with a common actor, e.g., based on any number of physiological parameters or constraints, as well as any metrics of compatibility or incompatibility.

Additionally, where hands or other body parts, or items within such hands, are detected within the images 122-n, one or more of the images 122-n may be masked, layered, stacked, annotated or otherwise augmented to include information, data or metadata labeling or referencing locations of such body parts, or identifying any of such body parts depicted therein. The system 112 may be programmed or configured to represent body parts of actors, or associations between such body parts, in any manner in accordance with implementations of the present disclosure. For example, the system 112 may represent body parts in the form of a map identifying points, segments or bounding boxes corresponding to hands or other body parts, such as points 125A-1, 125B-1 (or segments) corresponding to hands depicted within the image 122-1, as well as points 125A-2, 125B-2 corresponding to hands depicted within the image 122-2, points 125A-3, 125B-3 (or segments) corresponding to hands depicted within the image 122-3 and points 125A-4, 125B-4 (or segments) corresponding to hands depicted within the image 122-4, and points (or segments) corresponding to hands or other body parts depicted within any other images of the images 122-n (not shown). Moreover, points or segments of any number of other body parts, in addition to hands, may be identified and represented in a map as points, segments or bounding boxes, or in any other manner. For example, body parts of actors detected within the images 122-n may be represented as a skeleton or any other representation, e.g., a parametric representation, which may be expressed within a two-dimensional image plane, or in 3D space, or according to any other standard. Such body parts may be represented collectively in common sets of data or data structures for each of a plurality of actors, or independently in different sets of data or data structures for respective actors, in accordance with implementations of the present disclosure.

Figure 1D:
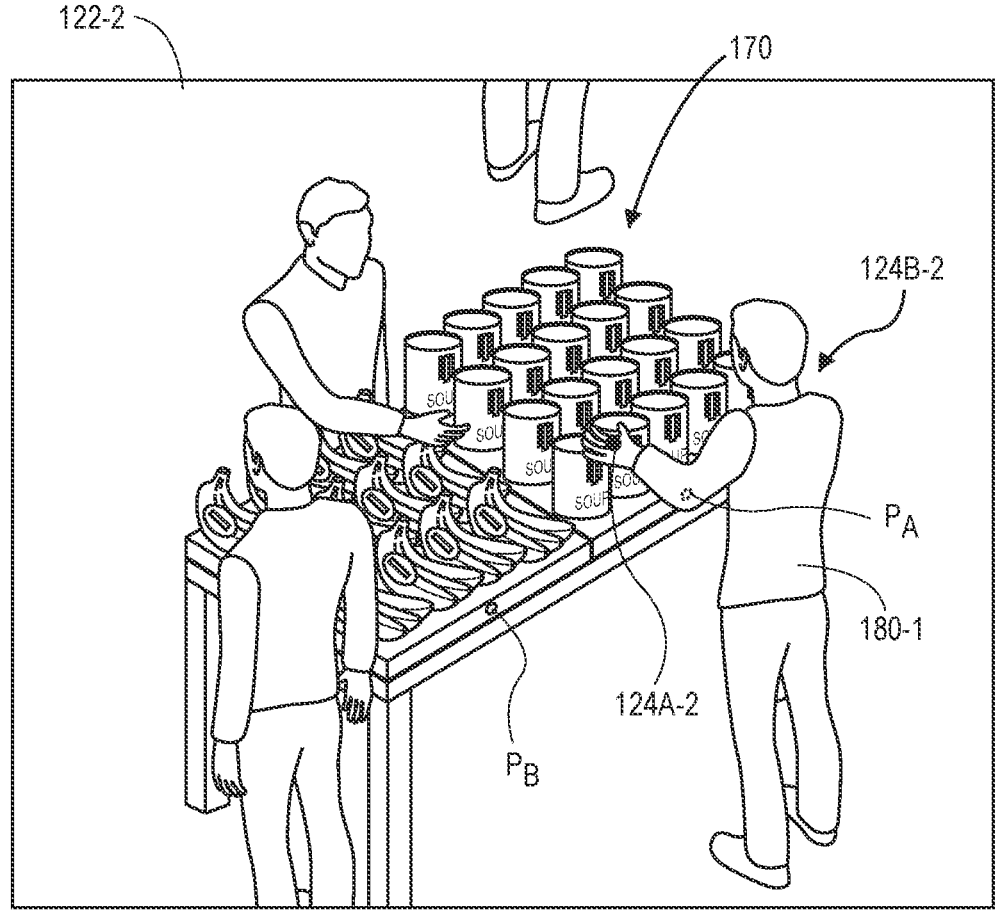

As is shown in FIG. 1D, scores representing overlaps of hands 124A-1, 124A-2 of actors and each of the product spaces 172A, 172B depicted within the image 122-2 may be calculated, and a center point (e.g., a crop center) of a cropping window for cropping the image 122-2 may be identified based on the scores and positions corresponding to the product spaces, e.g., positions of the points PA, PB corresponding to front portions of the product spaces 172A, 172B shown in FIG. 1B. For example, in some implementations, scores may be calculated based on masks corresponding to the hands 124A-1, 124A-2, e.g., the points 125A-1, 125B-1, 125A-2, 125B-2, 125A-3, 125B-3, 125A-4, 125B-4 shown in FIG. 1C, which may be detected or generated by a human parser module or a body part detection module, and masks corresponding to product spaces, which may be determined from planogram data, detected within images, or otherwise generated in any other manner. Scores may also be calculated based on features regarding the fixture 170 or the one or more product spaces 172A, 172B, such as timing with respect to one or more trajectories of the hands 124A-1, 124A-2. A score calculated for each of a plurality of product spaces may also be calculated as a linear average of two or more other scores, e.g., scores calculated from features specific to an actor, and scores calculated based on features specific to the product spaces or times. A crop center may be calculated for each of the images 122-n, for a clip (or a subset) of the images 122-n that are captured over a fixed duration, or for a plurality of such clips. For example, in some implementations, a crop center may be calculated based on scores determined from multiple images captured by multiple cameras, each having discrete fields of view.

For example, as is shown in FIG. 1E, where the system 112 is programmed with positions $c_i$ of each product space $l$ of a set of product spaces L, viz., the points $P_A$, $P_B$ corresponding to the product spaces 172A, 172B of the fixture 170, a center $c$ of a window for cropping an image 128-2 from the image 122-2, or from a plurality of images captured at times t between a start time st of an event and an end time et of the event, may be calculated according to a function $$c = \frac{\sum_{l \in L} \sum_{st < t < et} s_{l,t} c_l}{\sum_{l \in L} \sum_{st < t < et} s_{l,t}}$$

where $s_{l,t}$ is a score calculated for each product space l at each time t between the start time st and the end time et. In some implementations, the score $s_{l,t}$ may be a first score derived from actor-specific features for the product space l at the time t, such as an extent of overlap between a hand depicted within an image captured at the time t or a product depicted within the image and the product space l depicted within the image, a second score derived based on features regarding the product space l, such as timing regarding positions of hands or items with respect to one or more start times or end times of a predicted interaction, or a linear combination or average of the first score and the second score. Where a distance between a point representing a body part (e.g., a hand or another body part) or an item in 3D space and a corresponding one of the points $P_A$, $P_B$ exceeds a predetermined threshold, however, a score $s_{l,t}$ calculated for that product space may be downgraded or downweighed, or the product space may be excluded from consideration.

The center c may be calculated for each clip of a predetermined number of the images 122-n captured over a fixed duration, or for a plurality of such clips.

Dimensions of the cropping window from which the image 128-2 is identified may be selected on any basis. For example, the cropping window may have a shape in the form of a rectangle (e.g., a square) or any other polygon or curvilinear shape. Moreover, the cropping window may have the same aspect ratio as an image, or a different aspect ratio. For example, where an image to be cropped is consistent with a Video Graphics Array (or "VGA") standard, and has a rectangular shape with dimensions of 640×480 pixels, or a 4:3 aspect ratio, a cropping window may have a square shape with dimensions of 160×160 pixels, or a 1:1 aspect ratio.

Figure 1F:
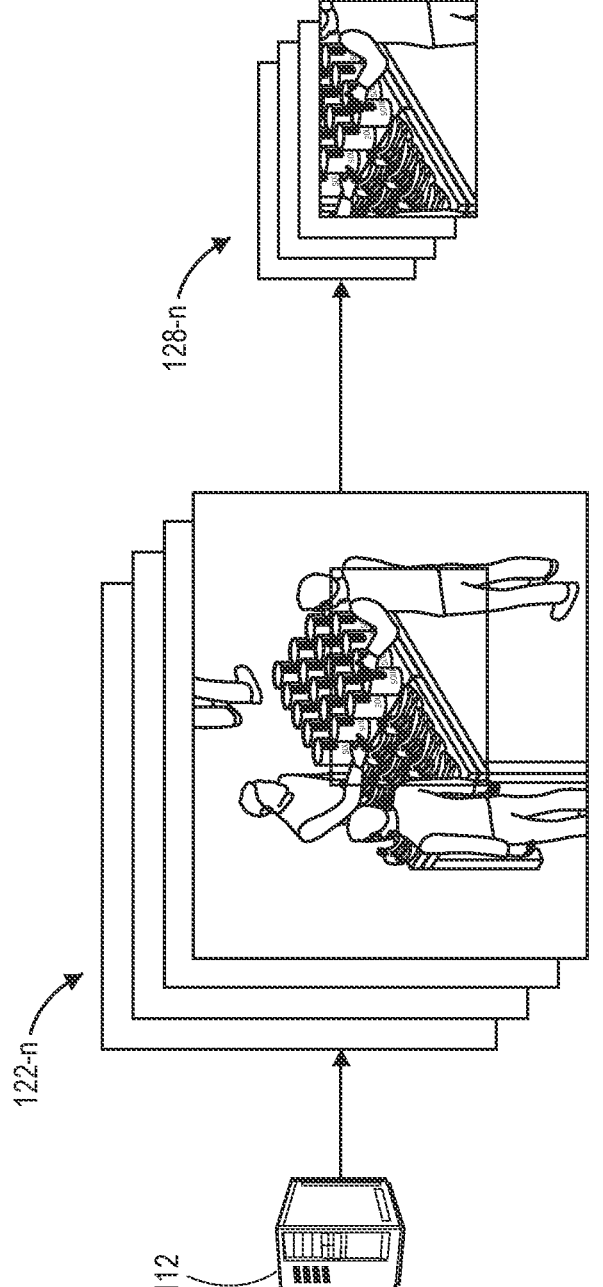

As is shown in FIG. 1F, a set of images 128-n may be generated by cropping each of the images 122-n about the cropping window. Moreover, although the images 128-n are shown as having been cropped from the images 122-n on a single occasion, e.g., for a single actor 180, those of ordinary skill in the pertinent arts will recognize that any images captured by the camera 120 may be processed and cropped in any number of instances, including at least once for each actor depicted therein. Alternatively, the images 122-n need not be cropped or masked at all, and may be processed in their entirety, in accordance with some implementations of the present disclosure.

Figure 1G:
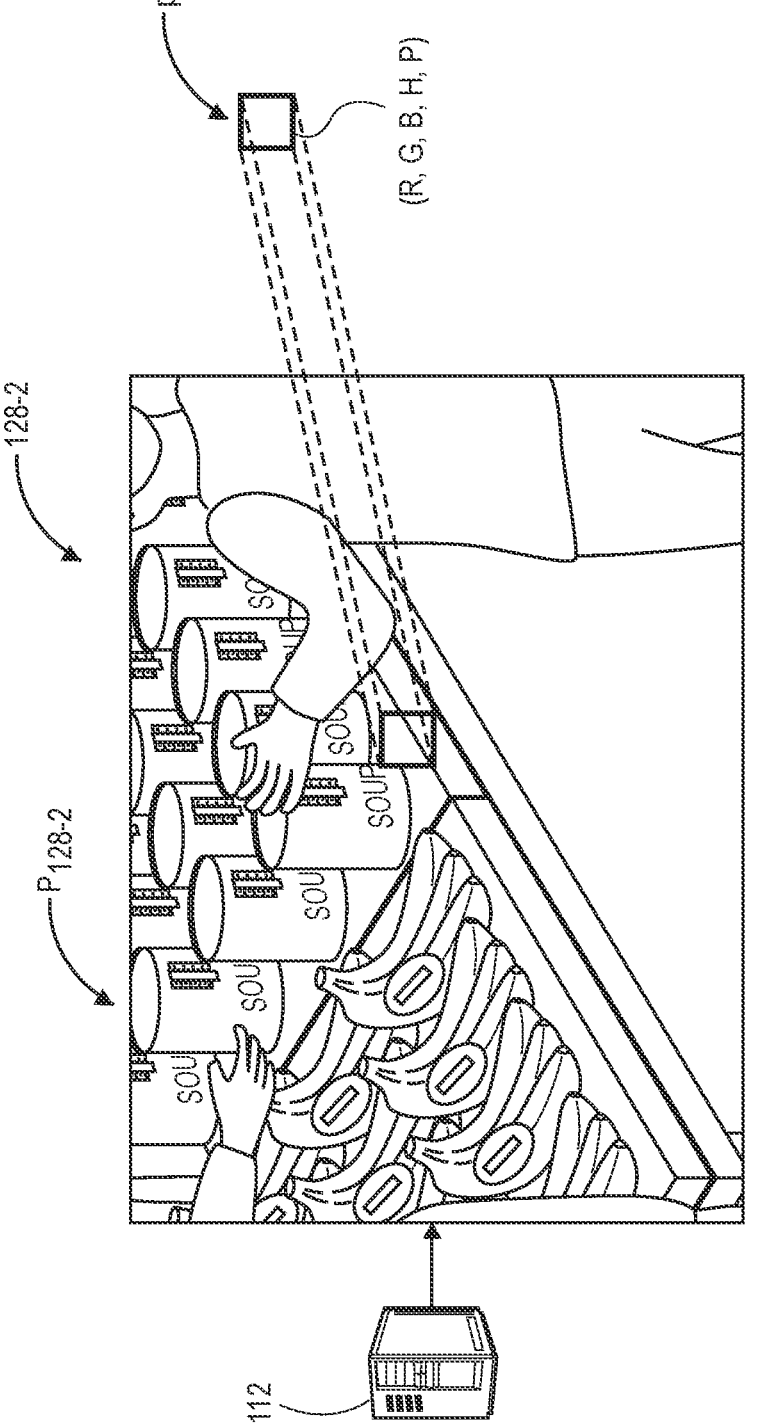

Images may also be masked, layered or stacked to include information or data regarding their contents, which may be incorporated into such images or data structures representing such images. For example, as is shown in FIG. 1G, a cropped image 128-2 derived from the image 122-2 includes a plurality of pixels $P_{128\text{-}2}$ in a multi-channel (e.g., five-channel) form, such that each of the pixels p includes channels corresponding to a color red (or "R"), a color green (or "G") and a color blue (or "B") of the pixel p, respectively, as well as a channel indicating whether the pixel p depicts a portion of a hand (or "H") and a channel indicating whether the pixel p depicts a portion of a product or item (or "P"), or is represented as (R, G, B, H, P). In some implementations, the channels R, G, B corresponding to the colors red, green or blue of the pixel p have any value or are provided according to any standard. In some implementations, the channels H, P indicating whether the pixel p depicts a portion of a hand or a portion of a product (or item) may be binary in nature, such as having a first value indicating that the pixel p depicts a portion of a hand or a product, or a second value indicating that the pixel p does not depict any portion of a hand or a product, e.g., values of one or zero, or any other values.

Figure 1H:
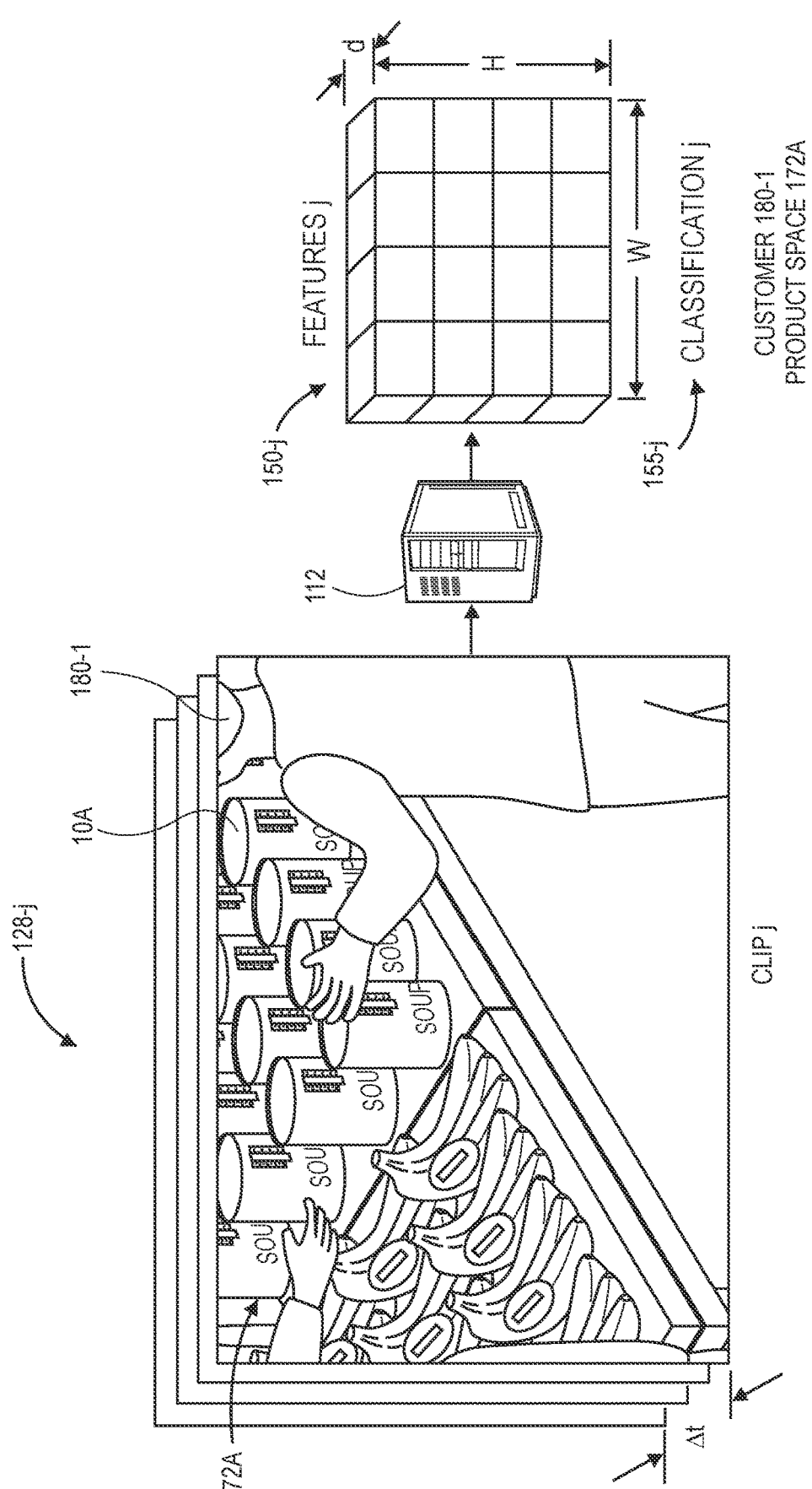

In accordance with implementations of the present disclosure, clips or other sets of images (e.g., cropped and masked, layered or stacked images) that are captured or generated by the system 112 may be defined to include any number of such images, or images captured over a period of any duration. The clips or sets of the cropped images may be processed to determine features of the images of such clips, and to classify whether such clips depict any action by an actor depicted therein. As is shown in FIG. 1H, a clip of cropped images 128-j is shown. The images 128-j of the clip include multi-channel images (e.g., five-channel images) derived from the images 122-n captured by the system 112 over a period of time (or interval) At that have been cropped and centered about the center point c, such as is shown in FIG. 1C.

As is shown in FIG. 1H, the cropped images 128-j of the clip shown in FIG. 1H may be provided to a model (e.g., a machine learning model) operated or executed by one or more processor units of the system 112, that is trained to generate sets of spatial-temporal features 150-j (or embeddings) from the cropped images 128-j with respect to actors and their body parts (e.g., hands), and product spaces or items associated with the product spaces, and to determine or predict classifications 155-j as to whether the cropped images 128-j depict one or more actions (e.g., a taking or picking event, or a return or deposit event) by the actor 180-1 represented therein with any of the product spaces, or whether such images do not depict any of such actions. For example, in some implementations, in determining or predicting the classifications 155-j, the model may calculate scores representing probabilities or likelihoods that a cropped image or a portion thereof (e.g., one or more pixels) depicts one or more actions. For example, the model may calculate, for each image, a first score representing a probability or a likelihood that a cropped image or a portion thereof depicts a taking or picking event, a second score representing a probability or a likelihood that the cropped image or portion thereof depicts a return or deposit event, and a third score representing a probability or a likelihood that the cropped image or portion thereof depicts no event, or neither a taking or picking event nor a return or deposit event.

In some implementations, the model operating on the system 112 may include a "slow-fast" model, or a dual-model convolutional neural network, as a backbone trained to detect features of images, and may also include a multi-level perceptron network or another model trained to classify any actions depicted within the images. Alternatively, the model operating on the system 112 may take any other form or may operate in any other manner in accordance with implementations of the present disclosure.

The features 150-j of the clip of the cropped images 128-j may have any dimensions, such as a dimension d, a dimension W and a dimension H. In some implementations, the dimension d may correspond to a number of layers or channels of a machine learning model used to derive the features 150-*j* from such images 128-*j*. In some other implementations, the dimensions W and H may be down-sampled or otherwise reduced or adjusted with respect to dimensions of the images 128-*j*.

In some implementations, the system 112 may calculate features or embeddings for clips of images and classify clips of any number of images, e.g., eight images, or any other number of images, that were captured over any interval or duration of time, e.g., one second, or one-and-one-half seconds, or any other interval or duration. Such clips may include every image captured by the system 112 in a series or sequence, or fewer than all of such images, e.g., every other image of the series or sequence, or every third image of the series or sequence, as long as one or more actors is depicted within such images, or otherwise detected within a field of view of the system 112. Furthermore, in some implementations, each of such images may be processed to determine a probability or a likelihood that any of such images depicts any of the actors detected therein executing an event or interaction with one of the product spaces 172A, 172B. In such implementations, features may be calculated for a clip of images with respect to only actors and product spaces for which a probability or a likelihood of interaction is sufficiently high, and not for other actors or other product spaces. Alternatively, features may be calculated for clips, and such clips may be classified, with respect to every actor and every product space depicted therein, regardless of a likelihood or probability that a given actor is executing an event or interaction with any or all of the product spaces.

Features of clips of images captured by the system 112, and classifications of such clips, may be generated in real time or in near-real time. As is shown in FIG. 1I, the system 112 generates a stream of features 150-1 . . . 150-*a* . . . 150-*b* . . . 150-*n* (or embeddings) and corresponding classifications 155-1 . . . 155-*a* . . . 155-*b* . . . 155-*n*, which may be derived with respect to the actor 180-1 and the product space 172A. The stream of features 150-1 . . . 150-*a* . . . 150-*b* . . . 150-*n* may be sets of embeddings or other vectors representative of contents of the images of clips, e.g., portions of the images depicting items, product spaces, or actors (or body parts thereof). The classifications 155-1 . . . 155-*a* . . . 155-*b* . . . 155-*n* may be scores or other indicators as to whether the images from which the respective features 150-1 . . . 150-*a* . . . 150-*b* . . . 150-*n* were derived depict a taking or picking event, a return or deposit event, or no event, e.g., neither a taking or picking event nor a return or deposit event.

For example, as is shown in FIG. 1I, the classifications 155-1 . . . 155-*a* . . . 155-*b* . . . 155-*n* indicate that the features 150-*a* and the features 150-*b* depict or represent taking events involving the actor 180-1 and the product space 172A, and that the features 150-1 and the features 150-*n* do not depict or represent any events. Alternatively, any number of sets of features and classifications may be generated for any actors or product spaces depicted within cropped images of the present disclosure.

Sequences of features of clips that have been classified as depicting an event, e.g., by a clip model, may be generated and processed to determine a shopping hypothesis (or an event hypothesis) from such sequences. For example, a sequence of the features 150-*a* . . . 150-*b* that have been classified as depicting a taking event by the actor 180-1 and the product space 172A as shown in FIG. 1I may be provided as an input to a model (e.g., a transformer model) executed by the system 112. The sequence of the features 150-*a* . . . 150-*b* and the classifications 155-*a* . . . 155-*b* may be defined as having a start time associated with an earliest of the features to have been identified as depicting an event, e.g., the features 150-*a*, and an end time associated with a latest of the features to have been identified as depicting the event, e.g., the features 150-*b*, or after a predetermined number or threshold of consecutive features has been identified as depicting the event.

In some implementations, where scores indicating whether features derived from clips of images depict taking or picking events, return or deposit events, or no events, are calculated, clips may be clustered based on such scores, and sequences may be defined based on clusters of the scores. For example, a sequence may be identified as beginning and ending where scores for one of the events (e.g., one of a taking or a picking event, a return or a deposit event, or no event) exceed a predetermined threshold, or where the one of the events may be identified based on such scores. Moreover, in some implementations, the sequence may be identified as having ended where a predetermined number of consecutive features have been identified as not depicting the event, e.g., the features 150-*n*.

In some implementations, the system 112 may be config-ured to model similarities among various features 150A-a . . . 150A-b of the sequence of clips determined to depict an event involving the actor 180-1 and the product space 172A. In some implementations, where a sequence includes a number of features derived from clips, and wherein each of the features has dimensions of d×H×W, features of the clips may be concatenated and the spatial-temporal dimensions of such features may be flattened to generate feature maps (or activation maps) having dimen-sions of T×(d×H×W). The model may take any form, and may have an architecture including a backbone or a multi-head self-attention module and a feed forward network or any other attributes or components.

Figure 1J:
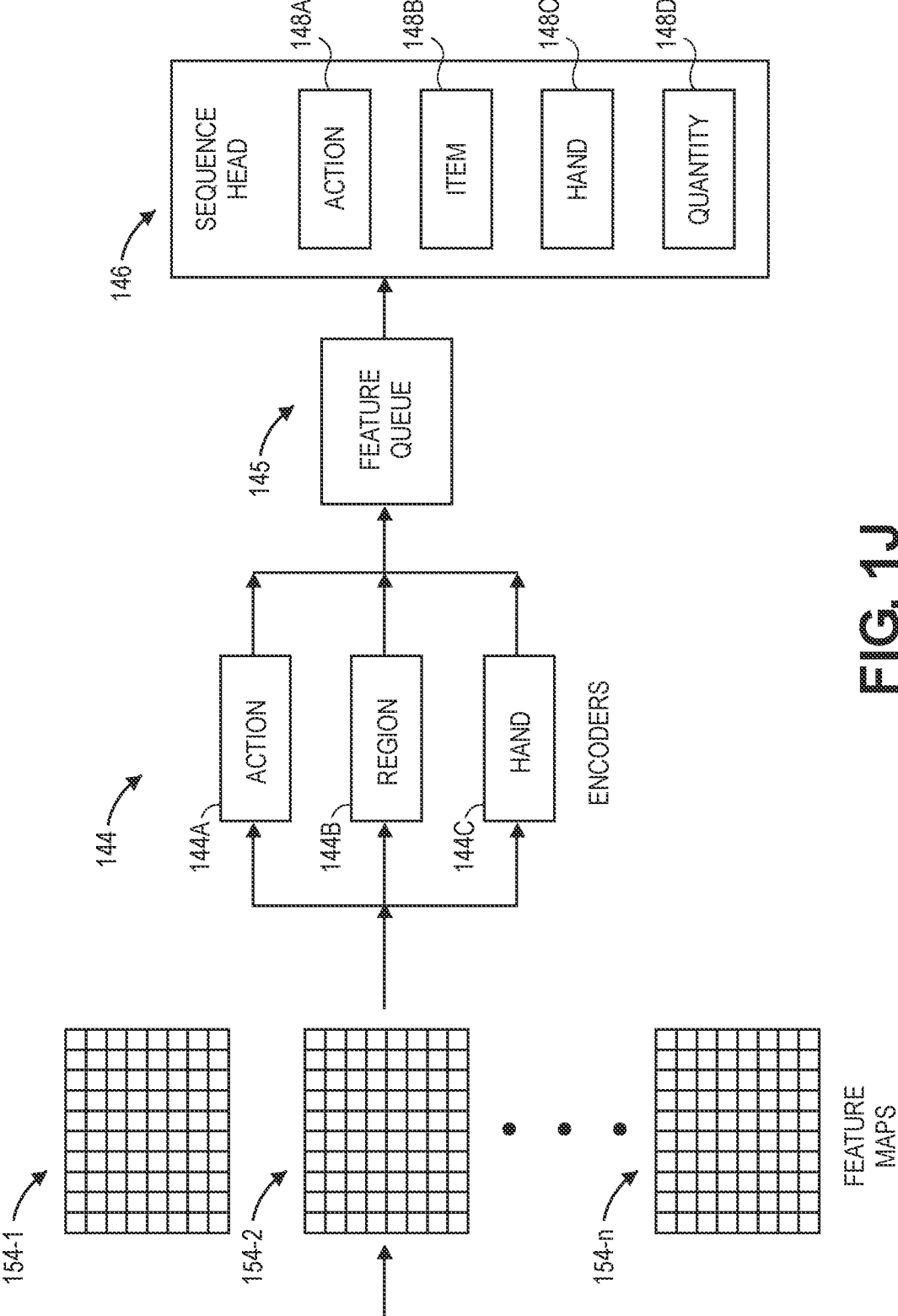

For example, as is shown in FIG. 1J, a plurality of feature maps 154-1, 154-2 . . . 154-*n* (or activation maps) include spatial-temporal features that may have been derived from the sequences of features 150A-a . . . 150A-b of FIG. 1I, and may be representative of semantic meanings of different actions. As is shown in FIG. 1J, the feature maps 154-1, 154-2 . . . 154-*n* may be provided to a set of encoders 144, e.g., an action encoder 144A, a region encoder 144B and a hand encoder 144C, along with positions of one or more hands of the actor 180-1 and any number of hand or product queries. The action encoder 144A may be configured to generate features indicative of whether one of the clips of cropped images represented in the feature maps 154-1, 154-2 . . . 154-*n* depicts a predetermined event or action, as well as scores indicative of a probability that such clips depict such events or actions, which may include, but need not be limited to, takings or picking events, returns or depositing event, or no events at all. The action encoder 144A may further include one or more attention modules for improving accuracy of such determinations for each of the clips.

The region encoder 144B may be configured to encode action features at given locations in response to queries in the form of region masks representing locations, or portions of product spaces that include common items, e.g., the product spaces 172A, 172B. Outputs from the region encoder 144B may include embeddings that are descriptors of events or actions occurring at given locations within such locations, as well as scores indicative of a probability that the clip depicts the events or actions at such locations.

The hand encoder 144C may operate in a manner similar to that of the region encoder 144B, but with trajectories of detected hands within a set of cropped images, rather than region masks, as representations of queries. The hand encoder 144C may generate embeddings that are descriptors of events or actions being performed by a given hand, or for a given hand trajectory, and scores indicative of a probability that such clips depict the hands performing one or more events.

As is further shown in FIG. 1J, the encoders 144A, 144B, 144C may provide embeddings as outputs to a feature queue 145, which may act as a coarse temporal localizer based on the scores indicating whether each of the clips of cropped images represented in the feature maps 154-1, 154-2 . . . 154-n depict an event or an action. Based on such scores, the feature queue 145 may identify a set of the clips depicting a full duration of an event or an action, viz., a sequence corresponding to the event or the action, and provide features derived from clips of the sequence to a sequence head 146.

The sequence head 146 comprises a plurality of heads 148A, 148B, 148C, 148D, which generate outputs for classifying a net change of a sequence of clips, e.g., as an action 148A (e.g., a taking or a picking event, a return or a depositing event, or no event), as well as an item 148B involved in the action 148A, e.g., an item associated with one or more product spaces, a hand 148C involved in the action 148A, and a quantity 148D of the item 148B involved in the action 148A. The sequence head 146 may generate embeddings representing predictions that specific events were executed by the actor 180-1 at product spaces depicted within the images of the clips.

Figure 11:
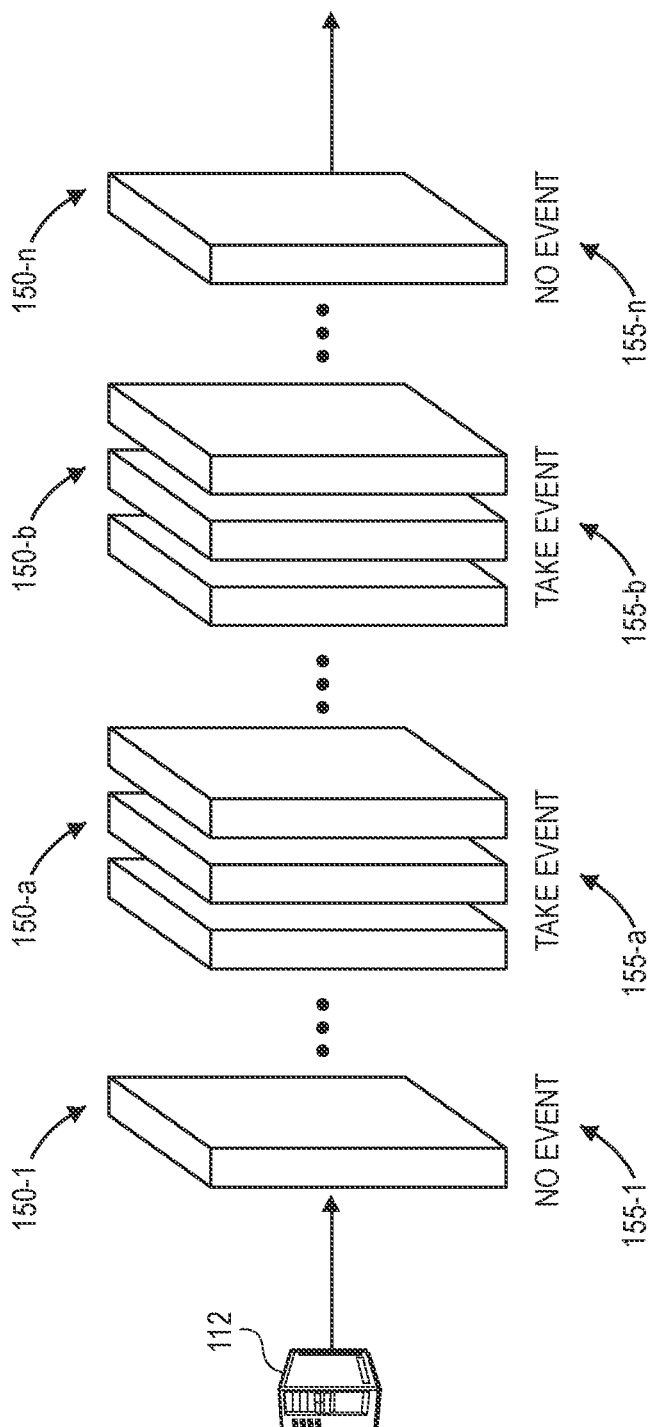
Figure 1K:
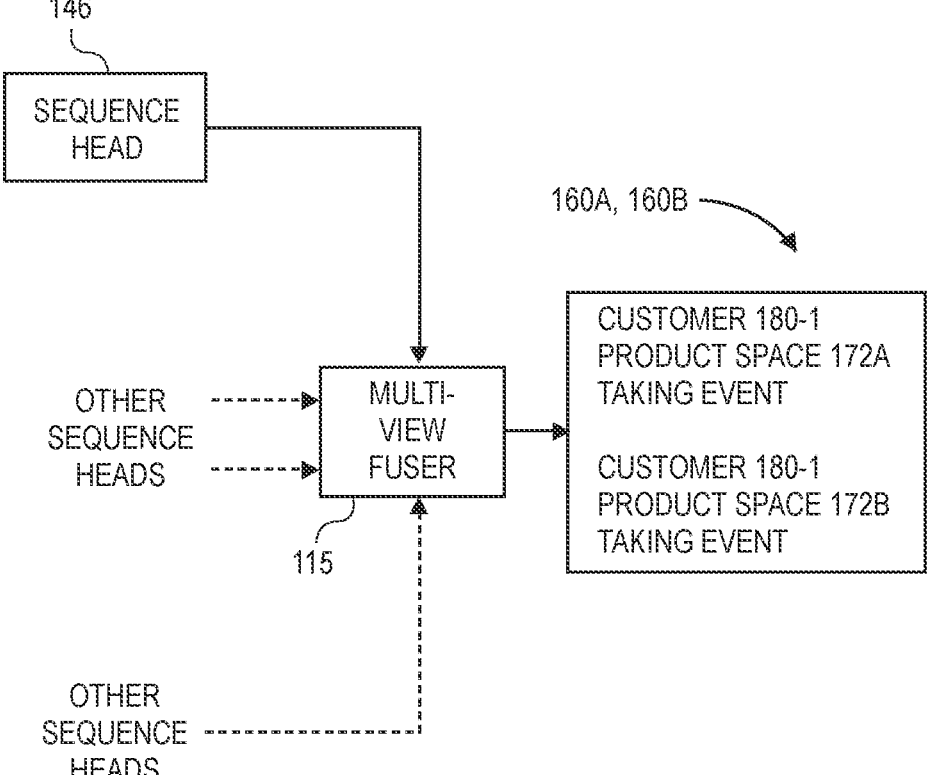

As is shown in FIG. 1K, outputs received from the sequence head 146, viz., embeddings, may be provided to a multi-view fuser module 115 along with other outputs received from other sequence heads (not shown). Such other outputs may have been generated based on inputs provided to such other sequence heads in the same manner described above with respect to FIGS. 11 and 1J, or in any other manner.

The multi-view fuser module 115 may include a machine learning model (e.g., a multi-layer perceptron network) configured to process all embeddings generated based on sequences of features of clips received from a set of cameras including the camera 120, for given product spaces. In some implementations, the multi-view fuser model 115 may further include another machine learning model (e.g., another multi-layer perceptron network) configured to process any item-in-hand features received from cameras including the same product space within their respective fields of view. Alternatively, in some implementations, where a system includes only a single camera, the multi-view fuser module 115 need not be utilized.

Predictions 160A, 160B as to events that were executed by the actor 180-1 at the product spaces 172A, 172B within the field of view of the camera 120, e.g., a hypothesis, or a shopping hypothesis, may be determined based on outputs received from the multi-view fuser module 115. For example, the predictions 160A, 160B may be an embedding, or a set of embeddings, indicating that the actor 180-1 executed a taking event at the product space 172A and a taking event at the product space 172B.

Such predictions 160A, 160B may be processed along with predictions determined based on any other cropped images captured by the camera 120, such as is shown in FIG. 1C, or images captured by any other cameras (not shown), to generate a net change in inventory levels associated with actions of the actor 180-1 at the fixture 170. In some implementations, the system 112 may process embeddings representing the predictions 160A, 160B using one or more machine learning models, such as a multi-level perceptron network, and process the product scores using another machine learning model, e.g., another multi-level perceptron network. Outputs from the respective machine learning models may be further processed to generate the net change in inventory levels associated with actions of the actor 180-1. Additionally, in some implementations, the predictions 160A, 160B or hypotheses may be combined with one or more other predictions or hypotheses, e.g., in a forward continuous manner, to generate a summary of the net change in inventory levels at the scene 110 resulting from actions of the actor 180-1. Similarly, predictions or hypotheses may be generated based on features derived from images for other actors (not shown), and combined to generate summaries of net changes in inventory levels at the scene 110 resulting from actions of such other actors.

Any of the functions, services and/or methods described herein as having been performed or executed by the system 112 may also be performed or executed by one or more processor units provided in association with the camera 120 or other cameras (not shown), or by any other system, and in any other location.

Accordingly, the systems and methods of the present disclosure are directed to detecting events from features that are generated from sequences of clips of images captured using one or more cameras or other imaging devices and dynamically cropped about points determined from points corresponding to product spaces and features of hands or other body parts depicted within such images. Where one or more clips of cropped images are determined to depict an event executed by an actor in association with one or more product spaces of a fixture, features of such clips may be combined into a sequence and processed, e.g., using one or more transformers or other machine learning tools, to predict whether the sequence represents a taking or picking event, a return or a placement event, or no event or action at all. A change in inventory at the fixture may be determined based on such predictions determined from sequences of features derived from clips of cropped images captured using one or more cameras.

In some implementations, images (e.g., visual images) may be captured at a predetermined frame rate, e.g., approximately fifteen frames per second (fps), or any greater or lesser frame rate, and dynamically cropped, as necessary, to include product spaces depicted therein, or to exclude any background features therefrom. For example, in some implementations, the images may be processed according to one or more machine learning algorithms, systems or techniques to predict whether such images depict an interaction (e.g., a taking or picking event, a return or deposit event, or no event) with one or more product spaces of a materials handling facility that are depicted within such images. Images that are determined to not likely predict any interactions may be disregarded or need not be considered.

Images that are determined to likely depict one or more of such interactions, however, may be processed to dynamically select portions of such images to be cropped therefrom. In some implementations, where positions of front points or other portions of product spaces that are depicted within images are known, and body parts (e.g., hands) or products are detected within such images, scores representative of overlaps of such body parts or products with the front points associated with each of such product spaces may be calculated. The scores may then be used to calculate a center point (or a cropping point) from which a cropped portion of an image may be defined. Once the cropped portions of a plurality of images are identified, the cropped portions may be provided to one or more models in accordance with implementations of the present disclosure.

The cropped portions may have any dimensions, and such dimensions may be selected on any basis. For example, where images captured by one or more imaging devices have resolutions consistent with a VGA standard, viz., 640×480 pixels (or a total of 307,200 pixels), a cropping window may have dimensions of 160×160 pixels (or a total of 25,600 pixels), and may be centered on a center point calculated based on scores representative of overlaps of body parts or products with front points of product spaces appearing within the images. By dynamically cropping images in accordance with implementations of the present disclosure, substantial reductions in amounts of data to be processed in order to determine whether any interactions have occurred, or to identify actors or products involved in such interactions, may be realized: for example, where an image having dimensions of 640×480 pixels is cropped to a size of 160×160 pixels, an amount of data that must be processed is reduced by a factor of twelve-to-one, such that only approximately eight percent of the original image need be processed.

In some other implementations, segments or portions of each image that depicts one or more body parts of actors (e.g., customers, workers, associates or other humans) may be identified, and the images may be masked, layered or stacked to include identifiers of locations of hands or other body parts, or any items within such hands, which may be tracked from image to image. Additionally, in some other implementations, images captured by cameras may be processed to determine a probability or likelihood that an actor (e.g., a customer) has executed an interaction with one or more product spaces of storage units depicted within such images.

Images may be masked, layered or stacked to include information or data regarding their contents, which may be incorporated into such images or data structures representing such images. For example, images may be modified into a multi-channel (e.g., five-channel) form, such that each pixel of an image includes channels corresponding to colors, e.g., a color red, a color green, and a color blue, as well as channels indicating whether the pixels depict portions of hands or portions of products or items. Alternatively, the multi-channel images may include any number of channels corresponding to colors, e.g., four, where the images are generated according to the cyan-magenta-yellow-black (or "CMYK") standard, as well as any number of channels corresponding to any number of masks or other features, e.g., portions of product spaces.

A clip (or a set) of images (e.g., multi-channel images, such as five-channel images, including channels for colors red, green and blue, as well as masks for hands or products) may be defined for a given actor and a given product space, and may include a predetermined number of the images captured in series, or images captured in series over a predetermined interval of time.

Images of a clip or set may be processed to extract spatial-temporal features regarding such images, and to predict whether the clip or set depicts an event that occurred at a time associated with the clip or set. In some implementations, features may be extracted from images of a clip or set by providing the images as inputs to a model having a dual-model convolutional neural network, as a backbone, as well as various encoders of features, a queue for such features, and sequence heads for processing features for sequences of such clips or sets. A set of features of the clip or set may be determined based on outputs received in response to the inputs. In some implementations, the clip or set of images may be classified to determine whether the clip or set of images depicts an event, e.g., a taking or picking event, a return or deposit event, or no event, by a multi-level perceptron network, or any other model.

Clips or sets of images that are processed to determine features therefrom may include any number of images captured over any period of time. Moreover, such clips or sets may overlap one another in time, such that images captured by a camera may be included in multiple clips or sets. Additionally, in some implementations, a sequence of features may be generated from multiple clips or sets of images that are determined to depict events. For example, where a clip or set is determined to depict an event, a time associated with the clip or set may be determined to be a start time of the event, and a sequence may be initially defined to include features determined from the clip or set. Subsequently captured clips or sets of images that are also determined to depict the event may be identified, and features determined for such clips or sets may be added to the sequence, until a predetermined number (e.g., one or more) of subsequently captured clips or sets of images are determined to not depict the event, and features determined for such clips or sets are not added to the sequence. A time associated with a final clip or set of a sequence may be determined to be an end time of the event. Alternatively, an end time of an event may be determined to be a time associated with a predetermined number of consecutive clips or sets that are determined to depict the event.

In some implementations, sequences of features generated from clips or sets of images may be provided to a machine learning model that is trained to generate a hypothesis as to whether such clips or sets of images depict any shopping events. In some implementations, a machine learning model may include an encoder that is configured to model similarities among all clip-level features of a sequence. For example, where a sequence includes features determined from a predetermined number of clips, with each of the features having a fixed set of spatial-temporal dimensions, the features of the sequence may be concatenated and flattened to a single dimension and a two-dimensional feature map may be generated accordingly. In some implementations, an encoder may include a standard architecture having a module (e.g., a multi-head self-attention module) and a feedforward network. Alternatively, the model may include an encoder having any other architecture or construction.

In some implementations, a machine learning model may further include a decoder that is configured to receive inputs including any number of learned positional embeddings, e.g., queries, such as product space queries, lane queries, or other queries, for each of the product spaces as well as feature maps generated by the encoder. Based on such inputs, a decoder may generate action features for each of the product spaces that may then be decoded independently into a set of embeddings representing predictions for each of such product spaces.

The machine learning model may be configured to generate multiple pairs of event types (e.g., taking or picking events, return or deposit events, or no events) and event locations (e.g., product spaces identified as associated with the events). The machine learning model may use self-attention and encoder-decoder attention over feature embeddings (e.g., features of clips) and positional embeddings to consider all actions and product spaces together, and to interpret an entire sequence of features in context. For example, in some implementations, an encoder of a machine learning model may model similarities over all of the clip features of a common sequence, and concatenate each of the clip features of a sequence and flatten the spatial and temporal dimensions of the concatenated clip features to generate a feature map having a size defined by dimensions of the clip features and a number of the sets of clip features in the sequence. In some implementations, an encoder of a machine learning model may have a plurality of layers, each with a standard architecture including a multi-head self-attention module and a feedforward network, or any other architecture.

A machine learning model may further include a decoder configured to receive outputs from an encoder, in the form of two-dimensional feature maps, and a plurality of positional embeddings, e.g., product space queries, or lane queries, or other queries. Based on the feature maps and the positional embeddings, as well as positions of each of the hands of actors represented in the sequence, a decoder may generate location-specific event features for each of the product spaces, and decode such event features into classification labels, e.g., a taking or picking event from a first product space, or a return or deposit event at a second product space. Alternatively, or additionally, another query may represent a quantity of items associated with each of the represented events.

In some implementations, sets of embeddings generated for sequences of clips of images captured by one or more cameras may be aggregated along with information regarding items detected within hands of actors in images captured by such cameras to determine a prediction or a hypothesis of shopping events for a given actor at each of the product spaces, e.g., by fusing sequences of features corresponding to common events depicted within images captured by multiple cameras, as necessary. Moreover, in some implementations, net quantities of items associated with multiple events may be determined for individual actors, and the net quantities may be associated with the respective actors accordingly.

For example, where a prediction or hypothesis indicates that an actor has executed one or more shopping events or other interactions at product spaces of storage units, information or data (e.g., planogram data) associating the storage units with one or more inventory items, as well as a number of items determined to be within such hands prior to or after the shopping events or interactions, and identities of any of such items, may be used to update a record associated with the actor.

In some implementations, cameras may be configured to capture visual imaging data at relatively high levels of resolution, or with any number of pixels per image or pixel densities, and at relatively high frame rates. In some implementations, a camera may be configured to capture a predetermined number of images over an interval of time, e.g., fifteen frames per second, and such images may be processed to generate features at the same or a different frequency or interval, e.g., once per second. Furthermore, in some implementations, where hands or other body parts are detected within one or more images, such images may be programmed or otherwise configured to crop portions of the images depicting hands and process the cropped portions to determine a number of items within such hands, or to identify any such items. Numbers or identities of items within hands may be included in a hypothesis determined from such features.

Images captured by any number of cameras may be processed according to one or more machine learning systems to detect and locate body parts or other objects within images, and generate maps, positions or other representations of such body parts in 3D space from such images. Each of such images may be further processed to crop or otherwise isolate portions of such images depicting hands, and to determine whether the hands depicted therein contain any items (e.g., whether the hands are empty or full), or to identify any items within the hands.

In some implementations, one or more processors or processor units provided on computer devices or systems in communication with a camera, or provided on the camera itself, may execute machine learning models (e.g., algorithms, systems or techniques such as artificial neural networks, including but not limited to convolutional neural networks) that are trained to receive images captured by the camera as inputs and to generate one or more outputs associated with tasks relating to the images. Such tasks may include the detection of body parts (e.g., hands, heads, shoulders or others) within images, the identification of portions or segments of images depicting such body parts or the analysis of such portions or segments to determine whether any of such body parts includes an item, or the calculation of distances between body parts and locations of items. The models may have any number of layers associated with the performance of such tasks, or others.

In some implementations, one or more computer devices or systems may be configured to operate machine learning models that are trained to perform multiple tasks based on a single input. For example, in some implementations, a computer device or system, or a camera, may execute a model that performs body part detection, cropping or isolation, object recognition, or other tasks based on each visual images captured thereby. The model may be constructed with a common, shared backbone and with one or more separate decoding layers, task layers, middle layers, or others. In some implementations, a model may be a convolutional neural network having one or more layers dedicated to the performance of each of a plurality of tasks, e.g., in a common architecture.

Those of ordinary skill in the pertinent arts will recognize that imaging data, e.g., visual imaging data, depth imaging data, infrared imaging data, or imaging data of any other type or form, may be captured using one or more imaging devices such as digital cameras, depth sensors, range cameras, infrared cameras or radiographic cameras. Such devices generally operate by capturing light that is scattered or reflected from objects, and by subsequently calculating or assigning one or more quantitative values to aspects of the scattered or reflected light, e.g., image pixels, then generating an output based on such values, and storing such values in one or more data stores. For example, a camera may include one or more image sensors (e.g., a photosensitive surface with a plurality of pixel sensors provided thereon), having one or more filters associated therewith. Such sensors may detect information regarding aspects of any number of image pixels of the scattered or reflected light corresponding to one or more base colors (e.g., red, green or blue), or distances to objects from which the light was scattered or reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network such as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBD or RGBz imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Scattered or reflected light may be captured or detected by an imaging device if the light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is scattered or reflected off objects of any kind to a sufficiently high degree of resolution using one or more sensors thereof, and store information regarding the scattered or reflected light in one or more data files.

Many imaging devices also include manual or automatic features for modifying their respective fields of view or orientations. For example, a camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a camera may virtually stretch or condense the pixels of an image in order to focus or broaden the field of view of the camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures, outlines or other aspects of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more machine learning models (e.g., algorithms, systems or techniques). The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which detecting events is desired, including but not limited to events involving humans or machines and any other objects. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to locate body parts of human operators (e.g., customers, workers or other personnel) and/or component parts of machines (e.g., autonomous mobile robots) and to recognize interactions involving such humans or machines within a materials handling facility, including but not limited to interactions with one or more items (e.g., consumer goods) or other inanimate objects within the materials handling facility. Such systems and methods may also be utilized to locate objects within transportation centers, financial institutions or like structures in which diverse collections of people, objects or machines enter and exit from such environments at regular or irregular times or on predictable or unpredictable schedules. By relying on multiple imaging devices, motion of an object may be located even when the object is occluded in one or more of the fields of view of the imaging devices. Moreover, as used herein, the term "machine learning model" or like terms, may include, but is not limited to, any type or form of machine learning algorithm, system, technique, method, operations, or tool, in a physical or a virtual form, and need not be limited to discrete hardware systems provided for such purposes.

Figure 2A:
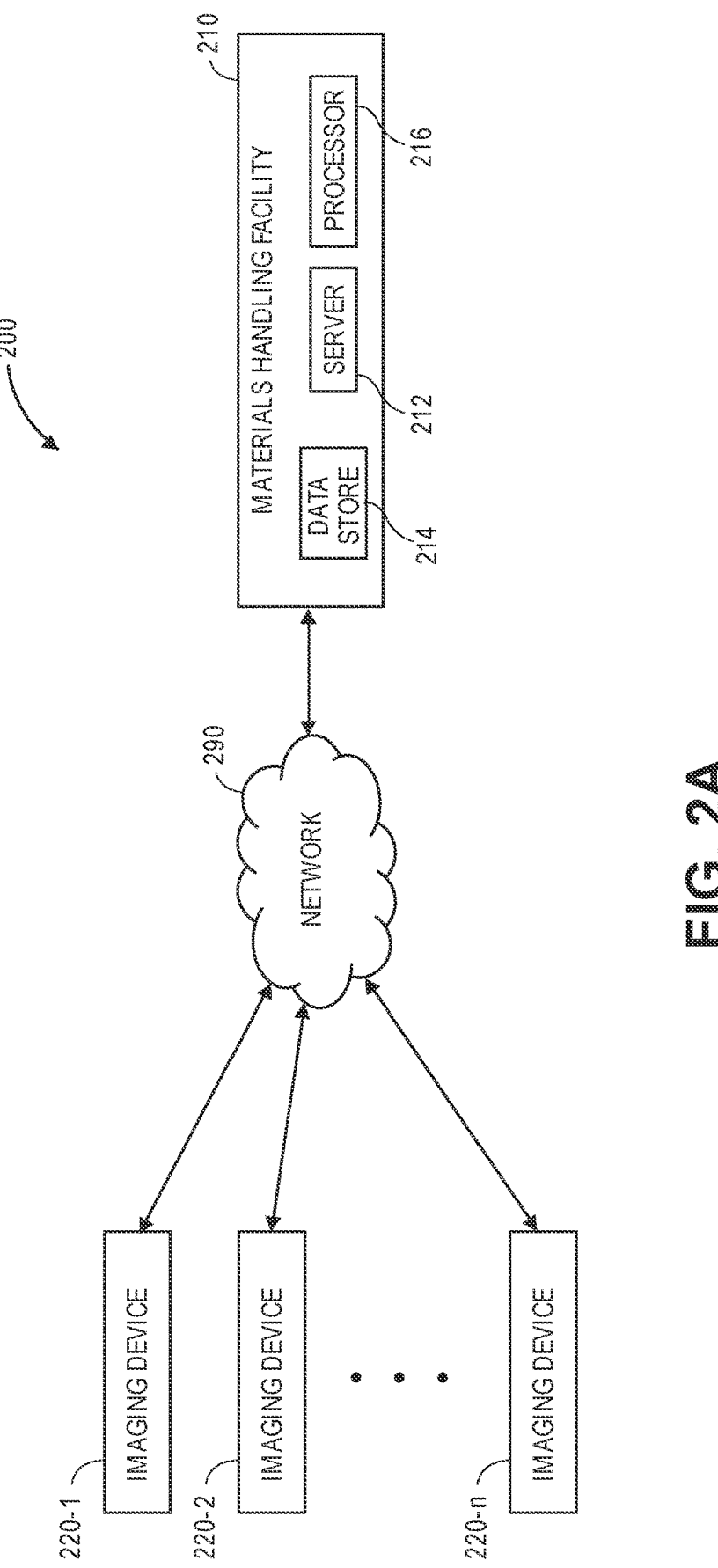
FIGS. 2A and 2B are block diagrams of components of one system for detecting events in accordance with implementations of the present disclosure.
Figure 2B:
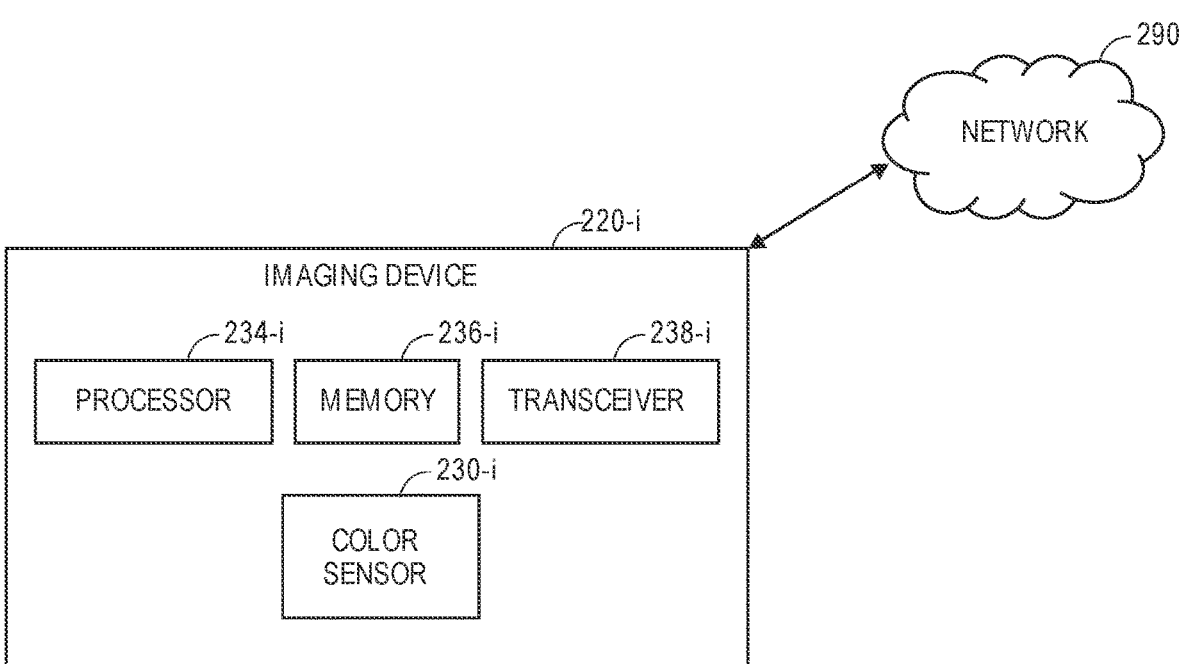

Referring to FIGS. 2A and 2B, a block diagram of components of one system 200 for detecting interactions in accordance with implementations of the present disclosure is shown.

The system 200 includes a materials handling facility 210 and a plurality of imaging devices 220-1, 220-2 . . . 220-$n$ that are connected to one another across a network 290, which may include the Internet in whole or in part. Except where otherwise noted, reference numerals preceded by the number "2" shown in FIG. 2A or 2B indicate components or features that are similar to components or features having reference numerals preceded by the number "1" shown in FIGS. 1A through 1K.

The materials handling facility 210 may be any facility that is adapted to receive, store, process and/or distribute items from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 210, inventory items that are listed in the request or order, or are desired by the user, may be selected or "picked" from an inventory area at the materials handling facility 210. For example, in one implementation, a customer or other user may travel through the materials handling facility 210 with a list (e.g., a paper list, or a handheld mobile device displaying or including such a list) and may pick one or more of the inventory items from an inventory area at the materials handling facility 210. In other implementations, an employee of the materials handling facility 210 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage unit) in an inventory area, moved a distance, and placed at a second location (e.g., a second inventory shelf or other storage unit) in the inventory area.

As is shown in FIG. 2A, the materials handling facility 210 includes a networked computer infrastructure for performing various computer-related functions associated with the receipt, storage, processing and distribution of such items, including one or more physical computer servers 212, data stores (e.g., databases) 214 and/or processors 216, that may be provided in the same physical location as the materials handling facility 210, or in one or more alternate or virtual locations, e.g., in a "cloud"-based environment. In some implementations, the servers 212, the data stores 214 and/or the processors 216 or any number of other computing devices or resources may further execute any type of computer-based function or compute any type or form of calculation, including but not limited to any formulas, equations, algorithms or techniques for determining one or more probabilities or performing any number of statistical tests.

In some implementations, the servers 212, the data stores 214 and/or the processors 216 may be configured to execute one or more machine learning systems or techniques. For example, in some implementations, the servers 212 may be configured to execute an artificial neural network, such a convolutional neural network, to process imaging data received from one or more of the imaging devices 220-1, 220-2 . . . 220-n over the network 290.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 210 may include one or more inventory areas having predefined two-dimensional or 3D storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2A or FIG. 2B). The materials handling facility 210 may operate one or more order processing and/or communication systems using computer devices or resources in communication with one or more of the servers 212, the data stores 214 and/or the processors 216, or through one or more other computing devices or resources that may be connected to the network 290, in order to transmit or receive information in the form of digital or analog data, or for any other purpose.

The materials handling facility 210 may be associated with a plurality of imaging devices 220-1, 220-2 . . . 220-n

(or other sensors), which may be any form of optical recording device that may be used to photograph or otherwise record imaging data of structures, facilities or items within the materials handling facility 210, or for any other purpose. The imaging devices 220-1, 220-2 . . . 220-n have diverse fields of view of the materials handling facility 210, or other scenes, that are configured to capture imaging data that may be processed to recognize and locate motion, locations and/or orientations of various actors within the materials handling facility 210. The imaging devices 220-1, 220-2 . . . 220-n may be mounted in any specific location or orientation within the materials handling facility 210, e.g., above, below or alongside one or more inventory areas or stations for receiving or distributing items. Alternatively, the imaging devices 220-1, 220-2 . . . 220-n may be provided in any open or enclosed environment or space in which any number of actors (e.g., humans, other animals or machines) may execute one or more poses, gestures or other actions within one or more of their fields of view.

Each of the imaging devices 220-1, 220-2 . . . 220-n shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative one of the imaging devices 220-1, 220-2 . . . 220-n, viz., an imaging device 220-i, includes one or more optical sensors, including color sensors (or grayscale sensors or black-and-white sensors) 230-i configured to capture visual imaging data (e.g., textures) of objects within one or more fields of view of the imaging device 220-i. Optionally, the imaging device 220-i may include any number of depth sensors that are configured to capture depth imaging data (e.g., ranges) to objects within the one or more fields of view of the imaging device 220-i.

The imaging device 220-i further includes one or more processors 234-i, one or more memory components 236-i and one or more transceivers 238-i, and any other components (not shown) that may be required in order to capture, analyze and/or store imaging data from within the materials handling facility 210 environment in which the imaging device 220-i is provided. For example, the imaging device 220-i may capture one or more still or moving images (e.g., streams of visual images or image frames), along with any relevant audio signals or other information (e.g., position data), and may also connect to or otherwise communicate with the servers 212, or any other computer devices within the materials handling facility 210 (not shown), or with one or more external computer devices over the network 290, through the sending and receiving of digital data. In some implementations, the transceiver 238-i may be configured to enable the imaging device 220-i to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 212 or over the network 290 directly.

The processors 234-i may be configured to execute an artificial neural network, such as a convolutional neural network, to process imaging data captured by one or more of the color sensors 230-i. For example, the artificial neural networks executed by the processors 234-i may perform tasks in one or more core areas, including but not limited to person detection, feature extraction, person linking and unlinking. In some implementations, one such neural network may be a neural network backbone (e.g., a residual neural network backbone) that is configured to perform one or more tasks for locating actors based on images captured by the imaging device 220-*i*, including but not limited to one or more of person detection (e.g., head detection), person bounding box generation, instance segmentation, and person locating in 3D space based on visual images (e.g., RGB images). The processors 234-*i* may be configured to execute multi-task networks having shared backbones and one or more decoding layers.

For example, in some implementations, the processors 234-*i* may operate an artificial neural network or other classifier that receives an image (e.g., a visual image, or an RGB image) as an input, and processes the image for one or more person detection (e.g., head detection, bounding box generation, instance segmentation, and line segment estimation) for any number of actors depicted within the image. Based on such detections, visual descriptors of pixels depicting the actors, including but not limited to appearance features of such actors, e.g., sets of information or data identifying colors, textures, shapes or other aspects of features of such actors, may be determined. The processors 234-*i* may also define a trajectory or "tracklet," e.g., a record of the positions of an actor at various times beginning at an initial detection and following with subsequent detections. Trajectories or tracklets and visual descriptors generated by the processors 234-*i* may be used to link detections of actors in consecutively captured frames to one another, or to reidentify a previously detected actor if the actor is not detected for a brief period of time.

In some implementations, the processors 234-*i* may predict a 3D location of an actor by detecting a head within an image and determining or estimating a height of the actor, or a line segment extending between the detected head of the actor and a corresponding location of a floor or other ground surface, within the image (e.g., a two-dimensional line segment), which is aligned along a line extending from the detected head of the actor to a vertical vanishing point to which all vertical lines shown within the image converge. A line segment determined for an actor may be used to determine a 3D position of the actor based on intrinsic properties of the camera and a pose of the actor. The length of the line segment may be predicted upon a detection of a head within the image. In some implementations, the processors 234-*i* may predict a length of the line segment corresponding to an actor based on an output received from an artificial neural network that also detected a head of the actor, and utilize the line segment to determine a 3D location of the actor.

In some implementations, the processors 234-*i* may execute one or more tracking or matching algorithms, e.g., a tracking-by-detection algorithm, or a bipartite matching algorithm, that generates a tracklet-to-detection assignment or a visual descriptors-to-detection assignment over consecutive frames given an edge cost matrix. If a trajectory or tracklet, or visual descriptors of a set of pixels, are not matched to a body part detection (e.g., head detection), the processors 234-*i* may execute one or more optical flow algorithms on successive frames to extend a trajectory or tracklet location into a successively captured frame. Additionally, a confidence classifier may generate a confidence score in a given assignment. Moreover, the processors 234-*i* may change a manner or technique by which a given actor is located from frame to frame. For example, processors 234-*i* may locate actors based on body part detections (e.g., head detections) when such body parts are visible within an image frame, or may alternatively switch to locating via a set of visual descriptors of pixels corresponding to an actor (e.g., a bounding box or instance segmentation), to the extent that the visual descriptors of pixels are consistent from image frame to image frame.

In some implementations, nodes corresponding to body parts detected by the imaging devices 220-1, 220-2 . . . 220-*n* may be represented in space by a set of Cartesian coordinates, or coordinates according to any other system, and an articulated model in the form of a record or vector may include one or more of such sets of coordinates. In some implementations, edges extending between a pair of nodes may be established by reference to each of the nodes of the pair, as well as a linear formula, a linear equation or other representation of points extending between the respective nodes of the pair, and an articulated model in the form of a record or a vector may identify edges by reference to their respective nodes, or include one or more of such formulas, equations or other representations for such edges. For example, detections of body parts may be matched across multiple views in two-dimensional images and converted to 3D rays that begin at optical elements of the respective imaging devices and terminate at surfaces of objects at a given pixel, based on the intrinsic properties of such imaging devices and extrinsic properties of a scene, and merged into one, e.g., by triangulating the rays corresponding to such detections, thereby enabling a body part to be detected and re-detected in the multiple views even if the body part is temporarily occluded in one of the views. The trajectories may be models of smoothed three-dimensional tracks that best fit a plurality of two-dimensional observations of a body part within multiple images. In some implementations, trajectories may be defined by minimizing differences between ray projections extending from optical elements of imaging devices to pixels depicting specific body parts detected within images captured by such imaging devices and splines or other curves defined from such frames, e.g., according to a least squares problem. Any method or technique for defining a 3D track or trajectory of a body part or an actor from two-dimensional observations of the body part or the actor in images may be utilized in accordance with the present disclosure.

Moreover, in some implementations, the processors 234-*i* may combine trajectories or tracklets when corresponding positions are sufficiently proximate to one another and one of the trajectories or tracklets has a sufficiently low level of confidence, or on any other basis.

The imaging devices 220-1, 220-2 . . . 220-*n* may be homogenous or heterogeneous in nature, in accordance with the present disclosure. For example, one or more of the imaging devices 220-1, 220-2 . . . 220-*n* may have both the color sensor 230-*i* and a depth sensor. Alternatively, one or more of the imaging devices 220-1, 220-2 . . . 220-*n* may have just a color sensor 230-*i* (or grayscale sensor or black-and-white sensor). Additionally, one or more of the imaging devices 220-1, 220-2 . . . 220-*n* may be configured to capture visual imaging data, e.g., visual images or images in color, grayscale or black-and-white. In some implementations, one or more of the imaging devices 220-1, 220-2 . . . 220-*n* may also be configured to capture depth imaging data, e.g., distances or ranges to objects within their respective fields of view.

For example, one or more of the imaging devices 220-1, 220-2 . . . 220-*n* may be an RGB color camera, a still camera, a motion capture/video camera or any other type or form of camera. In other implementations, one or more of the imaging devices 220-1, 220-2 . . . 220-*n* may be depth-sensing cameras, such as an RGBz or RGBD camera. In still other implementations, one or more of the imaging devices 220-1, 220-2 . . . 220-*n* may be a thermographic or infrared (IR) camera. Additionally, in some implementations, the imaging devices 220-1, 220-2 . . . 220-n may simply be camera modules that include a lens and an image sensor configured to convert an optical image obtained using the lens of the camera into a digital signal or digital representation of the image (generally referred to herein as imaging data). In one implementation, the image sensor may be an RGB sensor capable of supporting an image resolution of at least 860×480 in an image, and capturing images at a frame rate of at least six frames per second, that may likewise be configured to provide image data to other components (e.g., a graphics processing unit) for processing. In some implementations, the imaging devices 220-1, 220-2 . . . 220-n may be paired to provide stereo imagery and depth information, and may include a pair of camera modules. Additionally, imaging data may be stored in any variety of formats, including but not limited to YUYV, RGB, RAW, .bmp, .jpeg, gif, or the like.

The imaging devices 220-1, 220-2 . . . 220-n may also include manual or automatic features for modifying their respective fields of view or orientations. For example, one or more of the imaging devices 220-1, 220-2 . . . 220-n may be configured in a fixed position, or with a fixed focal length (e.g., fixed-focus lenses) or angular orientation. Alternatively, one or more of the imaging devices 220-1, 220-2 . . . 220-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 220-1, 220-2 . . . 220-n, or changes in one or more of the angles defining the angular orientation.

For example, one or more of the imaging devices 220-1, 220-2 . . . 220-n may be hard-mounted to a support or mounting that maintains the device in a fixed configuration or angle with respect to one, two or three axes. Alternatively, however, one or more of the imaging devices 220-1, 220-2 . . . 220-n may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device. In some implementations, two or more of the imaging devices 220-1, 220-2 . . . 220-n may be provided within a common housing, e.g., a dual camera module housing.

Some of the imaging devices 220-1, 220-2 . . . 220-n may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of the imaging devices 220-1, 220-2 . . . 220-n, e.g., digital cameras, may be affected based on the lighting conditions and characteristics of the scenes in which the imaging devices 220-1, 220-2 . . . 220-n are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the system 200 of FIG. 2A includes boxes corresponding to three imaging devices 220-1, 220-2 . . . 220-n, those of ordinary skill in the pertinent arts will recognize that any number or type of imaging devices may be provided within the materials handling facility 210 in accordance with the present disclosure, including but not limited to digital cameras, infrared cameras, radiographic cameras or other devices having one or more optical sensors. In some implementations, the system 200 (e.g., the materials handling facility 210) may include dozens or even hundreds of imaging devices of any type or form. Moreover, the system 200 (e.g., the materials handling facility 210) may also include any other type of sensing systems for detecting actors and recognizing their motion, locations and/or orientations within the materials handling facility 210. Such sensors may include, but are not limited to, one or more load or weight sensors provided on walking or traveling surfaces within the materials handling facility 210, one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. The type or form of sensors that may gather information or data regarding actors and their motion, locations and/or orientations at the materials handling facility 210 are not limited.

The materials handling facility 210 may also include any number of other sensors, components or other features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as one or more workers, who may be any designated personnel tasked with performing one or more tasks within the materials handling facility 210 in general, or within one or more inventory areas, receiving stations, distribution stations or other locations of the materials handling facility 210 in particular. Such workers may handle or transport items (e.g., any type or form of good, product, media or other tangible consumer article) within the materials handling facility 210, or operate one or more pieces of equipment therein (not shown). Such workers may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the servers 212, with one or more of the imaging devices 220-1, 220-2 . . . 220-n, or with one or more computer devices or resources, such as the servers 212, over the network 290, as well as a display (e.g., a touchscreen display) to facilitate the visible presentation to and interaction with a human operator.

The servers 212 or any other computer devices associated with the materials handling facility 210 or connected to the network 290 may execute one or more multi-camera tracking algorithms or techniques. For example, in some implementations, the imaging devices 220-1, 220-2 . . . 220-n may provide their respectively determined trajectories or tracklets of actors and visual descriptors of pixels of images (e.g., appearance features, motion properties and geometry) depicting the actors to the server 212. Additionally, the server 212 may map single-camera trajectories or tracklets to positions in 3D space based on their respective predicted 3D line segments and their corresponding appearance features, motion properties and geometry in 3D space for the respective trajectories or tracklets. The server 212 may then correlate or merge trajectories or tracklets received from multiple ones of the imaging devices 220-1, 220-2 . . . 220-n into multi-camera trajectories or tracklets, and assign identifiers to the respectively correlated or merged trajectories or tracklets.

The servers 212 may further associate any multi-camera trajectories or tracklets with identifiers of actors within the materials handling facility 210 in any manner. For example, a unique identifier may be assigned to each multi-camera trajectory or tracklet, e.g., and such multi-camera trajectories or tracklets may be tracked based on single-camera trajectories or tracklets, and visual descriptors, received from the respective imaging devices 220-1, 220-2. 220-n.

In some implementations, the system 200 may further include one or more event generator systems comprising sensors that are provided in one or more select locations within the materials handling facility 210. Each of such sensors may be configured to detect information or data from which a location at which an event has occurred, or a time (or duration) of the event, e.g., an interval of time that includes the time of the event. In some implementations, an item associated with an event may be identified based on the location and/or the time (or duration) of the event based on planogram data, which may indicate the placement of one or more items in inventory areas or storage units within the materials handling facility 210.

For example, one or more of such sensors may be an imaging device configured to capture imaging data regarding an inventory area and/or storage unit, e.g., one or more of the imaging devices 220-1, 220-2 . . . 220-n, and whether an event has occurred, and a time of such an event, may be determined based on such imaging data. One or more of such sensors may include load or weight sensors provided in association with an inventory area or storage unit, and whether an event has occurred, and a time of such an event, may be determined based on load signals received from such load or weight sensors or, alternatively, changes in load signals indicating increases or decreases in loading applied to the inventory area or storage unit. An item associated with such an event may be determined based on one or more magnitudes of such changes. For example, when an actor is determined to have accessed an inventory area or shelving unit to retrieve an item therefrom at a specific location, and a number of items are located within a vicinity of the specific location, a change in the mass of all of the items present on the shelf may be determined, and one of the items within the vicinity of the specific location having a mass consistent with the determined change in the mass of all of the items present on the shelf may be presumed to have been retrieved by the actor.

Alternatively, one or more of such sensors may include RFID components (e.g., antennas or tags) for transmitting and/or receiving RFID signals associated with items or inventory areas and/or storage units, and whether an event has occurred, and a time of such an event, may be determined based on the receipt of such signals, or the loss of such signals. An item associated with such an event may be determined based on the respective RFID signals that are transmitted or received, or are no longer received. As another alternative, one or more of such sensors may include one or more LIDAR components for transmitting and/or receiving one or more light signals in association with inventory areas and/or storage units, and whether an event has occurred, and a time of such an event, may be determined based on the light signals that are transmitted or received.

The type or form of such sensors provided in association with an event generator system are not limited. Moreover, one of the sensors may be in communication with a central processor or server of an event generator system that may receive information or data from such sensors, and provide such information or data (e.g., digital and/or analog data) to one or more other computing devices or resources that may be connected to the network 290, or for any other purpose. Alternatively, one or more of such sensors may be outfitted with processors and/or transceivers for independently transmitting or receiving information or data (e.g., digital and/or analog data) to or from one or more other computing devices or resources that may be connected to the network 290, or for any other purpose.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "materials handling facility," a "camera," a "system," an "actor" (or "customer," or "user," or "worker," or "human operator") or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," a "camera," a "system," an "actor" (or "customer," or "user," or "worker," or "human operator") may be typically performed by a human, but could, alternatively, be performed by an automated agent.

The materials handling facility 210 (or any actors associated therewith) and/or the imaging devices 220-1, 220-2 . . . 220-n may use any web-enabled or Internet applications or features, any other client-server applications or features, or other messaging techniques, to connect to the network 290 or to communicate with one another. For example, the servers 212 may be adapted to transmit or receive information or data in the form of synchronous or asynchronous messages to or from the imaging devices 220-1, 220-2 . . . 220-n, or any other computer device (e.g., any device having any number of other servers, data stores, processors or the like) in real time or in near-real time, or in one or more offline processes, via the network 290. Those of ordinary skill in the pertinent art would recognize that the materials handling facility 210 (or any actors associated therewith) or the imaging devices 220-1, 220-2 . . . 220-n may include or operate any of a number of computing devices or resources that are capable of communicating over the network 290, including but not limited to set-top boxes, personal digital assistants, digital media players, mobile devices (e.g., smartphones), tablet computers, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a transitory and/or non-transitory computer-readable medium that is within or accessible by computers or computer components such as the servers 212, the data stores 214, the processor 216, the imaging devices 220-1, 220-2 . . . 220-n, the processor 234-i, or any other computers or control systems having sequences of instructions which, when executed by a processor (e.g., a central processing unit, or "CPU," or a graphics processing unit, or "GPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Figure 3A:
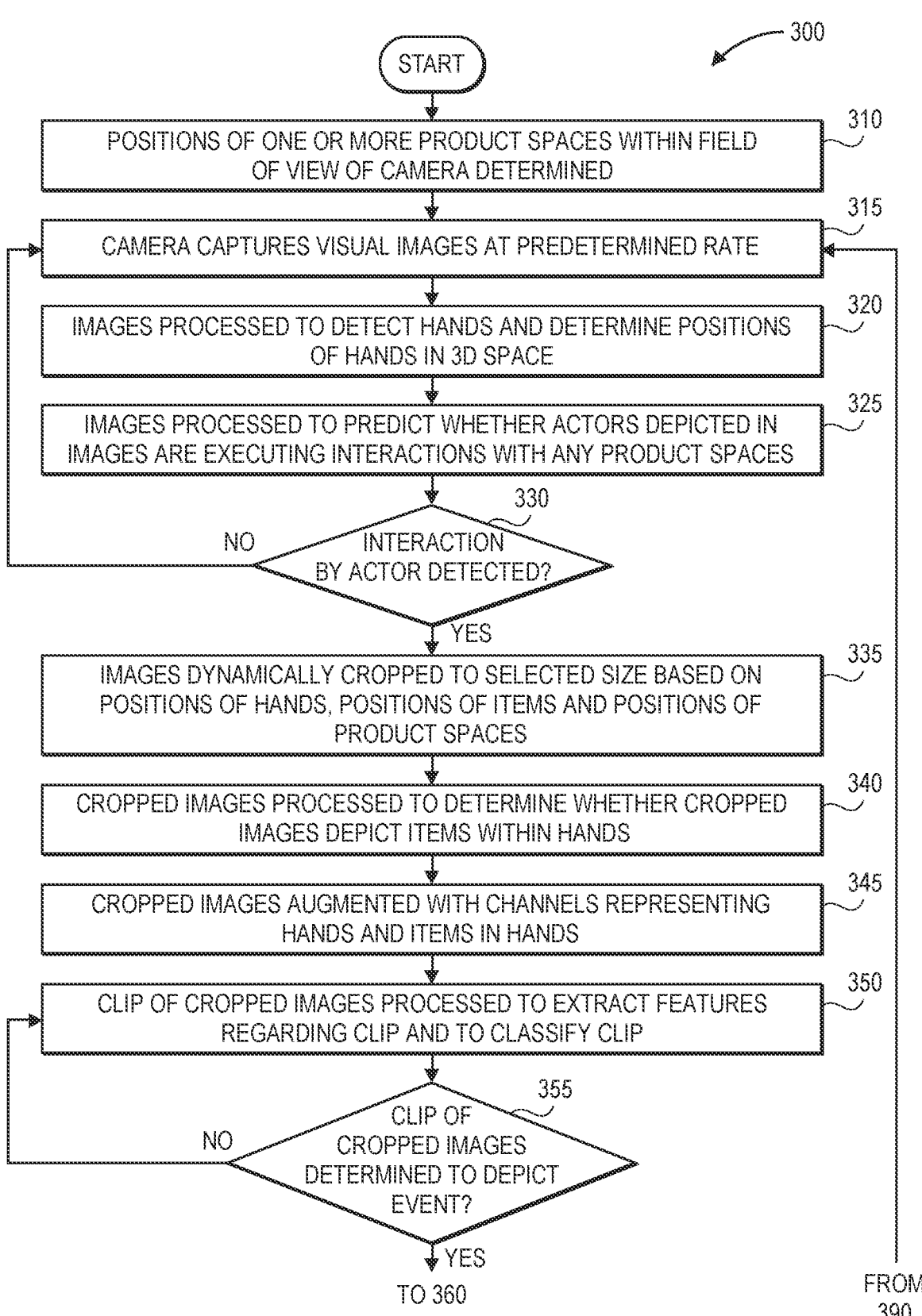
FIGS. 3A and 3B are a flow chart of one process for detecting events in accordance with implementations of the present disclosure.
Figure 3B:
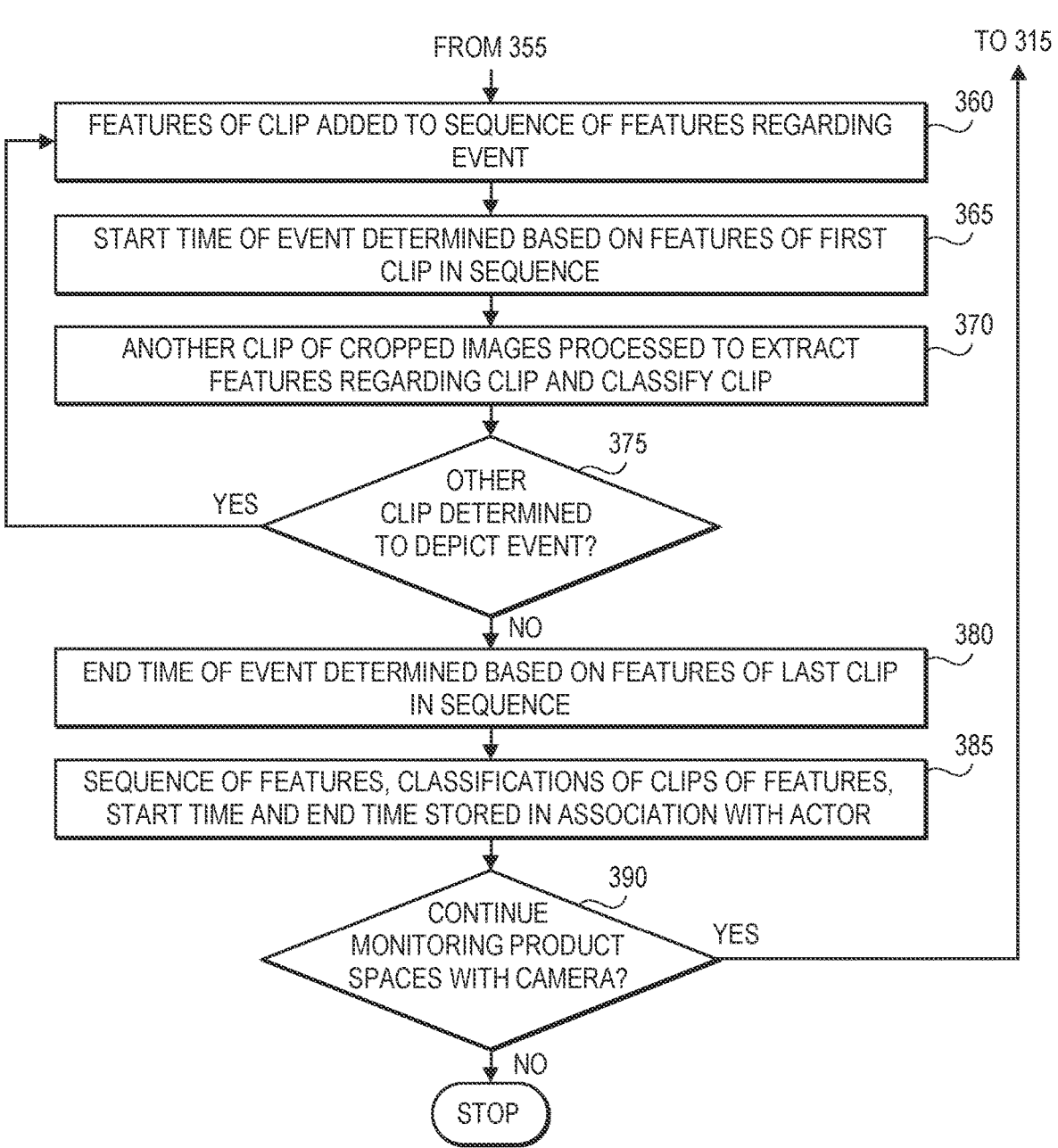

Referring to FIGS. 3A and 3B, a flow chart 300 of one process for detecting interactions in accordance with implementations of the present disclosure is shown. At box 310, positions of one or more product spaces within a field of view of a camera are determined. For example, the camera may be mounted to include a fixture such as a physical structure for storing one or more items, or sets of items, thereon or therein. In some implementations, the fixture may include any number of product spaces or other storage units, e.g., sets or racks of shelves or platforms having items of various types or kinds provided in specific locations thereon, such as one or more lanes or other portions or sections of such shelves or other platforms. The fixture may be provided in a discrete location of a materials handling facility, such as along or adjacent to one or more walls, or independently within or near walking or traveling areas or spaces of the materials handling facility, e.g., on a table or another structure, or in a free-standing manner.

The camera may be one of a plurality of cameras provided within a materials handling facility. Each of the cameras may be aligned to include all or portions of one or more fixtures including product spaces or other storage units within their respective fields of view. Additionally, in some implementations, two or more cameras may include fields of view that overlap at least in part.

In some implementations, a system may be programmed with positions of single points corresponding to portions of the product spaces, which may be defined as locations in two-dimensional space within image planes of cameras, or in 3D space and backprojected therein, where parameters of each of the cameras are known. In some implementations, the points may be located on fronts of each of the product spaces, at centers of the respective product spaces, or at or near bottoms of the respective spaces. Alternatively, the positions with which the system is programmed may correspond to any other single point of a product space, or multiple points of the product space.

At box 315, the camera captures visual images at a predetermined rate, e.g., fifteen frames (or images) per second. Alternatively, the camera may be configured to capture visual images at frame rates of five, ten, twenty, thirty, sixty or any other number of frames (or images) per second. Additionally, the camera may also be configured to capture visual images at any level of resolution or pixel density. For example, in some implementations, the camera may be configured to capture high resolution images, such as images having resolutions or pixel densities of at least 300 pixels per inch (or ppi), or any other number of pixels per inch. Moreover, in some implementations, the camera may be configured to capture images of any size or dimensions, e.g., according to a VGA standard, or 640 pixels by 480 pixels.

At box 320, the images captured at box 315 are processed to detect hands, or other portions of the images that depict body segments, and to determine positions of the hands in 3D space. In some implementations, one or more body parts such as heads, arms, hands, torsos or portions thereof may be detected within the visual images using a machine learning model that is trained to identify such body parts depicted within an image, such as a segmentation network.

For example, where a hand is one of the body parts detected within the images, one or more processor units of the system, or one or more processor units provided on or within the camera, may generate or identify a bounding box or another portion of the visual image representing sets of pixels depicting the hand, or otherwise provide a point of reference for a location of the hand within the visual image. Portions of visual images depicting hands may include a predetermined number of image pixels, or a variable number of image pixels, and may be identified by a bounding box or in any other manner.

In some implementations, the system may be configured to execute a body part detection module (e.g., an algorithm, system or technique), which may be an artificial neural network, such as a convolutional neural network, or any other machine learning model, such as a segmentation network, that is trained to identify hands or other body parts depicted within an image. In some implementations, a body part detection module may generate a segmentation record identifying segments of an image depicting body parts and their respective locations within the image. In some implementations, a body part detection module may be configured to detect portions of a body part, including but not limited to multiple portions of the same body part, e.g., an upper arm and a lower arm.

In some implementations, the system may be configured to determine positions of body parts of each of the actors depicted within each of the visual images, e.g., in 3D space. In some implementations, one or more visual images may be processed to determine positions of such body parts based on a position of the camera, as well as any monocular cues or other attributes of the visual images or the body parts depicted therein. For example, positions of body parts in 3D space may be determined based on absolute or relative sizes of the body parts depicted within the visual images, or apparent elevations of the body parts within the visual images, e.g., with respect to floors or traveling surfaces, as well as any colors or textures of the body parts (or gradients of such colors or textures), relative motion of the body parts, or any other attributes of the body parts or the visual images.

In some implementations, positions of body parts of actors may be determined by different processes, e.g., according to two or more discrete algorithms, systems or techniques. Alternatively, in some implementations, maps of the body parts may be generated concurrently or together with the determination of the positions of such body parts in 3D space, e.g., by the same algorithms, systems or techniques, or by different algorithms, systems or techniques.

In some implementations, a locating module may be applied to consecutive images, or other sets of images (e.g., images captured at regular intervals of time, or images in a sequence), to track hands of actors or items within such hands from image to image over time. Alternatively, or additionally, in some implementations, locating data regarding positions and identities of actors within a vicinity of the fixture may be determined by or received from a tracking system or service operating within a materials handling facility, and may include approximate positions of any number of actors, as well as visual descriptors or other identifiers of such actors, or any other information or data regarding the actors. In some implementations, a locating system or service may execute one or more tracking or matching algorithms, e.g., a tracking-by-detection algorithm, or a bipartite matching algorithm, that generates a tracklet-to-detection assignment or a visual descriptors-to-detection assignment over consecutively captured data (e.g., consecutive visual images) in any manner. For example, if a trajectory or visual descriptors of a set of pixels identified in one image frame are not matched to a detection of a body part (e.g., a head), the trajectory or visual descriptors may be extended into a successively captured frame. In some implementations, the locating data may relate to a detection of a body part in one image, and a set of visual descriptors of pixels corresponding to the actor in a subsequent image frame. Moreover, in some implementations, the locating data may further include or reference images of one or more portions of each of such actors (e.g., images of body parts such as heads), as well as approximate positions of such portions of the actors, which may have been captured by one or more imaging devices or other sensors provided within the materials handling facility or from any other source. The locating data may also identify approximate positions of each of the actors, which may be represented in 3D space by a set of Cartesian coordinates, or coordinates according to any other system.

At box 325, the images are processed to generate a prediction as to whether any of the actors depicted therein is executing an interaction with one or more of the product spaces, and to identify such product spaces. For example, whether any of the images depict body parts of actors, body part image segments (e.g., hands, heads, shoulders, upper arms, elbows, lower arms, wrists, feet, or other body parts) depicted within the images may be determined, e.g., by a human parser module, and a record, such as a segmentation record, identifying segments of each of such images depicting body parts and their respective positions in 3D space or within a two-dimensional image plane may be generated. An interaction detection module (or another module, such as a deep network or another artificial neural network) may predict whether each of the images depicts a taking or picking event (or a retrieval) by an actor, a return or deposit event (or a placement) by the actor, no events by any actor (e.g., neither takings or pickings nor returns or deposits, or any retrievals or placements), or a multiple event (e.g., one or more takings or pickings and also one or more returns or deposits, or one or more retrievals and one or more placements) by the actor.

In some implementations, images may be processed in their entirety to detect hands, to determine positions of the hands in 3D space, or to identify portions of such images that depict one or more body segments, and the images need not be masked or cropped prior to processing. Likewise, in some implementations, images may be processed in their entirety to predict whether any actors depicted therein have executed interactions with one or more product spaces associated with the storage units, and the images need not be masked or cropped prior to processing.

At box 330, whether an interaction by an actor has been detected within the images is determined. If an interaction by an actor has not been detected within the images, then the process returns to box 315, where the camera continues to capture visual images at a predetermined rate, and to box 320, where such images are processed to detect hands and to determine positions of such hands in 3D space.

If an interaction by an actor has been detected within the images, however, then the process advances to box 335, where the images are dynamically cropped to a selected size based on the positions of the hands depicted within the images, positions of any items within the hands depicted within the images, and positions of the one or more product spaces. A center (e.g., a crop center, or a center point) of a cropping window having fixed dimensions may be selected such that the cropping window dynamically follows positions of the actor over time as the actor interacts with the one or more product spaces.

The images may be dynamically cropped in any manner for each image, or for a set of images, and based on positions of body parts (e.g., hands) or items depicted within images, or positions of one or more product spaces. In some implementations, scores may be calculated based on features regarding each of the actors, e.g., tracking information for each of the actors with respect to each of the product spaces. For example, a score representative of an overlap between hands depicted within images, or items depicted within images, and points or other portions of product spaces may be calculated. Where a distance between a point representing a body part (e.g., a hand or another body part) or an item in 3D space exceeds a predetermined threshold, however, a score calculated for that product space may be downgraded or downweighed, or the product space may be excluded from consideration. In some implementations, scores may be calculated based on features regarding a fixture or one or more product spaces, such as timing with respect to one or more start times or end times of a predicted interaction. A score calculated for each of the product spaces may also be calculated as a linear average of two or more other scores, e.g., scores calculated from features specific to an actor, and scores calculated based on features specific to the product spaces or times.

For example, in some implementations, where a system is programmed with positions ci of each product space l of a set of product spaces L at box 310, a center c of a cropping window may be calculated for a single image, or for a plurality of images captured at times t between a start time st of an event and an end time et of the event, according to a function $$c = \frac{\sum_{l \in L} \sum_{st < t < et} s_{l,t} c_l}{\sum_{l \in L} \sum_{st < t < et} s_{l,t}}$$

where $s_{l,t}$ is a first score derived from actor-specific features for a product space l at a time t, such as an extent of overlap between a hand depicted within an image captured at the time t or a product depicted within the image and the product space l depicted within the image, a second score derived based on features regarding the product space l, such as timing regarding positions of hands or items with respect to one or more start times or end times of a predicted interaction, or a linear combination or average of the first score and the second score. Where a distance between a point representing a body part (e.g., a hand or another body part) or an item in 3D space exceeds a predetermined threshold, however, a score calculated for that product space may be downgraded or downweighed, or the product space may be excluded from consideration.

The center c may be calculated for each clip of a predetermined number of images captured over a fixed duration, or for a plurality of such clips.

Dimensions of a cropping window may be selected on any basis. For example, the cropping window may have a shape in the form of a rectangle (e.g., a square) or any other polygon or curvilinear shape. Moreover, a cropping window may have the same aspect ratio as an image, or a different aspect ratio. For example, where an image is consistent with a VGA standard and has a rectangular shape with dimensions of 640×480 pixels, or a 4:3 aspect ratio, a cropping window may have a square shape with dimensions of 160×160 pixels, or a 1:1 aspect ratio.

At box 335, the images are cropped to include only portions depicting the product spaces, as well as portions of actors and any items therein, or to exclude one or more background features, e.g., portions within the field of view that do not depict a product space. For example, each of the images may be reoriented or reconfigured such that one of the product spaces is featured in a center of one of such images. Moreover, where an image includes two or more product spaces, the images may be copied two or more times and cropped as necessary, such that centers or centroids of such product spaces are each featured within one of the images.

At box 340, the cropped images are processed to determine whether such images depict any items within hands. For example, in some implementations, a cropped image may be processed to generate or identify a bounding box or another portion of the cropped image representing sets of pixels depicting a hand, or to otherwise provide a point of reference for a location of the hand within the cropped image. The portions of the cropped images depicting hands may include a predetermined number of image pixels, or a variable number of image pixels, and may be identified by a bounding box or in any other manner. Subsequently, or concurrently, a number of items and identities of items within hands depicted within visual images may be determined. For example, a portion of a cropped image represented within a bounding box or otherwise identified as including a hand may be processed by one or more processor units provided in a computer device or system external to a camera, on or within the camera itself, to determine whether the portion of the cropped image depicts any items within the hand, or to identify any items within the hand, as well as a number of such items within the hand. The cropped image may be further processed to determine item-in-hand (or product-in-hand) annotations from the cropped images. For example, for each portion of a cropped image that is determined to depict a hand, the portion may be annotated or otherwise labeled to indicate whether the portion also depicts any items within such hands, or to include identifiers of the items within such hands.

At box 345, the cropped images are augmented with channels representing hands depicted within the images and items within such hands. Images captured by a camera may be processed to include information or data regarding their respective contents, which may be incorporated into such images or data structures representing such images, e.g., in a multi-channel manner, such as a five-channel manner. For example, in some implementations, where a cropped image is represented according to an RGB color model, each of the pixels of the cropped image may include channels representing colors depicted at such pixels, e.g., values corresponding to colors red, green or blue, and may be augmented with channels representing contents of such images, such as channels indicating whether the pixel depicts a portion of a hand or a portion of a product (or item), or a portion of a product space. The augmented channels may be represented in a binary manner, indicating that a given pixel does or does not depict a portion of a hand or a product (or item), or in any other manner. Alternatively, the cropped images may be augmented with any other channels representing masks for product spaces depicted within such cropped images, or any other features.

At box 350, a clip (or another set) of a predetermined number of the cropped images is processed to extract a set of features regarding the clip therefrom, and to classify the clip. The set may include any number of the cropped images, e.g., eight, ten, fifteen, twenty or any other number of images, or images captured over any interval or period of time or duration, e.g., one second, one-and-one-half seconds, or any other duration. The clip may include each of the images captured over the interval or period of time, or fewer than all of such images, e.g., every second, third, fourth or other multiple of the cropped images in series.

In some implementations, a clip of the cropped images may be provided to a module or machine learning tool, such as a slow-fast model, or a dual-mode convolutional neural network, to extract a set of features regarding the clip. Such features may have any dimensions, and any number of digits or values in accordance with implementations of the present disclosure. Such digits or values may but need not be readily interpreted as representing any semantic attributes. Additionally, the clip may be provided to a machine learning model, such as a multi-layer perceptron model, to classify the clip as depicting a specific event, e.g., a taking or picking event, a return or deposit event, no event, or multiple events. For example, such a model may calculate scores representing probabilities or likelihoods that a cropped image or a portion of a cropped image (e.g., one or more pixels), depicts one or more actions, e.g., a first score representing a probability or a likelihood that a cropped image or a portion thereof depicts a taking or picking event, a second score representing a probability or a likelihood that the cropped image or portion thereof depicts a return or deposit event, and a third score representing a probability or a likelihood that the cropped image or portion thereof depicts no event, or neither a taking or picking event nor a return or deposit event. A classification of a clip of cropped images may be determined based on scores calculated for the cropped images of the clip.

At box 355, whether the clip of cropped images processed at box 350 depicts an event, e.g., a taking or picking event, or a return or deposit event, is determined. Whether the clip depicts an event, or does not depict an event, may be determined based on values of scores calculated for the clip, e.g., probabilities or likelihoods that the clip depicts a taking or picking event, a return or deposit event, or no event.

If the clip is not classified as depicting an event, then the process returns to box 350, where another clip (or set) of a predetermined number of the cropped images is processed to extract a set of features therefrom, and to classify the clip. In some implementations, the other clip (or set) of the cropped images need not include any of the cropped images that were previously processed to identify features or to classify the clip, such as where the respective clips are in series. For example, where each of the clips includes cropped images captured over a fixed duration or a predetermined number of the cropped images, e.g., one second or fifteen images, the images of the respective clips may be in series, e.g., images captured in consecutive seconds. In some other implementations, however, the other clip of the cropped images may include one or more images that were previously processed, such as where clips of consecutively captured images overlap at least in part. For example, where each of the clips was captured over a fixed duration or includes a predetermined number of cropped images, a duration of a next clip may cover half of a duration of a previous clip, or a next clip may include half of the cropped images of a previous clip, thereby ensuring that the next clip overlaps with the previous clip. Alternatively, clips may have any duration or include any number of cropped images in common with one another.

If the clip processed at box 355 is classified as depicting an event, then the process advances to box 360, where features regarding the clip are added to a sequence of features representing at least the event, and to box 365, where a start time of the event is determined based on a time associated with a first clip in the sequence, e.g., the clip processed at box 350. For example, the time associated with the clip processed at box 350 may be a time at which a first image of the clip was captured, a time at which a last image of the clip was captured, a time at which any other images of the clip were captured, or an average time associated with the clip.

At box 370, another clip (or set) of a predetermined number of the images is processed to extract a set of features regarding the clip therefrom, and to classify the clip. The clip processed at box 370 may include the same number of images included in the clip processed at box 350, or another number of images, and may be processed in the same manner as the clip processed at box 350, or in a different manner.

At box 375, whether the clip processed at box 370 is classified as depicting an event is determined. If the clip is classified as depicting an event, then the process returns to box 360, where features of the clip processed at box 370 are added to the sequence of features.

If the clip processed at box 370 is not classified as depicting an event, however, then the process advances to box 380, where an end time of the event is determined based on a time associated with features of a last clip in the sequence, e.g., the clip processed at box 370 or, alternatively, a previously processed clip. In some implementations, an end of the event may be determined only after a predetermined number of clips have been determined to not depict an event. Moreover, in some implementations, an end of an event may be determined after features of a predetermined number of clips have been added to the sequence at box 360, even if such clips continue to be classified as depicting events, e.g., to ensure that the sequence is not overly lengthy. After an end of the event or an end of the sequence is determined, features of clips of cropped images that depict the event or are included in the sequence may be concatenated and flattened to a single dimension, and a two-dimensional feature map may be generated based on such features accordingly.

At box 385, the sequence of features, the classifications of each of the clips, the start time determined at box 365, and the end time determined at box 380, are stored in association with the actor, e.g., by a server or another computer system.

At box 390, whether the continued monitoring of the product spaces with the camera is desired is determined. If the continued monitoring of the product spaces is desired, then the process returns to box 315, where the camera captures visual images at the predetermined rate. If the continued monitoring of the product spaces is no longer desired, then the process ends. A server or another computer system may process the features, the classifications, the start time and the end time determined from the clips of cropped images to generate a prediction or shopping hypothesis as to whether any interactions with the fixture by any actor has occurred, or for any other purpose. In some implementations, any information or data regarding items detected within hands of an actor at box 340, e.g., numbers and identities of the items, may be provided to the server or other computer in parallel with the sequence of features, the classifications, the start time and the end time, or separately. Alternatively, information or data regarding items detected within such hands may be received from any other system, other than the camera that captured the visual images at box 315, or otherwise determined in any other manner.

As is discussed above, images of one or more product spaces or other storage units may be captured as actors execute poses, gestures or other actions associated with the product spaces. The images may be further processed to dynamically crop the images about a calculated center point, or to generate spatial-temporal features from such images, and to classify clips of such images with respect to whether the images likely depict an event. Where consecutive clips of images are determined to depict an event, features derived from the clips are combined into a sequence and transmitted, with the classifications and a start time and an end time of the event, and a shopping hypothesis may be derived for the clips or sequence. Referring to FIGS. 4A through 4D, flow diagrams of one system for detecting events in accordance with implementations of the present disclosure are shown. Except where otherwise noted, reference numerals preceded by the number "4" shown in FIGS. 4A through 4D indicate components or features that are similar to components or features having reference numerals preceded by the number "2" shown in FIG. 2A or 2B or by the number "1" shown in FIGS. 1A through 1K.

Figure 4A:
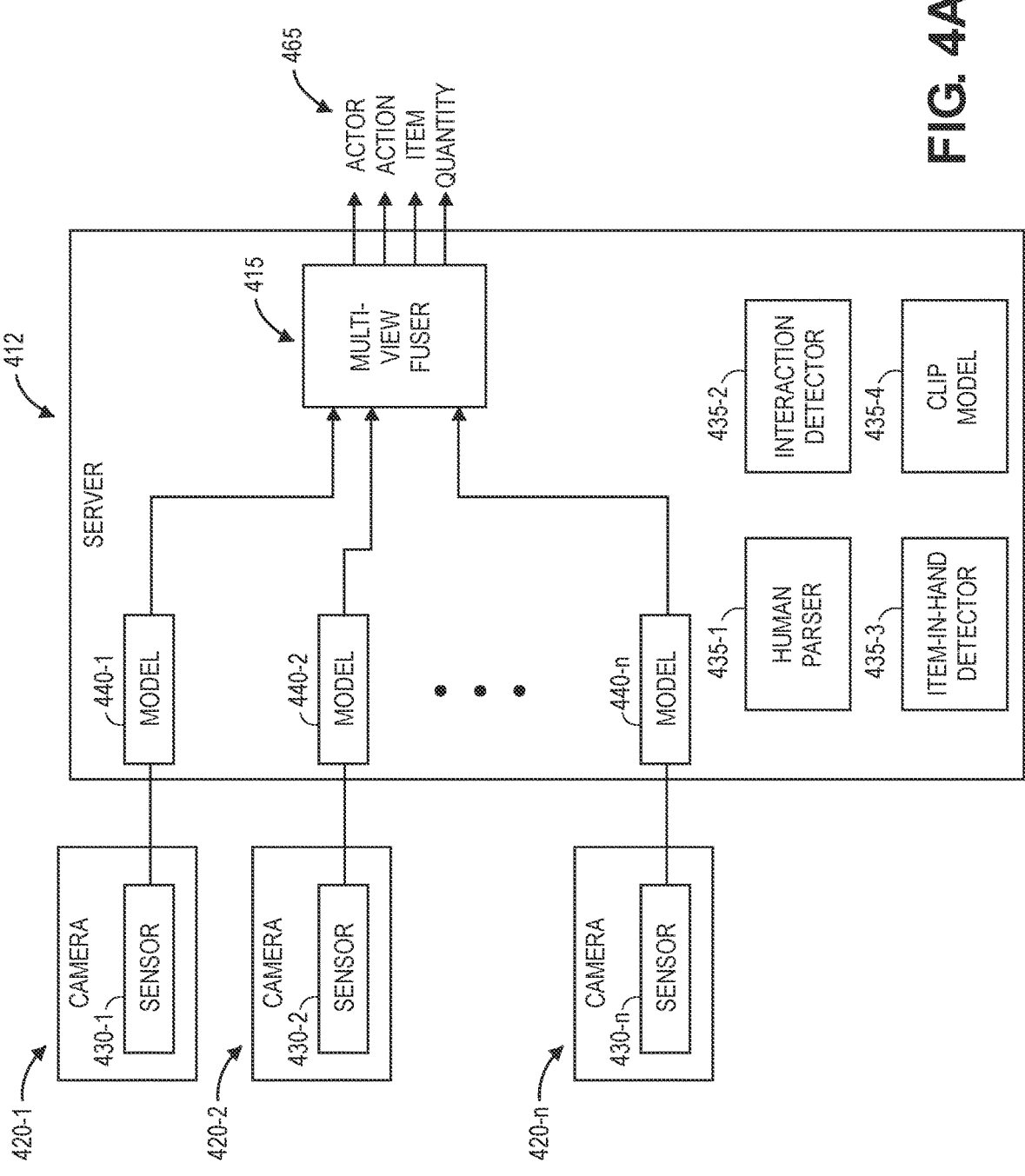
FIGS. 4A through 4D are flow diagrams of components of one system for detecting events in accordance with implementations of the present disclosure.

As is shown in FIG. 4A, a server 412 is in communication with a plurality of cameras 420-1, 420-2 . . . 420-n. The server 412 is configured to execute a model 440-1, 440-2 . . . 440-n to generate embeddings representative of images captured using each of the cameras 420-1, 420-2 . . . 420-n. The server 412 is further configured to execute a multi-view fuser module 415 to aggregate embeddings generated by the model 440-1, 440-2 . . . 440-n on images captured by each of the cameras 420-1, 420-2 . . . 420-n. The server 412 may be provided in the same physical location as one or more of the cameras 420-1, 420-2 . . . 420-n, or in one or more alternate or virtual locations, e.g., in a "cloud"-based environment.

Each of the cameras 420-1, 420-2 . . . 420-n may include one or more sensors 430-1, 430-2 . . . 430-n that include one or more product spaces within their respective fields of view. The sensors 430-1, 430-2 . . . 430-n may be color sensors, grayscale sensors, black-and-white sensors, or any other visual sensors. Each of the cameras 420-1, 420-2 . . . 420-n may further include one or more processor units, memory components, or other components.

The server 412 may be further configured to execute any number of modules (or agents), such as a human parser module (or agent) 435-1, as well as an interaction detection module (or agent) 435-2, an item-in-hand detection module or agent 435-3, and a clip model 435-4.

The human parser module 435-1 may be configured to process every image captured by the cameras 420-1, 420-2 . . . 420-n, or fewer than all of the images captured by the cameras 420-1, 420-2 . . . 420-n, to determine whether such images depict body parts of any actors, as well as to determine locations of such body parts within each image. The human parser module 435-1 may be a machine learning system, e.g., an artificial neural network, such as a convolutional neural network, that is trained to identify body part image segments (e.g., hands, heads, shoulders, upper arms, elbows, lower arms, wrists, feet, or other body parts) depicted within, such as a segmentation network. In some implementations, the human parser module 435-1 may generate, as an output in response to each image as an input, a segmentation record identifying segments of the image depicting body parts and their respective locations within the image. In some implementations, the human parser module 435-1 may further generate one or more sets of regression vectors or other associations between locations of pairs of body parts, such as heads and hands, detected within one or more images. The human parser module 435-1 may further determine 3D positions of each of the body parts detected within images, based on a position of a camera, as well as any monocular cues or other attributes of the images or the body parts depicted therein. For example, positions of the body parts in 3D space may be determined based on absolute or relative sizes of the body parts depicted within images, or apparent elevations of the body parts within the images, e.g., with respect to floors or traveling surfaces, as well as any colors or textures of the body parts (or gradients of such colors or textures), relative motion of the body parts, or any other attributes of the body parts or the images.

The interaction detection module 435-2 may be configured to determine whether an actor has executed an interaction with a fixture or a product space of the fixture based on a map and/or positions of body parts of the actor generated by the human parser module 435-1, as well as any available information or data regarding geometric features of the fixture or the product spaces of the fixture, or any items provided thereon.

The item-in-hand detection module 435-3 may be configured to crop or otherwise isolate portions of images that are determined to depict hands, e.g., based on a map or other representation of positions of body parts of the actor, and to determine whether such portions of the images depict any items within such hands. The item-in-hand detection module 435-3 may further generate any number of features or embeddings regarding items detected within such hands, e.g., counting features or identifiers of such items.

The clip model 435-4 may process a clip or a set of images, in order to extract spatial-temporal features 450 regarding such images, and to predict whether such images depict an event that occurred at a time associated with the clip or set. In some implementations, the clip model 435-4 may be a machine learning model having a slow-fast model (e.g., a machine learning model having both "slow" and "fast" pathways), or a dual-model convolutional neural network, as a backbone. The clip model 435-4 may be further configured to generate a classification of the clip, and to indicate whether images of the clip depict an event, e.g., a taking or picking event, a return or deposit event, or no event, by a multi-level perceptron network, or any other model.

Alternatively, the server 412 or any of the cameras 420-1, 420-2 . . . 420-n may execute any number of other modules or agents in accordance with implementations of the present disclosure. Moreover, in some implementations, one or more of the cameras 420-1, 420-2 . . . 420-n may be configured to execute applications or functions that are described herein as being executed by the server 412, e.g., to determine points or locations within images captured using the sensors 430-1, 430-2 . . . 430-n about which portions of such images should be cropped based on positions of hands or items within such images, an extent to which such hands or items overlap portions of product spaces, or on any other basis.

The multi-view fuser module 415 may receive sequences of features or embeddings generated by the model 440-1, 440-2 . . . 440-n based on images captured by the respective cameras 420-1, 420-2 . . . 420-n, and generate records 465 of net changes in inventory based on hypotheses derived from one or more events as determined from such embeddings. In some implementations, the hypotheses may be derived based on outputs received from another machine learning model based on sequences of features or embeddings received from one or more of the cameras 420-1, 420-2 . . . 420-n. Such records 465 may identify actors associated with the events, and indicate whether the events are takings or picking events, returns or depositing events, or any other events. Such records 465 may further identify items involved in the events, and also identify quantities of each of such items.

Figure 4B:
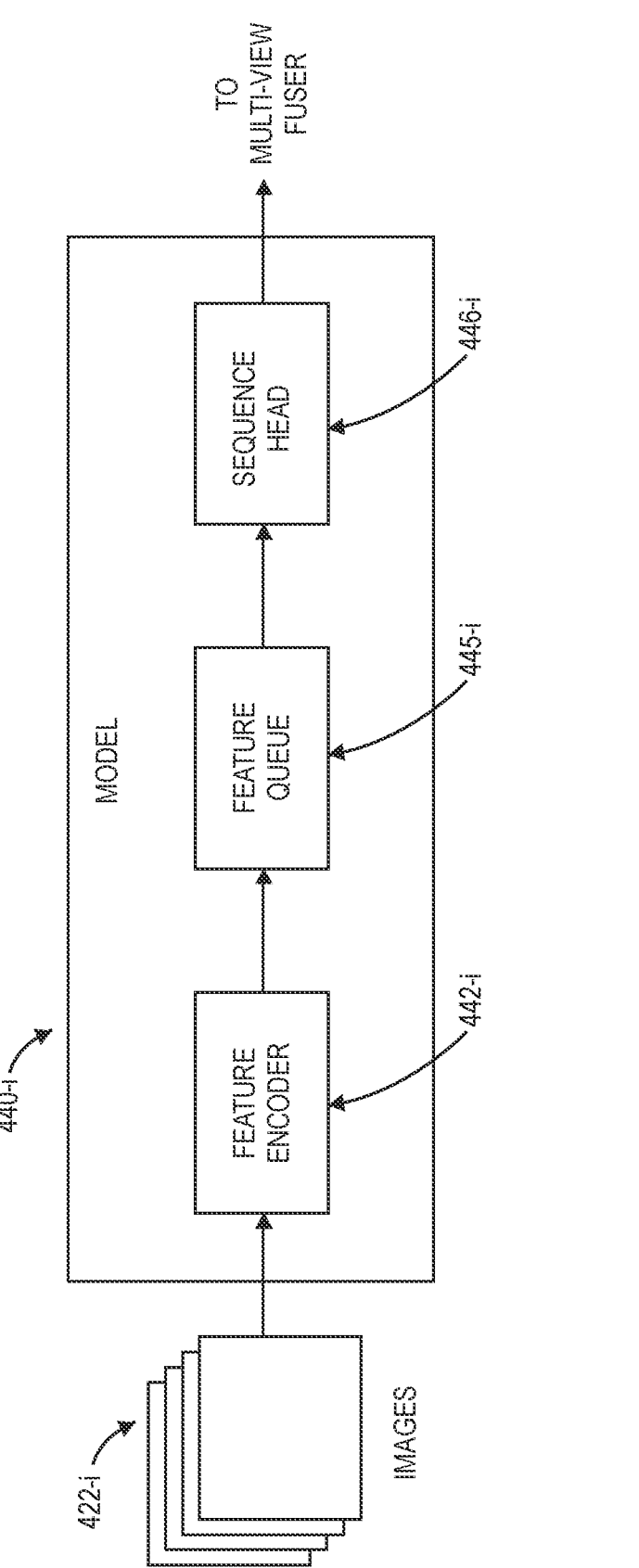

As is shown in FIG. 4B, a representative model 440-i executed by the server 412, e.g., one of the models 440-1, 440-2 . . . 440-n shown in FIG. 4A, includes a feature encoder 442-i, a feature queue 445-i, and a sequence head 446-i. The model 440-i is configured to receive a set of images 422-i that are captured by one of the cameras 420-1, 420-2 . . . 420-n and dynamically cropped, and to provide the set of images 422-i to the feature encoder 442-i.

The feature encoder 442-i may be configured to process a subset of the set of images 422-i, e.g., a clip of consecutive ones of the set of cropped images 422-i captured over a predetermined period of time such as one second, one-and-one-half seconds, two seconds, or any other duration. The feature encoder 442-i may generate embeddings (e.g., feature embeddings) for each of such clips in a streaming fashion, as well as scores indicative of a probability that such clips depict one or more events or actions. The feature encoder 442-i may stream the embeddings and scores to the feature queue 445-i, which may act as a coarse temporal localizer that identifies sequences of clips that are associated with or depict discrete events or actions, e.g., based on scores or other representations of probabilities or likelihoods that respective clips depict such events or actions. The feature encoder 442-i may then provide features or embeddings representative of the sequences of clips to the sequence head 446-i, which may generate predictions as to identities of actors that performed the events or actions, as well as identifiers of the events or actions, items involved in such events or actions, and numbers of such items.

Figure 4C:
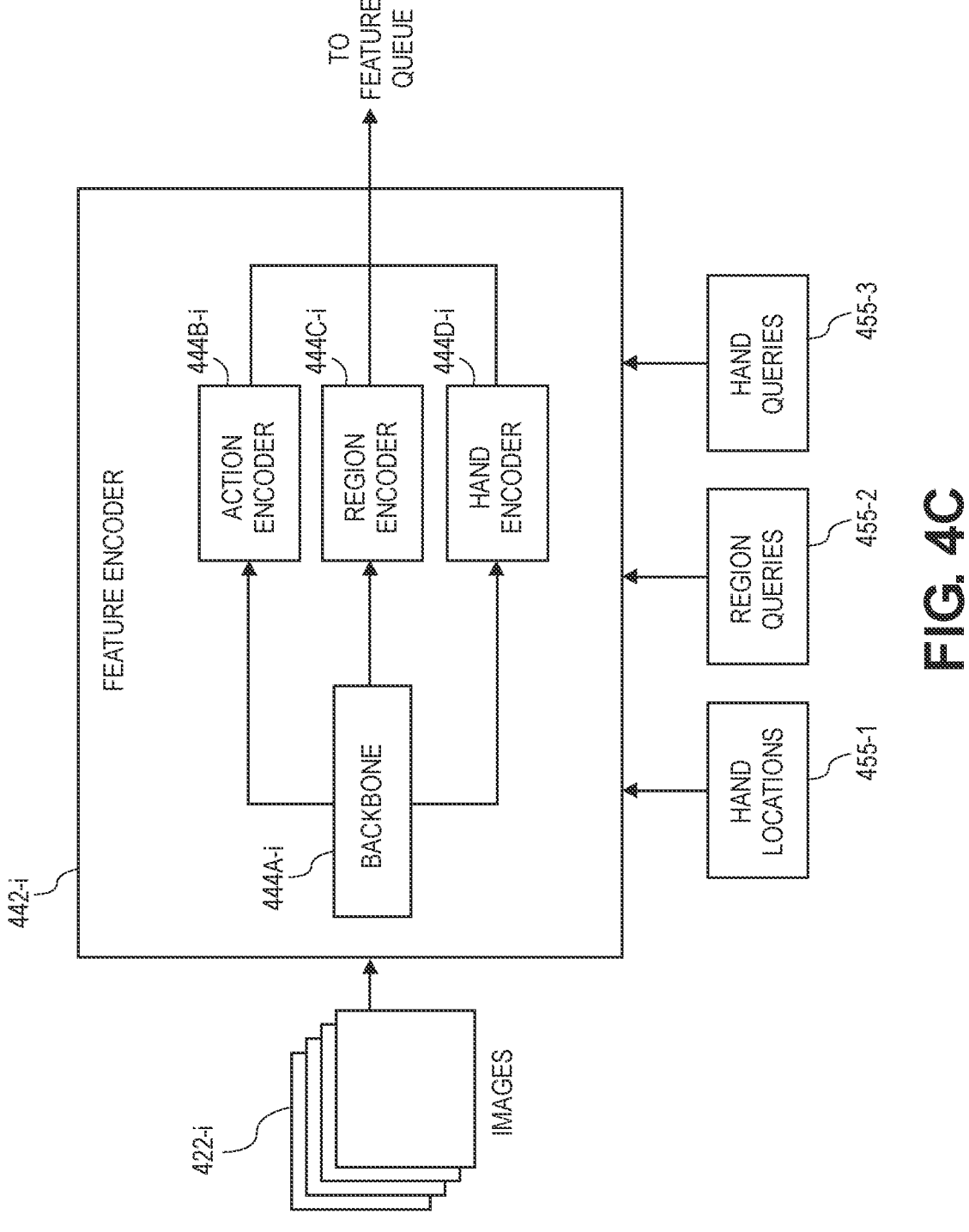

As is shown in FIG. 4C, the feature encoder 442-i may be configured to extract feature embeddings from clips of images (e.g., descriptors of such clips), and may include a backbone 444A-i and any number of discrete encoders, including an action feature encoder 444B-i, a region feature encoder 444C-i or a hand feature encoder 444D-i. The feature encoder 442-i may further rely on locations 455-1 of hands depicted within the respective images 422-i, e.g., (x,y) coordinates of locations determined by the human parser 435-1 of FIG. 4A or another component, as well as region queries 455-2, e.g., masks identifying locations of the respective product spaces depicted within the respective images 422-i determined from planogram data or any other information or data, and hand queries 455-3, e.g., masks identifying locations of hands depicted within the respective images 422-i determined by the human parser 435-1 of FIG. 4A or in any other manner.

The backbone 444A-i may be an artificial neural network, such as a three-dimensional convolutional neural network, that is configured to generate feature maps (or activation maps). In some implementations, the backbone 444A-i may include an R(2+1)D convolutional neural network. In some other implementations, the backbone 444A-i may include an X3D convolutional neural network. Alternatively, the backbone 444A-i may include any other networks, components or other features, and may be formed in any other manner.

The action feature encoder 444B-i may rely on features or other data received from or generated by the backbone 444A-i as well as hand locations to generate features or embeddings indicative of whether a clip of the set of cropped images 422-i depicts one or more events or actions by any actors depicted therein, as well as scores indicative of a probability that the clip depicts the events or actions. Such events or actions may include, but need not be limited to, takings or picking events, returns or depositing events, or no events at all. The features or embeddings generated by the action feature encoder 444B-i are independent of any items associated with such events or actions, and may include one or more attention modules for improving accuracy of such determinations for each of the clips, e.g., by providing local context around depictions of such hands.

The region feature encoder 444C-i may be configured to encode action features at given locations in response to queries in the form of region masks representing locations, or portions of product spaces that include common items. Feature maps received from the backbone 444A-i and region queries determined from planogram data may act as the key and the value for the region feature encoder 444C-i. Queries of the region feature encoder 444C-i may compete with one another to attend to pixels of the respective feature maps, and outputs from each query may carry descriptors of events or actions occurring at given locations of the feature maps, as well as scores indicative of a probability that a clip depicts the events or actions at such locations.

The hand feature encoder 444D-i may operate in a manner similar to that of the region feature encoder 444C-i, but with feature maps and hand masks, or trajectories of detected hands depicted within the set of cropped images 422-i, rather than region masks, as representations of queries. The hand feature encoder 444D-i generates hand embeddings that are descriptors of events or actions being performed by a given hand, or for a given hand trajectory, and scores indicative of a probability that such clips depict the hands performing one or more events.

Figure 4D:
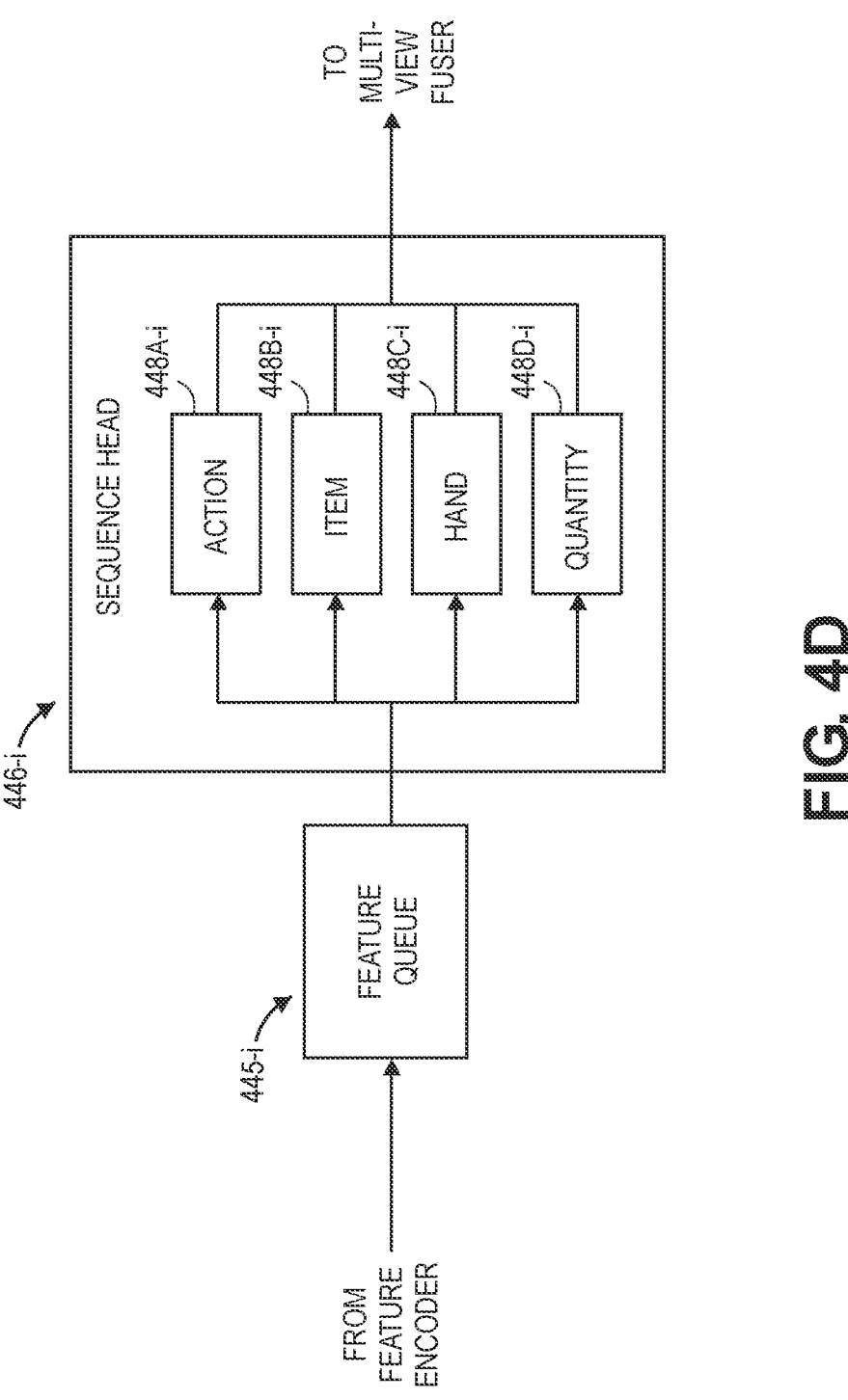

As is shown in FIG. 4D, the feature queue 445-i receives embeddings generated by the action feature encoder 444B-i, the region feature encoder 444C-i, and the hand feature encoder 444D-i for each of a plurality of clips of the cropped images 422-i, as well as scores representing probabilities or likelihoods that the respective clips depict actions, e.g., takings or picking events, returns or depositing events, or no events at all. The feature queue 445-i acts as a coarse temporal localizer based on the scores indicating whether each of the clips of the cropped images 422-*i* depicts an event or an action. Based on such scores, the feature queue 445-*i* may identify a set of the clips depicting a full duration of an event or an action, viz., a sequence of clips corresponding to the event or the action, and provide features derived from clips of the sequence to the sequence head 446-*i*.

The feature queue 445-*i* may be configured to generate a sequence of features for each product space depicted within clips from which features and classifications were generated. For example, where classifications of a predetermined number of clips of images indicate that such clips depict an event occurring at a product space, features generated for such clips may be combined into a sequence of features, with a start time of the event being determined based on a first one of the clip features identified as depicting the event. An end to a sequence of clip features may be identified where one or more of the sets of clip features is classified as not depicting the event, or after a predetermined number of the clip features are added to the sequence (e.g., at a maximum length of the sequence). A sequence of clip features determined by the feature queue 445-*i* may thus represent an spatial-temporal representation of one potential event. An end time of the event may be determined based on a last one of the clip features identified as depicting the event, or a last one of the clip features in a sequence.

In some implementations, features representing a sequence of clips may correspond to a single event or an action that occurred within a duration, e.g., a single taking or pick event, or a single return or deposit event. In some other implementations, the features representing the sequence may correspond to multiple events or actions, e.g., multiple takings or pick events, multiple returns or deposit events, rummage events, or combinations of takings and returns that occurred within a duration. Furthermore, sequences of clips may include any number of such clips. In some implementations, sequences may be limited to a predetermined number of clips, e.g., ten clips.

The sequence head 446-*i* includes four heads, viz., an action head 448A-i, an item head 448B-i, a hand head 448C-i, and a quantity head 448D-i. The sequence head 446-*i* generates a classification of a net change in inventory based on embeddings aggregated by the feature queue 445-*i* for clips of a sequence. The action head 448A-i may generate an embedding indicative of an action, e.g., a taking or a picking event, a return or a depositing event, or no event at all, while the item head 448B-i may generate an embedding identifying an item involved in the action by reference to a product space typically associated with the item. A hand head 448C-i may generate an embedding identifying a hand of an actor involved in the action, and the quantity head 448D-i may generate an embedding identifying a number of the item involved in the action.

The sequence head 446-*i*, and any other sequence heads executed on embeddings generated from images captured by any other cameras, may provide aggregated embeddings representative of actions, items, hands (or actors) and quantities of items to the multi-head fuser 415, which may then generate an overall net change hypothesis based on confidence levels associated with each of the predictions. A record of a net change in inventory may include an identifier of an actor and of any items, as well as quantities of such items, and may be associated with the actor where the net change is predicted with a sufficiently high level of confidence.

Figure 5:
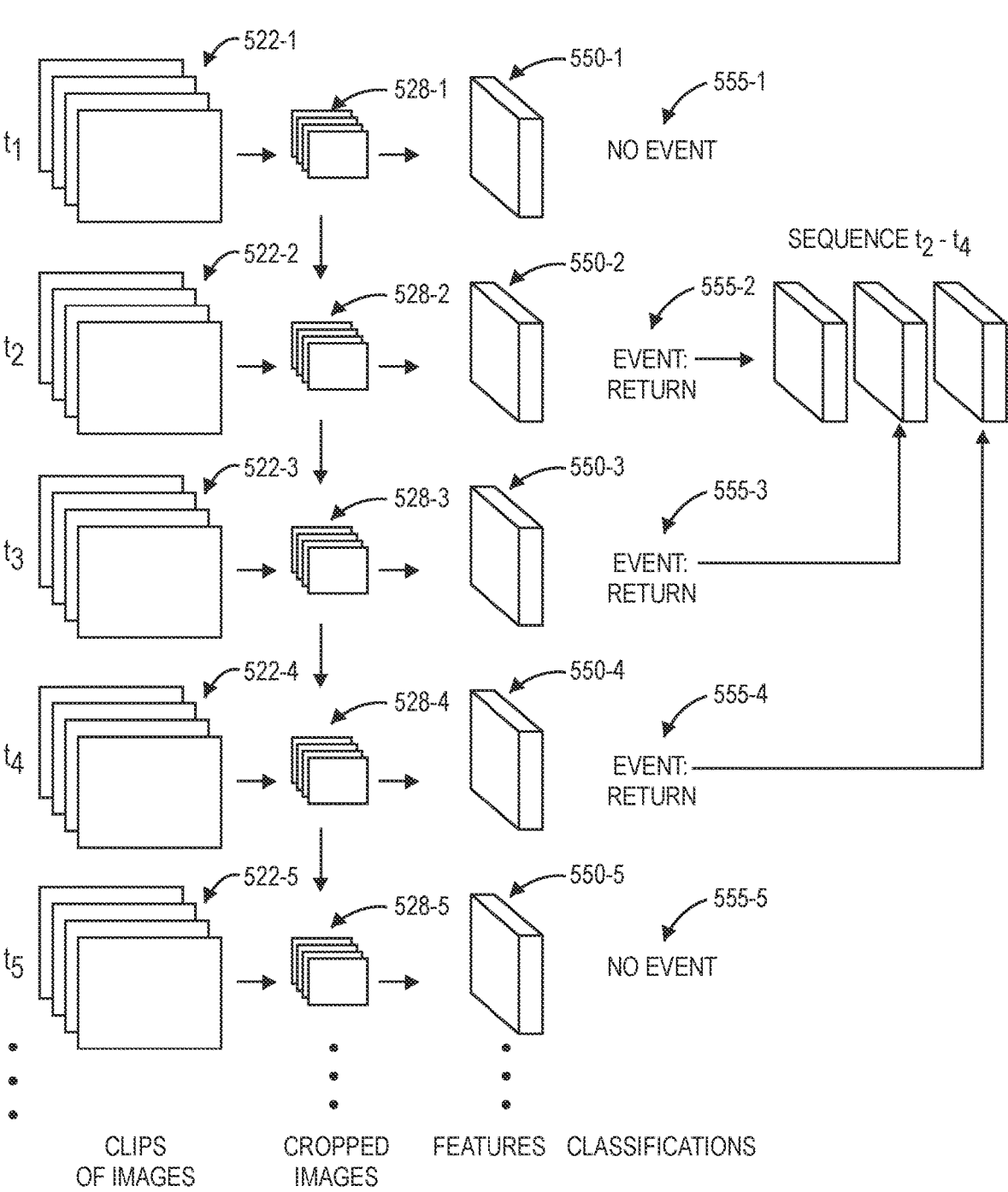
FIG. 5 is a view of aspects of one system for detecting events in accordance with implementations of the present disclosure.

A sequence of clips of dynamically cropped images may be identified as depicting a common event, based on features determined regarding the images of such clips, and classifications of such clips. Referring to FIG. 5, a flow diagram of one system for detecting events in accordance with implementations of the present disclosure is shown. Except where otherwise noted, reference numerals preceded by the number "5" shown in FIG. 5 indicate components or features that are similar to components or features having reference numerals preceded by the number "4" shown in FIGS. 4A through 4D, by the number "2" shown in FIG. 2A or 2B or by the number "1" shown in FIGS. 1A through 1K.

As is shown in FIG. 5, a plurality of clips or sets of images that are captured over any duration of time or include any number of images are cropped about a dynamically selected center point. For example, as is shown in FIG. 5, a clip of images 522-1 captured at approximately a time $t_1$ is dynamically cropped to generate a clip 528-1 of cropped images, such as by identifying a center point, or a crop center, for each of the images 522-1, and isolating a portion of each of such images 522-1 about the center point or crop center having predetermined dimensions. The center point or crop center may be identified by calculating scores representing overlaps between masks representing positions or trajectories of hands and masks representing portions of product spaces, or scores representing a likelihood that an event or an action occurred during times at which the images 522-1 were captured, e.g., timestamps, and determining the center point or crop center based on such scores and points corresponding to the portions of the product spaces depicted within the images 522-1.

The clip 528-1 of cropped images may be further augmented, e.g., by masking, layering or stacking, to include information or data regarding their respective contents. For example, where pixels of the clip 528-1 are represented with channels corresponding to colors (e.g., red, green and blue), the pixels may be augmented to include channels indicating whether such pixels of the cropped images of the clip 528-1 depict portions of hands or portions of products or items, e.g., in a binary manner.

The clip 528-1 of cropped images is then processed to generate a set of features 550-1 of the images of the clip 528-1, and a classification 555-1 of the images of the clip 528-1, e.g., by providing the clip 528-1 to one or more machine learning models executed by a computer server or another system in communication with the cameras that captured the images 522-1. The time $t_1$ may be a time at which a single image of the clip 528-1 was captured, e.g., a first image, a last image, a middle image, or any other image of the clip 528-1, or an average time associated with images of the clip 528-1, or any other time. The classification 555-1 may be a score representative of whether the images of the clip 528-1 depict an event, e.g., a taking or picking event, a return or deposit event, or no event at all.

The clip 528-1 may be provided to a model after the images of the clip 528-1 have been captured and processed by masking or cropping and centering, e.g., at a rate defined by the number of images in the clip 528-1. For example, where the images 522-1 were captured at a rate of fifteen frames per second (fps), and the clip 528-1 includes fifteen images, clips of masked or cropped and centered images (e.g., the clip 528-1) may be provided to a clip model at a frequency of one Hertz (1 Hz), or a rate of one clip per second.

Based on the classification 555-1 of the clip 528-1, e.g., that the images of the clip 528-1 do not depict an event or an action, information or data regarding the clip 528-1 (e.g., the features 550-1) need not be further considered in generating a hypothesis for any actor depicted within the clip.

As is further shown in FIG. 5, a clip 522-2 of images captured at approximately time $t_2$ is dynamically cropped to generate a clip 528-2 of cropped images, such as by identifying a center point, or a crop center, for each of the images 522-2, and isolating a portion of each of such images 522-2 about the center point or crop center having predetermined dimensions. The clip 528-2 of cropped images may be further augmented, e.g., by masking, layering or stacking, to include information or data regarding their respective contents, such as channels indicating whether pixels of the cropped images of the clip 528-2 depict portions of hands or portions of products or items.

The images of the clip 528-2 are processed to generate a set of features 550-2, and to determine a classification 555-2 of the clip 528-2, by providing the images of the clip 528-2 to the model at a rate or a time defined by the number of images in the clip 528-2.

Because the classification 555-2 indicates that the images of the clip 528-2 depicted an event, e.g., a return event, a sequence of features representing the return event may be generated including the features 550-2 of the clip 528-2. A start time of the return event may be determined based on the time $t_2$ associated with the clip 528-2.

Subsequently, a clip 522-3 of images captured at approximately time $t_3$ is dynamically cropped to generate a clip 528-3 of cropped images, such as by identifying a center point, or a crop center, for each of the images 522-3, and isolating a portion of each of such images 522-3 about the center point or crop center having predetermined dimensions. The clip 528-3 of cropped images may be further augmented, e.g., by masking, layering or stacking, to include information or data regarding their respective contents, such as channels indicating whether pixels of the cropped images of the clip 528-3 depict portions of hands or portions of products or items.

The images of the clip 528-3 are processed to generate a set of features 550-3, and to determine a classification 555-3 of the clip 528-3, by providing the images of the clip 528-3 to the model at a rate or a time defined by the number of images in the clip 528-3. Because the classification 555-3 is the same as the classification 555-2, indicating that the images of the clip 528-3 also depict a return event, the features 550-3 generated from the clip 528-3 may be added to the sequence of features that was initiated with the features 550-2 of the clip 528-2.

Likewise, a clip 528-4 of images captured at approximately time $t_4$ is dynamically cropped to generate a clip 528-4 of cropped images, such as by identifying a center point, or a crop center, for each of the images 522-4, and isolating a portion of each of such images 522-4 about the center point or crop center having predetermined dimensions. The clip 528-4 of cropped images may be further augmented, e.g., by masking, layering or stacking, to include information or data regarding their respective contents, such as channels indicating whether pixels of the cropped images of the clip 528-4 depict portions of hands or portions of products or items.

The images of the clip 528-4 are processed to generate a set of features 550-4, and to determine a classification 555-4 of the clip 528-4, by providing the images of the clip 528-4 to the model at a rate or a time defined by the number of images in the clip 528-4. Because the classification 555-4 is the same as the classification 555-2 and the classification 555-3, indicating that the images of the clip 528-4 also depict a return event, the features 550-4 generated from the clip 528-4 are added to the sequence of features that was initiated with the features 550-2 of the clip 528-2, and augmented to include the features 550-3 of the clip 528-3.

A clip 528-5 of images captured at approximately time $t_5$ is dynamically cropped to generate a clip 528-5 of cropped images, such as by identifying a center point, or a crop center, for each of the images 522-5, and isolating a portion of each of such images 522-5 about the center point or crop center having predetermined dimensions. The clip 528-5 of cropped images may be further augmented, e.g., by masking, layering or stacking, to include information or data regarding their respective contents, such as channels indicating whether pixels of the cropped images of the clip 528-5 depict portions of hands or portions of products or items.

The clip 528-5 of cropped images may be further processed to generate a set of features 550-5, and to determine a classification 555-5 of the clip 528-5, by providing the clip 528-5 to the machine learning model at a rate or a time defined by the number of images in the clip 528-5. Because the classification 555-5 indicates that the images of the clip 528-5 do not depict the event, the features 550-5 generated from the clip 528-5 need not be further considered in generating a shopping hypothesis. Moreover, and also based on the classification 555-5, the sequence of features that was initiated with the features 550-2 of the clip 528-2, and augmented with the features 550-3, 550-4 of the clips 528-3, 528-4, is determined to have concluded and an end time of the event may be determined based on the time $t_4$ associated with the clip 528-4. Furthermore, once the sequence of features has been determined to include the features 550-2-, 550-3, 550-4, the features may be concatenated and/or flattened accordingly.

The processes of capturing, cropping and classifying clips of images shown in FIG. 5 may be performed using any number of cameras, or based on images captured by any of such cameras. Moreover, where two sequences of features that are classified as depicting a common type of event are separated by a limited number of features that do not depict that type of event, e.g., features of one clip, the two sequences of features may be treated as a single sequence and classified as depicting a common event.

Referring to FIG. 6, a flow chart 600 of one process for detecting events in accordance with implementations of the present disclosure is shown. At box 610, features of clips of dynamically cropped images captured by multiple cameras and classifications of the clips are generated, e.g., by a system in communication with each of the cameras. For example, each of the cameras may be visual cameras (e.g., RGB cameras) mounted within a materials handling facility that include one or more fixtures with sets of shelves or other product spaces having items of various types or kinds provided in specific locations thereon. The cameras may be configured to capture imaging data (e.g., visual images) from fields of view that include the fixture, and any items thereon, and two or more of the cameras may have fields of view that overlap at least in part. Actors may perform one or more poses, gestures, movements or other interactions within the materials handling facility, and images captured by the cameras may be dynamically cropped based on positions of body parts of the actors and positions of portions of the product spaces, or in any other manner. For example, where positions of front points or other portions of product spaces that are depicted within images are known, and body parts (e.g., hands) or products are detected within such images, scores representative of overlaps of such body parts or products with the front points associated with each of such product spaces may be calculated. The scores may then be used to calculate a center point (or a cropping point) from which a cropped portion of an image may be defined, e.g., by a set of fixed dimensions with respect to the center point (or the cropping point). Once the cropped portions of a plurality of images are identified, the cropped portions may be provided to one or more models in accordance with implementations of the present disclosure, and features may be determined based on outputs received from such models.

The features may be spatial-temporal features that describe individual cropped images of the clips, or the clips as a whole, and may have any dimensions or any number of digits or values. Such digits or values may but need not be readily interpreted as representing any semantic attributes.

In some implementations, the cameras may capture images at a constant frame rate, such as fifteen frames per second, or any other frame rate, before cropping the captured images. The cropped images may also be processed to detect hands within such images, to determine positions of the hands in 3D space, or to identify any other body parts depicted within such images, and to locate or track such body parts, or the actors, across multiple images. In some implementations, the images may be further processed to predict a likelihood that each of the images depicts an actor executing an interaction with any of the product spaces.

In some implementations, cropped images may be masked, layered or stacked to include information or data regarding their respective contents, which may be incorporated into such images or data structures representing the cropped images. For example, where pixels of each of the images include channels representing colors depicted at such pixels, e.g., values corresponding to colors red, green or blue, the image may also be augmented or otherwise modified to include channels representing contents of such images, such as channels indicating whether the pixel depicts a portion of a hand or a portion of a product (or item), or any other contents. Such channels may be represented in a binary manner, e.g., that the pixel does or does not depict a portion of a hand, a product (or item) or such other contents, or in any other manner.

Clips of cropped images from which features are determined may be defined to include any number of the cropped images, e.g., eight, ten, fifteen, twenty, or more, or cropped images that were captured over any period of any duration, e.g., one second, one-and-one-half seconds, or any other duration.

In some implementations, features of each of the clips may have been generated by providing one or more cropped images of a clip as inputs to a module or machine learning tool, e.g., a slow-fast model, or a dual-mode convolutional neural network, to extract the set of features regarding the clip. Features of each of the clips may have any dimensions, and any number of digits or values in accordance with implementations of the present disclosure. Such digits or values may but need not be readily interpreted as representing any semantic attributes. Additionally, clips may be classified by providing one or more cropped images of the clips to a machine learning model, such as a multi-layer perceptron model, to classify the clip as depicting a specific event, e.g., a taking or picking event, a return or deposit event, no event, or multiple events.

At box 615, sequences of the features of the clips corresponding to events are defined based on the classifications of the clips. For example, the classifications of the clips may indicate whether each of the clips depicts an event, e.g., a taking or picking event, or a return or deposit event, or does not depict an event. Where consecutive clips are classified as depicting an event, features of such clips may be added to a sequence corresponding to the event, with a start time of the event being determined based on a time associated with a first one of the clips to be classified as depicting the event, and an end time of the event being determined based on a time associated with a last one of the clips to be classified as depicting the event, or on any other basis. The sequences may be generated by providing the features of the respective clips to a model or a portion thereof, such as a feature queue, which may generate a sequence of features for each candidate product space depicted within the clips from which features and classifications were generated. For example, where classifications for a predetermined number of clips of images indicate that such clips depict an event (or an action), features generated for such clips may be combined into a sequence of features, with a start time of the event being determined based on a first one of the clip features identified as depicting the event. An end to a sequence of features may be identified where one or more of the sets of features is classified as not depicting the event, or after a predetermined number of the features are added to the sequence (e.g., at a maximum length of the sequence). A sequence of features determined by a feature queue may thus represent a spatial-temporal representation of one potential event. An end time of the event may be determined based on a last one of the features identified as depicting the event, or a last one of the features in a sequence.

At box 620, the sequences generated at box 615 are provided as inputs to a model. In some implementations, the model may include a feature encoder (or a transformer encoder) having any number of layers, each having a standard architecture consisting of a multi-head self-attention module, and a feedforward network.

At box 625, feature maps are identified for each of the sequences by the models. In some implementations, the model may determine similarities with respect to each of the clip-level features within each of the sequences, which may have a common set of dimensions. The sets of features of a given sequence may be encoded or concatenated and flattened into a single dimension, resulting in a feature map having a size defined by a number of clips in the sequence and dimensions of each of the sets of features.

At box 630, action embeddings, region embeddings and hand embeddings are generated by the model based on the feature maps identified at box 625 and one or more queries. For example, the action embeddings, the region embeddings and the hand embeddings may be processed along with region queries (or product space queries, or lane queries) representing units of a fixture that may accommodate one or more items thereon depicted within such images, and hand queries representing hands depicted within such images. Based on the feature maps and any product space queries or hand queries, a set of product space-specific action features may be encoded into a set of labels by a feedforward network, including one label for each of the product spaces. Subsequently, embeddings representing likelihoods that a clip of images or a sequence of clips depicts an event (or an action) at a location (or a region) by a hand (or a trajectory of a hand) may be generated by the model based on the feature maps and any of such queries.

At box 635, predictions of events, e.g., one transformer embedding for each product space, that occurred at each of the product spaces during a period of time corresponding to one of the sequences generated from the clips of images are generated for each camera view based the embeddings generated at box 630. Such predictions may identify one of a taking event, a return event or no action or event that occurred at each of the product spaces, and include a likelihood, a probability or another qualitative or quantitative measure (e.g., a score) that the taking event, that the return event, or that no action or event, occurred at each of such product spaces.

Each of the predictions may be generated by sequence heads of the models, which may aggregate embeddings computed for each of the clips and determine a net change in inventory resulting from sequences of the clips. For example, the sequence heads may include components for predicting or identifying a given event or action, e.g., a taking event, a return event or no action or event, as well as actors, items and quantities of such items involved in the event or action.

In some implementations, portions of images of clips depicting hands may be identified and processed to determine whether such hands contain any items, or to identify items within such hands. In some implementations, the data may include a score or a set of scores, such as a confidence score or another metric, indicating a similarity of each of such portions to items associated with product spaces that are potentially associated with positions of the hands. Data regarding contents of hands of actors may be determined based on images captured by any camera including one or more of the actors within a field of view, and need not necessarily be determined based on images captured by a camera that captured images of one or more clips from which a sequence is generated. For example, one field of view of one camera may be more favorable for detecting body parts or movements of actors, and another field of view of another camera may be more favorable for detecting items depicted within hands of such actors, or identifying such items. Alternatively, or additionally, contents of hands of actors may be determined in any other manner.

At box 640, a multi-view fuser combines predictions generated by different cameras for each of the respective camera views. For example, a multi-view fuser (or fusing module) may aggregate transformer embeddings or scores generated by multiple cameras for a unique product space, and receive data regarding contents of hands (e.g., scores for items in the unique product space). In some implementations, the transformer embeddings or scores may be provided to one machine learning model (e.g., a multi-layer perceptron model) as an input, and the data regarding the contents of the hands may be provided to another machine learning model (e.g., another multi-layer perceptron model) as an input.

At box 645, shopping hypotheses are generated for one or more shopping events based on outputs received from the multi-view fuser, and the process ends. For example, one or more outputs received from the multi-view fuser may be processed, e.g., by another machine learning model, to generate a final prediction based on sequences of features received from all of the cameras and processed by the transformer encoder and transformer decoder. A net quantity change in inventory at the materials handling facility may be predicted based on the shopping hypotheses. In some implementations, a causal transformer decoder or another model may operate, e.g., in a forward continuous manner, and aggregate all events performed in association with a fixture through causal attention to predict the net quantity change. Alternatively, the net quantity change may be predicted in any other manner based on the shopping hypotheses.

Referring to FIGS. 7A through 7F, views of aspects of one system for detecting events in accordance with implementations of the present disclosure are shown. Except where otherwise noted, reference numerals preceded by the number "7" shown in FIGS. 7A through 7F indicate components or features that are similar to components or features having reference numerals preceded by the number "5" shown in FIG. 5, by the number "4" shown in FIGS. 4A through 4D, by the number "2" shown in FIG. 2A or 2B or by the number "1" shown in FIGS. 1A through 1K.

Figure 7A:
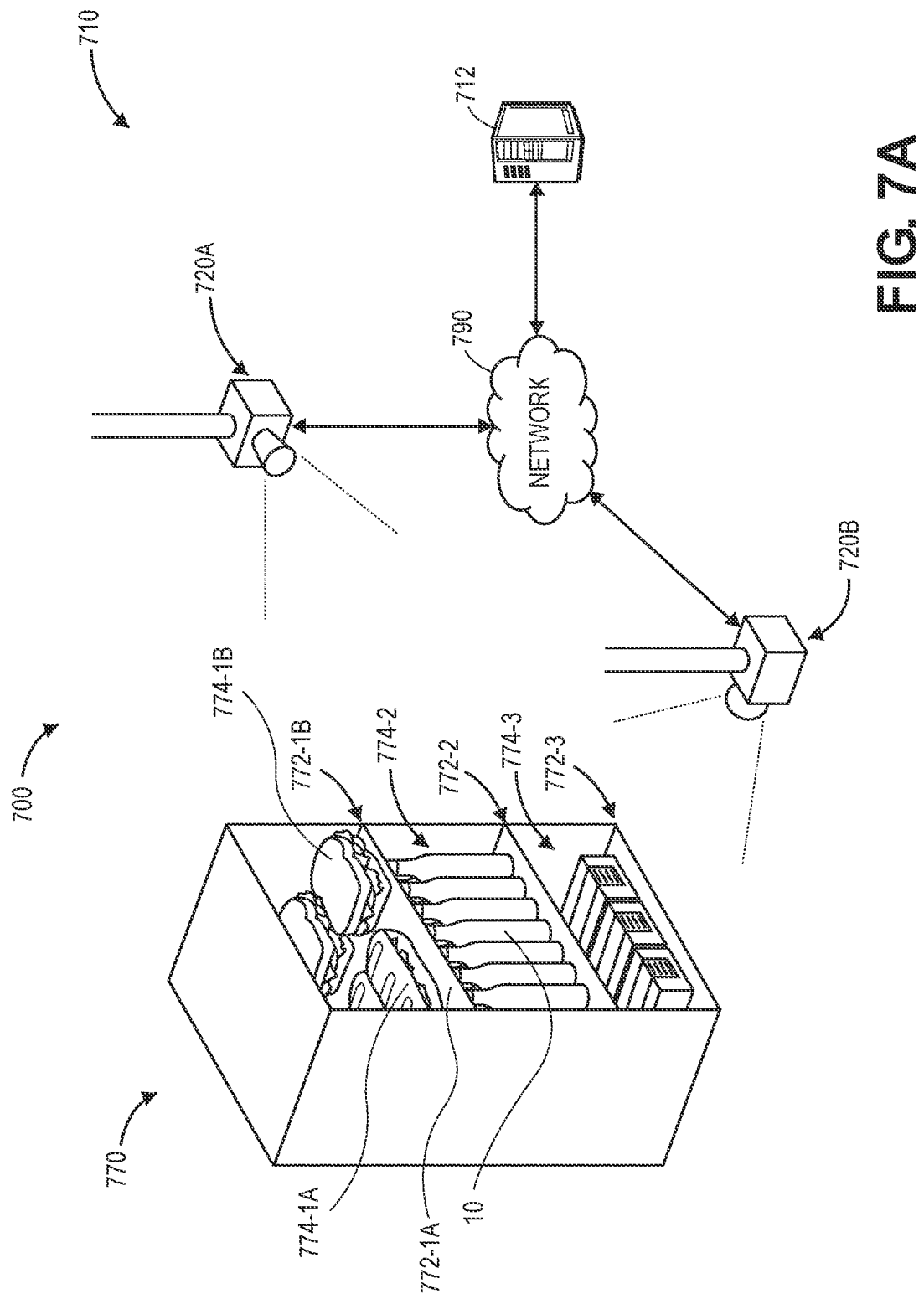
FIGS. 7A through 7F are views of aspects of one system for detecting events in accordance with implementations of the present disclosure.

As is shown in FIG. 7A, the system 700 includes a scene 710 such as a materials handling facility, a fulfillment center, a warehouse, or any other like facility. The scene 710 includes a system 712 (e.g., a server), a plurality of cameras 720A, 720B, and a fixture 770 (e.g., a rack or another set of inventory shelves). The scene 710 may be any open or enclosed environment or space in which any number of actors (e.g., customers, workers or other humans, animals or machines) may execute one or more poses, gestures, movements or other interactions within the fields of view of the cameras 720A, 720B. The fixture 770 includes a plurality of storage units (e.g., portions of or spaces on individual inventory shelves) 772-1A, 772-1B, 772-2, 772-3 of the fixture 770. As is further shown in FIG. 7A, the product spaces 772-1A, 772-1B are portions (e.g., lanes or other predefined sections) of a common platform, such as a shelf, of the fixture 770 while the product spaces 772-2, 772-3 are entireties of their respective platforms, such as shelves, of the fixture 770.

Each of the product spaces 772-1A, 772-1B, 772-2, 772-3 includes a set of items 774-1A, 774-1B, 774-2, 774-3 thereon. For example, each of the sets of items 774-1A, 774-1B includes prepared sandwiches or other prepared foods of a common type or form, while the set of items 774-2 includes bottled beverages, and the set of items 774-3 includes boxed meals or other prepared foods.

The cameras 720A, 720B may include any number of lenses, memory or storage components, photosensitive surfaces, filters, chips, electrodes, clocks, boards, timers, power sources, connectors or any other components. The cameras 720A, 720B may have fields of view that overlap at least in part, and are aligned in different locations and at a non-parallel angle or orientation with respect to one another. The cameras 720A, 720B may be calibrated, such that mappings between coordinates of imaging data captured by the cameras 720A, 720B and directions relative to their respective image sensors are known.

As is shown in FIG. 7A, the cameras 720A, 720B are in communication with the system 712 over the network 790, which may include the Internet in whole or in part. Alternatively, or additionally, either of the cameras 720A, 720B may be in communication with one another, or with any number of other external devices or systems, e.g., by one or more network connections (not shown).

Figure 7B:
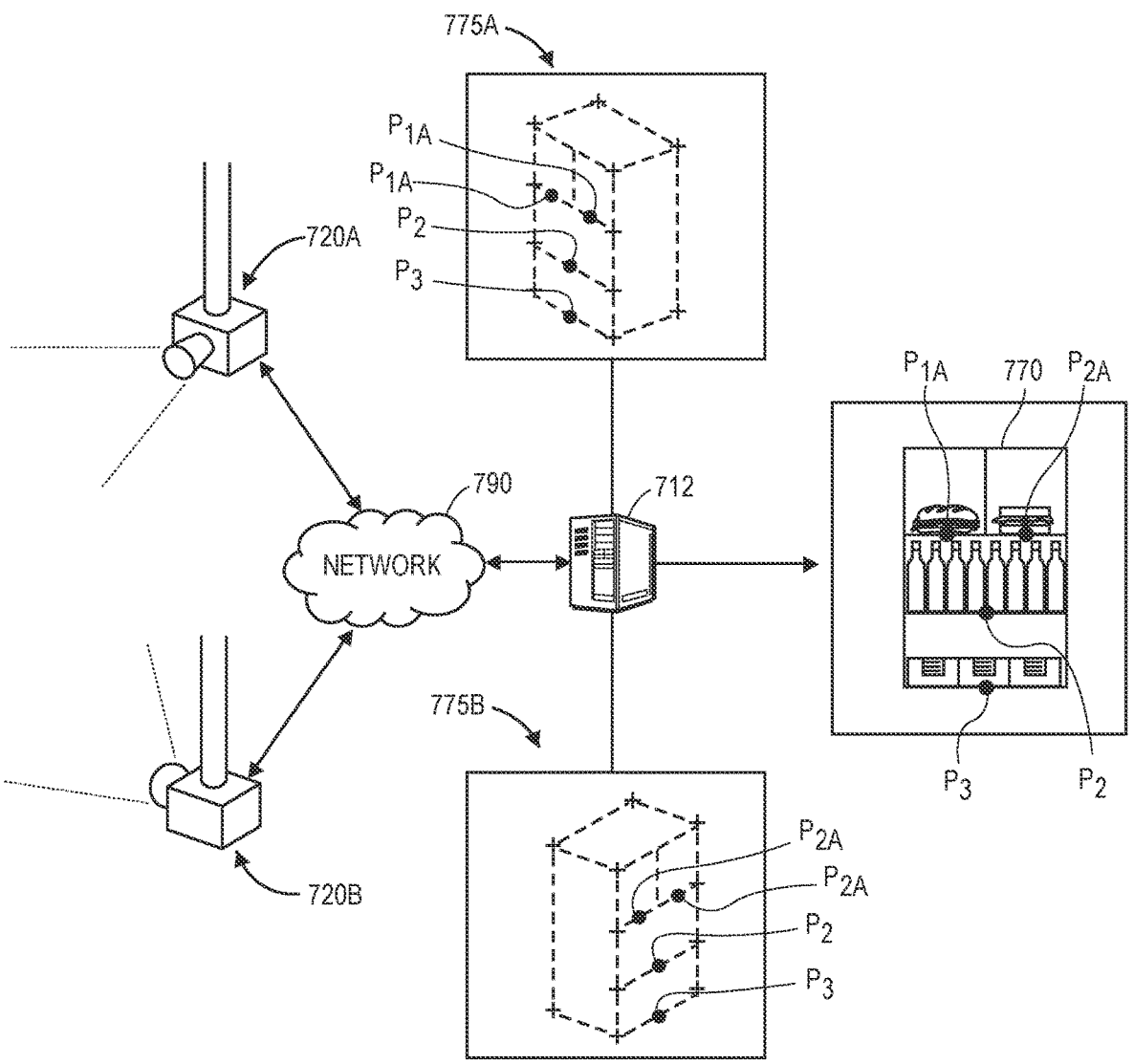

As is shown in FIG. 7B, the system 712 is programmed with position data 775 regarding aspects of the fixture 770 and the product spaces 772-1A, 772-1B, 772-2, 772-3. For example, the system 712 may be programmed with coordinates or other position data representing single points $P_{1A}$, $P_{1B}$, $P_2$, $P_3$ corresponding to front portions of the product spaces 772-1A, 772-1B, 772-2, 772-3 which may be defined as locations in two-dimensional space within image planes of the cameras 720A, 720B, or in 3D space and backprojected therein, where parameters of the cameras 720A, 720B are known. In some other implementations, the points may be located at centers of the respective product spaces 772-1A, 772-1B, 772-2, 772-3, or at or near bottoms of the respective product spaces 772-1A, 772-1B, 772-2, 772-3. Alternatively, the positions with which the cameras 720A, 720B are programmed may correspond to any other single point of either of the product spaces 772-1A, 772-1B, 772-2, 772-3, or multiple points of the product spaces 772-1A, 772-1B, 772-2, 772-3. Positions of the points may be represented in any manner, and with any level of granularity or specificity. For example, such positions may be represented in 3D space by a set of Cartesian coordinates, or coordinates according to any other system, e.g., a local coordinate system unique to the scene 710.

Figure 7C:
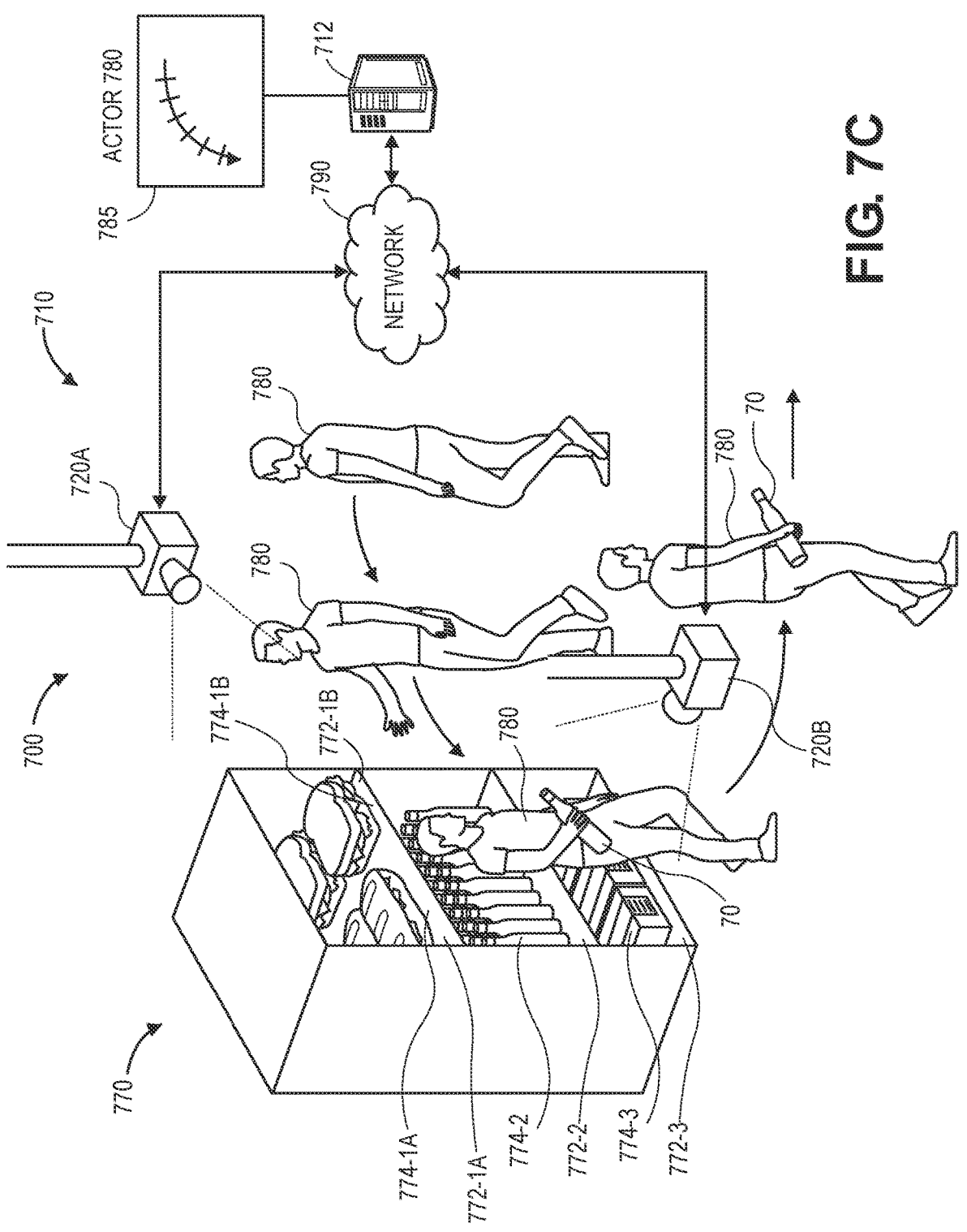

As is shown in FIG. 7C, an actor 780 (e.g., a customer, a worker or another human) executes one or more poses, gestures or other actions to retrieve an item 70 from the set of items 774-2 on the product space 772-2 of the fixture 770. Locating data (or tracking data) 785 regarding the actor 780 or any other actors on the scene 710 is received by the system 712. The locating data 785 may include, but need not be limited to, an identifier of the actor 780, or one or more visual descriptors of pixels depicting the actor 780, including but not limited to appearance features of the actor 780, e.g., sets of information or data identifying colors, textures, shapes or other aspects of features of the actor 780, as well as a record of the positions of an actor at various times beginning with an initial detection of the actor 780 and following with subsequent detections of the actor 780 by one or more sensors.

In some implementations, some or all of the locating data 785 may have been captured, determined or generated by either or both of the cameras 720A, 720B. In some other implementations, the locating data 785 may have been generated by the system 712, or by another computer system in communication with the system 712. For example, in some implementations, actors may be identified upon entering the scene 710, e.g., by scanning or interpreting a virtual credential or a physical credential, such as a sheet of paper, a mobile device having a display bearing a bar code (e.g., a one-dimensional or two-dimensional bar code, such as a QR bar code) or other symbol or marking that may be borne or presented by the actors at an entrance to the scene 710, or at another location associated with the scene 710. Alternatively, or additionally, actors may be identified upon entering the scene 710 by scanning or interpreting one or more body parts of such actors, such as hands of such actors, e.g., palms of such hands, which may be presented to one or more sensors by such actors at an entrance to the scene 710, or at another location associated with the scene 710.

Figure 7D:
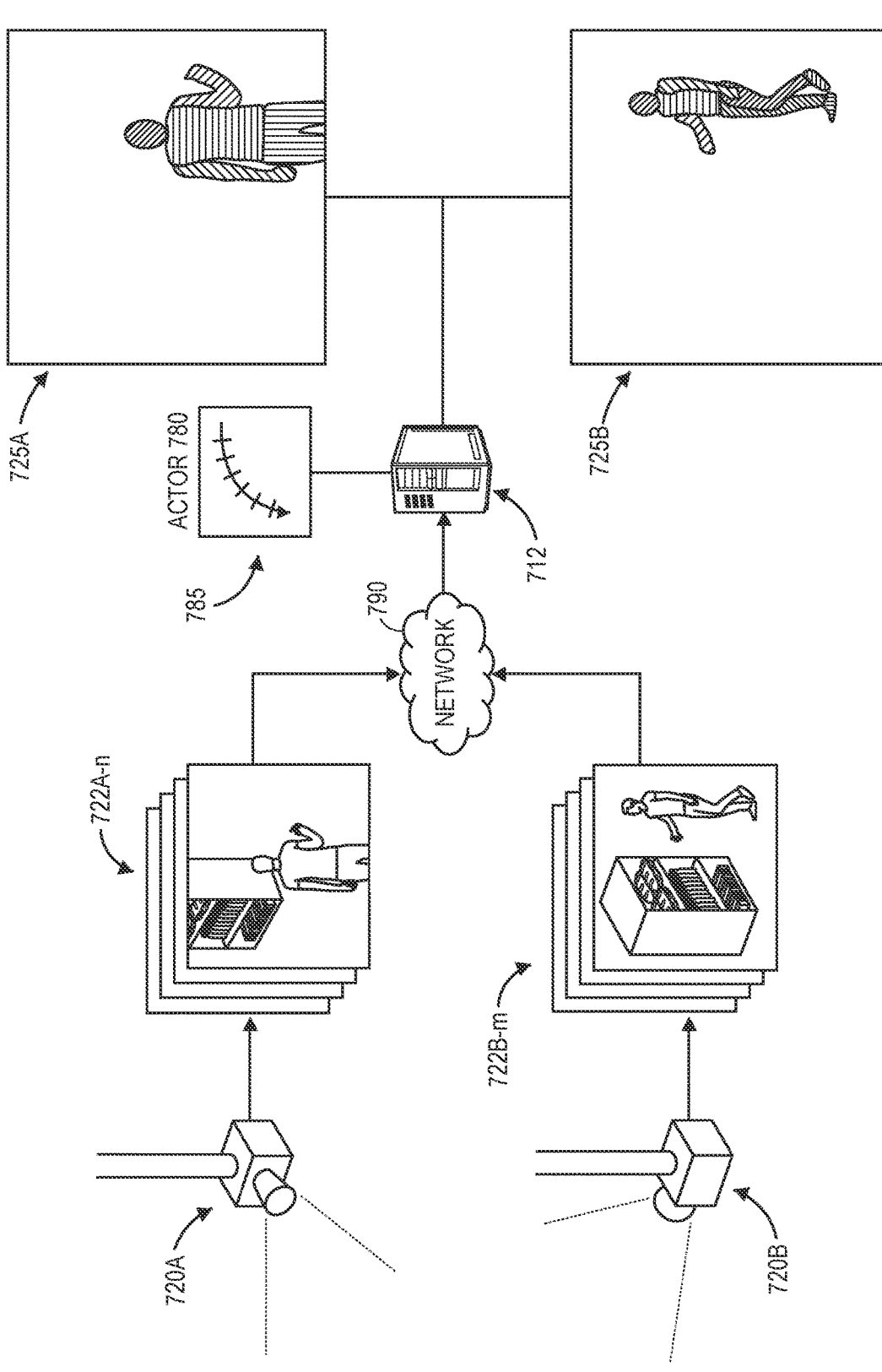

As is shown in FIG. 7D, a set of segmentation maps 725A, 725B (or segmentation records) identifying segments of images 722A-n captured by the camera 720A and images 722B-m captured by the camera 720B corresponding to body parts and their respective locations within the images 722A-n, 722B-m is generated. For example, the images 722A-n and the images 722B-m may be processed to determine whether any of such images depict any body parts such as heads, arms, hands, torsos or portions thereof. In some implementations, a body part detection module (e.g., an algorithm, system or technique) or a human parser module, which may be an artificial neural network, such as a convolutional neural network, or any other machine learning model, such as a segmentation network, that is trained to identify such body parts depicted within an image, may be executed on all of the images 722A-n and the images 722B-m, or on some of the images 722A-n and the images 722B-m. Once such segments have been identified, the segments may be filtered, smoothed and/or localized.

In some implementations, a body part detection module or a human parser module may be configured to detect portions of a body part, including but not limited to multiple portions of the same body part, e.g., an upper arm and a lower arm, or a thumb and a palm. Alternatively, body parts of the actor 780 may be detected within the images 722A-n and the images 722B-m in any other manner, such as based on local or maximum peak values within score maps generated for each of a plurality of body parts from outputs generated by one or more machine learning models operating thereon. In some implementations, the images 722A-n and the images 722B-m may be processed to determine positions of body parts depicted therein based on one or more monocular cues within the field of view of the cameras 720A, 720B or in any other manner.

Upon identifying attributes of portions or segments of the images 722A-n and the images 722B-m depicting body parts, e.g., by image segmentation, image filtering, image smoothing and/or image localization, attributes of such sets of pixels, or the sets of pixels themselves, may be stored in one or more data stores. In some implementations, two or more of the body parts detected within the images 722A-n and the images 722B-m may be associated with one another. For example, vectors of regression identifying pairs of body parts depicted within the images 722A-n and the images 722B-m that are associated with one another may be generated, and probabilities or likelihoods that the pairs of body parts belong to a common actor may be determined, e.g., based on any number of physiological parameters or constraints, as well as any metrics of compatibility or incompatibility.

The segmentation maps 725A, 725B may include or represent positions of body parts of the actor 780 detected within the images 722A-n and the images 722B-m. Alternatively, body parts of actors, viz., the actor 780, may be represented in any manner in accordance with implementations of the present disclosure. For example, body parts of the actor 780 may be represented in a skeleton or any other representation, e.g., a parametric representation, which may be expressed within a two-dimensional image plane, or in 3D space, or according to any other standard.

Detections of body parts within the images 722A-n and the images 722B-m or generations of the segmentation maps 725A, 725B may be performed by the system 712 or, alternatively, by the cameras 720A, 720B or any other computer system. For example, in some implementations, the system 712 may receive the images 722A-n and the images 722B-m from the cameras 720A, 720B and detect body parts of the actor 780 and generate a map of the body parts of the actor 780 from such detections. In some other implementations, the system 712 may receive locations of body parts of the actor 780 detected by the cameras 720A, 720B from images captured thereby, and generate the maps 725 or other representations of such body parts based on such detections.

Alternatively, each of the cameras 720A, 720B may independently capture images, detect body parts of the actor 780 depicted within such images and generate a map 725 or another representation of the body parts of the actor 780 from such detections, e.g., representing locations of the body parts within a two-dimensional image plane of the camera 720A, 720B, or positions of the body parts in 3D space.

Figure 7E:
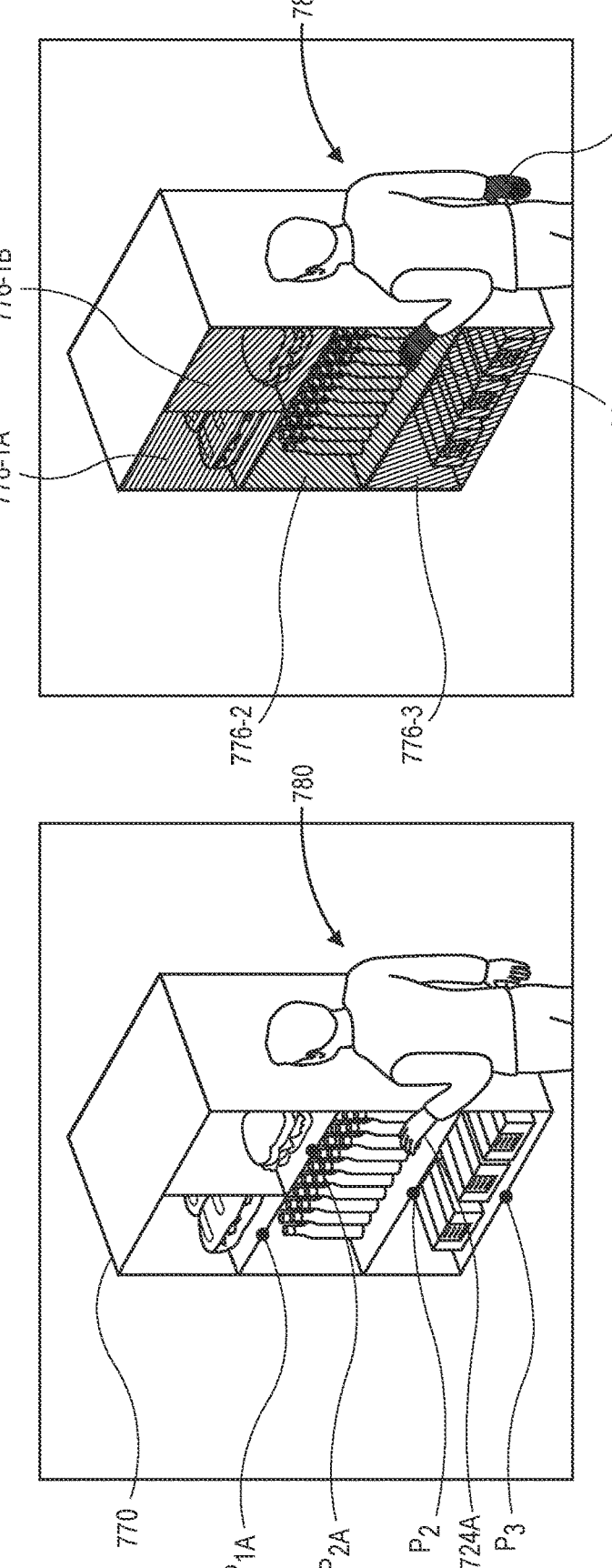

As is discussed above, scores for identifying center points of cropping may be calculated based on positions of hands with respect to product spaces. A center point for a cropping window may be calculated based on the scores and positions of front points of the product spaces. As is shown in FIG. 7E, positions of hands 724A, 724B of the actor 780 are determined with respect to the product spaces 772A-1, 772A-2, 772B, 772C. Scores representative of an extent of an overlap between masks 776-1A, 776-1B, 776-2, 776-3 corresponding to the product spaces 772A-1, 772A-2, 772B, 772C and masks 726A, 726B corresponding to the hands 724A, 724B are calculated for each image of a clip, for all images of the clip, or for multiple clips. The masks 726A, 726B corresponding to the hands 724A, 724B may be determined by a human parser module or a body part detection module, and the masks 776-1A, 776-1B, 776-2, 776-3 corresponding to the product spaces 772A-1, 772A-2, 772B, 772C may be determined from planogram data, detected within the images, or otherwise identified in any other manner.

The scores representing the overlaps between the hands 724A, 724B and the product spaces 772A-1, 772A-2, 772B, 772C may then be used to calculate a weighted average of the points $P_{1A}$, $P_{1B}$, $P_2$, $P_3$ from all of the product spaces 772A-1, 772A-2, 772B, 772C depicted within such images, and a center point (or a crop center) may be determined based on the weighted average. A cropping window having fixed dimensions may then be applied about the crop center.

Figure 7F:
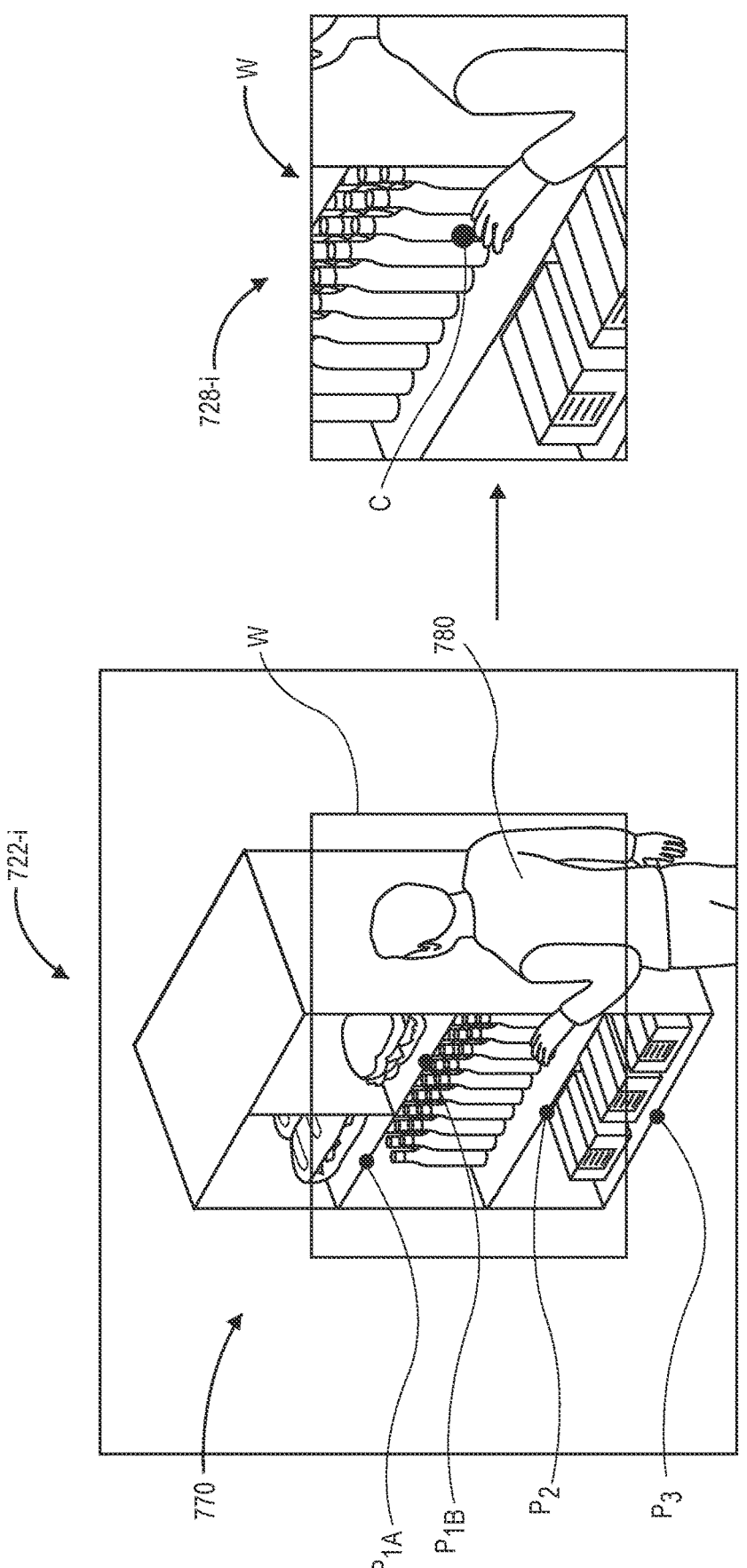

As is shown in FIG. 7F, a cropping window W is applied about a center point (or a crop center) c within a representative image 722-i, which may be one of the images 722A-n or the images 722B-m, and an image 728-i is isolated or cropped from the image 722-i using the cropping window W. A clip of cropped images, such as the image 728-i, may then be provided to a model trained to generate predictions of actions, items, hands (or actors) and quantities of the items from a sequence of features derived from clips of images, such as is described herein.

Referring to FIGS. 8A and 8B, a flow chart 800 of one process for detecting events in accordance with implementations of the present disclosure is shown. At box 810, a set of L product spaces within a field of view of a camera within a materials handling facility is identified. The camera may be mounted to include a fixture such as a physical structure for storing one or more items, or sets of items, thereon or therein, and may include any number of product spaces or other storage units. The product spaces may be provided in a discrete location of a materials handling facility, and the camera may be one of a plurality of cameras provided within the materials handling facility. Each of the cameras may be aligned to include all or portions of one or more product spaces or other storage units within their respective fields of view. In some implementations, two or more cameras may include fields of view that overlap at least in part.

At box 815, positions of points ci for each product space l of the L product spaces are determined. The positions may represent single points corresponding to portions of the product spaces, which may be defined as locations in two-dimensional space within image planes of the cameras, or in 3D space and backprojected therein, where parameters of each of the cameras are known. In some implementations, the points may be located on fronts of each of the product spaces, at centers of the respective product spaces, or at or near bottoms of the respective spaces. Alternatively, the positions may correspond to any other single point of a product space, or multiple points of the product space.

In some implementations, data representing positions of the points $c_l$ may be identified or represented in data for each product space l of the L product spaces in any manner, and with any level of granularity or specificity. For example, positions of the points c may be represented in 3D space by a set of Cartesian coordinates, or coordinates according to any other system, e.g., a local coordinate system unique to the materials handling facility.

At box 820, locating data regarding positions and identities of actors within the materials handling facility is identified. Actors that are present at the materials handling facility may be detected and identified in any manner, such as, for example, by a locating service or other system having one or more processors and one or more sensors for detecting the presence or absence of actors, and locating one or more poses, gestures or other actions executed by such actors. Processors or other components of the locating system may be provided at the materials handling facility, or in one or more alternate or virtual locations, e.g., in a "cloud"-based environment. Alternatively, the actors may be identified upon entering the materials handling facility, e.g., by bearing or presenting a virtual credential or a physical credential, such as a sheet of paper, a mobile device having a display bearing a bar code (e.g., a one-dimensional or two-dimensional bar code, such as a QR bar code) or other symbol or marking, or one or more body parts of the actor, and the actor may scan the object or otherwise enable the bar code, symbol or marking, or the one or more body parts, to be read or interpreted at an entrance to the materials handling facility, or at another location associated with the materials handling facility. A set of visual descriptors of pixels corresponding to an actor may be determined from images captured as the actor entered the materials handling facility, e.g., upon scanning or interpreting the bar code, symbol or marking.

The locating data (or tracking data) may be determined by or received from a tracking system or service operating within the materials handling facility, and may include approximate positions of any number of actors, as well as visual descriptors or other identifiers of such actors, or any other information or data regarding the actors. In some implementations, the tracking system or service may execute one or more tracking or matching algorithms, e.g., a tracking-by-detection algorithm, or a bipartite matching algorithm, that generates a tracklet-to-detection assignment or a visual descriptors-to-detection assignment over consecutively captured data (e.g., consecutive visual images) in any manner. For example, if a trajectory or visual descriptors of a set of pixels identified in one image frame are not matched to a detection of a body part (e.g., a head) within the image frame, the trajectory or visual descriptors may be extended into a successively captured frame. In some implementations, the locating data may relate to a detection of a body part in one image frame, and a set of visual descriptors of pixels corresponding to the actor in a subsequent image frame. Moreover, in some implementations, the locating data may further include or reference images of one or more portions of each of such actors (e.g., images of body parts such as heads), as well as approximate positions of such portions of the actors, which may have been captured by one or more imaging devices or other sensors provided within the materials handling facility or from any other source. The locating data may also identify approximate positions of each of the actors, which may be represented in 3D space by a set of Cartesian coordinates, or coordinates according to any other system.

At box 825, the camera within the facility captures visual images at a predetermined frame rate. In some implementations, the camera may be configured to capture visual images at fifteen frames (or images) per second. Alternatively, the camera may be configured to capture visual images at frame rates of five, ten, twenty, thirty, sixty or any other number of frames (or images) per second. Additionally, the camera may also be configured to capture visual images at any level of resolution or pixel density. For example, in some implementations, the camera may be configured to capture high resolution images, such as images having resolutions or pixel densities of at least 800 pixels per inch (or ppi), or any other number of pixels per inch.

Moreover, in some implementations, the camera may be configured to capture images of any size or dimensions, e.g., according to a VGA standard, or 640 pixels by 480 pixels.

In some implementations, the camera may be one of the sensors by which some or all of the locating data regarding the positions or identities of the actors within the materials handling facility identified at box 820 was captured. In some other implementations, however, the camera need not be one of the sensors by which any of the locating data was captured.

At box 830, positions of body parts of actors depicted within visual images captured at box 825 are determined. In some implementations, cameras may provide the visual images to one or more computer servers or other devices or systems that are configured to execute a human parser module or a body part detection module (e.g., an algorithm, system or technique), which may be an artificial neural network, such as a convolutional neural network, or any other machine learning model that is trained to identify body parts such as not only hands but also heads, arms, torsos or portions thereof within imaging data. In some implementations, the human parser module or the body part detection module may generate, as an output in response to each image received as an input, a segmentation record identifying such segments of that image depicting body parts and their respective locations within the image. In some implementations, the human parser module or the body part detection module may be configured to detect portions of a body part, including but not limited to multiple portions of the same body part, e.g., an upper arm and a lower arm, a thumb and a palm, or the like.

In some implementations, where a hand is one of the body parts detected within visual images captured at box 825, a bounding box or another portion of the visual image representing sets of pixels depicting the hand, or otherwise providing a point of reference for a location of the hand within a visual image, may be generated. Portions of the visual images depicting hands may include a predetermined number of image pixels, or a variable number of image pixels, and may be identified by a bounding box or in any other manner. Moreover, portions of the visual images depicting hands may be stored in association with times at which the respective visual images were captured, e.g., with the same time stamps as the respective visual images, or in any other manner. A location of a hand within a two-dimensional image plane or image may be determined with respect to such pixels. Alternatively, or additionally, a position of a hand within 3D space may be determined based on the location of the hand within images captured by one or more cameras, e.g., based on positions of the cameras, as well as any monocular cues or other attributes of the visual images or the hands depicted therein, or by triangulating detections of the hands within such visual images.

In some implementations, a set of segmentation maps (or segmentation records) identifying segments of images corresponding to body parts and their respective locations within the images is generated. Once such segments have been identified, the segments may be filtered, smoothed and/or localized. Upon identifying attributes of portions or segments of the images depicting body parts, e.g., by image segmentation, image filtering, image smoothing and/or image localization, attributes of such sets of pixels, or the sets of pixels themselves, may be stored in one or more data stores. In some implementations, two or more of the body parts detected within the images may be associated with one another. For example, vectors of regression identifying pairs of body parts depicted within the images that are associated with one another may be generated, and probabilities or likelihoods that the pairs of body parts belong to a common actor may be determined, e.g., based on any number of physiological parameters or constraints, as well as any metrics of compatibility or incompatibility. Alternatively, body parts of actors may be represented in any manner in accordance with implementations of the present disclosure. For example, body parts of an actor may be represented in a skeleton or any other representation, e.g., a parametric representation, which may be expressed within a two-dimensional image plane, or in 3D space, or according to any other standard.

At box 835, the visual images and the locating data are provided to an interaction detection module or another application or component that is configured to predict whether such visual images depict any number of interactions (or events). For example, in some implementations, the images may be provided to a machine learning system (e.g., a convolutional neural network, a deep learning neural network, or other system or technique) having one or more output layers for calculating regressions between pixels depicting body parts and pixels depicting locations such as product spaces, or lanes, within such images. In some implementations, a computer server or another computer device or system in communication with the camera may receive the visual images, generate regression vectors associating one or more of the body parts with locations of product spaces where an event may have occurred, and calculate confidence scores in such regression vectors. The regressions may take the form of a coordinate pair, e.g., an (x, y) pair identifying a pixel depicting a body part of an actor within an image plane of the image, and confidence scores may range between zero and one, or have any other value.

In some implementations, an interaction detection module may generate records of potential interactions with storage units or other locations of items by actors, including identifiers of the actors, start and end times of the interactions, trajectories of hands of the actors during the interactions, and potential locations of the events. The records of the interactions may identify the respective actors determined to have participated in or performed the interactions, and classify the interactions, e.g., as a picking or taking event (or a retrieval) by an actor, a return or deposit event (or a placement) by the actor, no events (e.g., neither pickings or takings nor returns or deposits, or any retrievals or placements) by the actor, or a multiple event (e.g., one or more pickings or takings and also one or more returns or deposits, or one or more retrievals and one or more placements) by the actor. A record of an interaction may also include a confidence score associated with a classification of the interaction, e.g., that an interaction is a picking or taking event, a return or deposit event, not an event, or a multiple event.

Records of interactions may be a time series or other set of data in a file (e.g., a spreadsheet) or record that includes values of data determined from images captured by the cameras, and times (e.g., time stamps) at which each of such images was captured. For example, a record of an interaction may be a matrix or an array, e.g., a sparse matrix or a sparse array, having at least two dimensions, including a dimension (e.g., a row or a column) corresponding to time stamps of each of the images, and a dimension (e.g., a column or a row) corresponding to variables for each of any number of features, such as body part locations, distances from locations of such body parts to locations of products, or other features, at each of the times of such time stamps.

In some embodiments, values of features at times may be included in cells of a time series defined by intersections of variables for those features and time stamps at those times. For example, where a feature includes a location of a body part depicted within images captured by a camera, e.g., within an image plane of the camera, data regarding the feature over a period of time may represent a single-view trajectory of the body part over the period of time. Where a feature is not detected at a given time (e.g., due to an obstruction or a departure of the body part from a field of view), a value of the feature in the cell defined by the intersection of the variable and the time stamp at that time is zero, or may be left blank or empty.

At box 840, whether the visual images depict an event is determined. For example, in some implementations, where the interaction detection module determines that a confidence score in a regression vector between a location of a body part of an actor depicted within one or more visual images and a location on a storage unit depicted within the visual images exceeds a predetermined threshold, the visual images may be deemed to potentially depict an event. Alternatively, the interaction detection module may determine whether a visual image depicts an event in any other manner.

If the interaction detection module determines that the visual images do not depict an event, then the process advances to box 890, where whether the continued monitoring of the facility for interactions by actors is desired is determined. If the continued monitoring of the facility for interactions is no longer desired, then the process ends. If the continued monitoring of the facility for interactions by actors is desired, however, then the process returns to box 820, where updated locating data regarding positions and identities of actors within the materials handling facility is identified and to box 825, where the camera continues to capture additional visual images.

If the interaction detection module determines that the visual images depict an event, then the process advances to box 845, where clips of images captured at times t over predetermined durations are defined. For example, clips may include consecutive images captured over a predetermined period of time such as one second, one-and-one-half seconds, two seconds, or any other duration.

At box 850, a sequence of the clips having a start time and an end time is identified. For example, the start time of the sequence of clips may be defined as a start time of a first clip of the sequence of clips, while the end time of the sequence of clips may be defined as an end time of a last clip of the sequence of clips.

At box 855, distances of the hands to the positions of the points ci of each product space l of the L product spaces are calculated. For example, where the positions of the points $c_l$ of each product space l of the L product spaces are identified within a two-dimensional image plane of the camera, distances between the points ci and hands of actors may be calculated with respect to locations of the hands within the two-dimensional image plane. Where the positions of the points ci of each product space l of the L product spaces are identified in 3D space, positions of the hands in 3D space may be determined, e.g., based on a position of the camera, as well as any monocular cues or other attributes of the visual images or the hands depicted therein, and compared to the positions of the points ci of the L product spaces. For example, positions of hands in 3D space may be determined based on absolute or relative sizes of body parts depicted within the visual images, or apparent elevations of body parts within the visual images, e.g., with respect to floors or traveling surfaces, as well as any colors or textures of the body parts (or gradients of such colors or textures), relative motion of the body parts, or any other attributes of the body parts or the visual images.

In some implementations, maps of hands or other body parts of actors may be generated, and positions of hands or other body parts may be determined by different processes, e.g., according to two or more discrete algorithms, systems or techniques. Alternatively, in some implementations, maps of hands or other body parts may be generated concurrently or together with the determination of the positions of such body parts in 3D space, e.g., by the same algorithms, systems or techniques.

At box 860, scores representative of proximity of hands are calculated for each product space l of the L product spaces and for each image of the set of clips captured at times t between the start time st and the end time et. Each of the images may be timestamped at the corresponding times t, and the scores may be calculated based on features such as overlaps of the hands with the positions of the L product spaces depicted within each of the images at the times t, or timing regarding positions of hands or items with respect to the start time st and the end time et. Where a distance between a point representing a hand or an item in 3D space exceeds a predetermined threshold, however, a score calculated for that product space may be downgraded or downweighed, or the product space may be excluded from consideration. At box 865, a sum of products of the scores and each of the positions is calculated. At box 870, a sum of the scores is calculated.

At box 875, a center point c of a cropping window for cropping images of the set of clips is calculated by dividing the sum of the products of the scores and each of the positions calculated at box 865 by the sum of the scores calculated at box 870. The scores may then be used to calculate a weighted average of the positions of the points from all of the product spaces depicted within such images, and a center point (or a crop center) may be determined based on the weighted average.

At box 880, images of the set of clips are cropped about the center point c of the cropping window. For example, a cropping window having fixed dimensions is applied about the center point c for each of the images of the clip, and portions of the images within the cropping windows are identified and isolated therefrom.

At box 885, the cropped images of the set of clips are processed to identify an actor involved in the interaction, as well as a type of the interaction, an item involved in the interaction, and a number of the items involved in the interaction. For example, the cropped images may be provided as inputs to a feature encoder having one or more encoders (e.g., an action encoder, a region encoder and an item encoder), and ultimately to a feature queue and a sequence head, and predictions as to the actor, the interaction, the item and the number of the items are determined.

At box 890, whether the continued monitoring of the facility for interactions by actors is desired. If the continued monitoring of the facility for interactions is no longer desired, then the process ends. If the continued monitoring of the facility for interactions by actors is desired, however, then the process returns to box 820, where updated locating data regarding positions and identities of actors within the materials handling facility is identified and to box 825, where the camera captures additional visual images at the predetermined rate.

Although some of the implementations disclosed herein reference the detection of events, or the association of events with one or more actors based on images captured using one or more cameras, the systems and methods of the present disclosure are not so limited. Furthermore, although some of the implementations disclosed herein reference detecting events in a commercial setting, e.g., within a materials handling facility such as a fulfillment center or a retail establishment, the systems and methods of the present disclosure are likewise not so limited. Rather, the systems and methods disclosed herein may be utilized to detect events of any type or kind. Additionally, although some of the implementations described herein or shown in the accompanying figures refer to the processing of visual imaging data that is in color, e.g., according to an RGB color model, the systems and methods disclosed herein are not so limited, and may be used to process any type of information or data that is provided in color according to any color model, or in black-and-white or grayscale.

Moreover, any of the systems or methods disclosed herein may be utilized as a primary technique or means, or as an exclusive technique or means, for detecting events, or associating the events with actors based on imaging data captured using one or more cameras or other imaging devices. Alternatively, any of the systems and methods disclosed herein may be utilized as a secondary technique or means, or as an alternate or backup technique or means, for detecting events, or associating the events with actors. For example, those of ordinary skill in the pertinent arts will recognize that any of the systems and methods disclosed herein may be utilized in connection with, or in support of, any other technique or means for detecting events, or associating events with actors. Furthermore, the terms "event" (or "events") and "action" (or "actions") are used synonymously herein.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIGS. 3A and 3B, 6 or 8A and 8B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

59

What is claimed is:

1. A system comprising:

a camera comprising at least one processor and at least one memory component, wherein the camera has a field of view including at least a portion of a fixture having a plurality of product spaces within the field of view; and a computer system in communication with at least the camera, wherein the computer system has positions of at least one point corresponding to each of the plurality of product spaces stored thereon, and wherein the computer system is programmed with one or more sets of instructions that, when executed by the computer system, cause the computer system to execute a method comprising:

receiving a plurality of images from the camera, wherein each of the plurality of images was captured over a period of time;

determining positions of at least one hand of an actor over at least a portion of the period of time;

identifying a first point of an image plane of the camera corresponding to a portion of a first product space;

identifying a second point of the image plane corresponding to a portion of a second product space;

calculating, for each of the plurality of images, a first score representative of an overlap between the positions of the at least one hand and the first point;

calculating, for each of the plurality of images, a second score representative of an overlap between the positions of the at least one hand and the second point;

selecting a crop center for a first clip of images based at least in part on the first scores calculated for the images of the first clip, the second scores calculated for the images of the first clip, the first point and the second point, wherein each of the images of the first clip is one of the plurality of images;

cropping each of the first clip of images by a crop window about the crop center;

providing the cropped first clip of images as inputs to a model, wherein the model comprises:

a feature encoder having a convolutional neural network backbone, an action encoder, a region encoder and a hand encoder;

a feature queue; and a sequence head comprising an action head, an item head, a hand head and a quantity head;

receiving outputs from the model in response to the inputs;

determining that the actor executed at least one of a taking event, a return event or an event that is neither the taking event nor the return event with an item associated with the product space based at least in part on the outputs received from the model in response to the inputs; and storing an indication that the actor executed the at least one of the taking event, the return event or the event that is neither the taking event nor the return event in association with the actor to an external system in communication with the camera over one or more networks.

2. The system of claim 1, wherein each of the first clip of images comprises a plurality of pixels, and wherein the method further comprises:

prior to providing the cropped first clip of images as inputs to the model,

stacking each of the cropped first clip of images with channels representing hands and items, wherein each of the plurality of pixels is represented by:

a plurality of color channels representing a color of one of the plurality of pixels;

a channel indicating whether the one of the plurality of pixels depicts a portion of a hand; and a channel indicating whether the one of the plurality of pixels depicts an item within the portion of the hand.

3. The system of claim 1, wherein an area of each of the plurality of images is approximately twelve times greater than an area of the crop window.

4. A method comprising:

capturing at least a first plurality of images by a first camera having a first field of view, wherein at least a portion of a fixture comprising a first product space and a second product space is within the first field of view;

determining positions of at least one hand of a first actor over at least a first period of time;

selecting a first center point for cropping at least some of the first plurality of images captured over the first period of time, wherein the first center point is selected based at least in part on a first position corresponding to the first product space, a second position corresponding to the second product space and the positions of the at least one hand of the first actor over the first period of time;

generating a first clip of images, wherein each of the images of the first clip is one of the first plurality of images captured over the first period of time cropped by a window about the first center point;

generating a first hypothesis based at least in part on the first clip of images, wherein the first hypothesis identifies:

a first event, wherein the first event is one of a taking event, a return event or neither a taking event nor a return event;

the first actor; and a first item associated with one of the first product space or the second product space; and associating at least a first quantity of the first item with the first actor based at least in part on the first hypothesis.

5. The method of claim 4, wherein generating the first hypothesis comprises:

generating a first set of features from the first clip of images, wherein each of the first set of features is one of an action feature, a region feature or a hand feature;

determining a first classification of an event type depicted in the first clip of images; and generating the first hypothesis based at least in part on the first set of features and the first classification.

6. The method of claim 5, further comprising:

determining positions of the at least one hand of the first actor over at least a second period of time;

generating a second clip of images, wherein each of the images of the second clip is one of the first plurality of images captured over the second period of time cropped by the window about the first center point;

generating a second set of features from the second clip of images, wherein each of the second set of features is one of an action feature, a region feature or a hand feature;

determining a second classification of an event type depicted in the second clip of images;

determining that the first classification is consistent with the second classification; and in response to determining that the first classification is consistent with the second classification, generating a sequence of features comprising the first set of features and the second set of features, wherein the first hypothesis is generated based at least in part on the sequence of features, the first classification and the second classification.

7. The method of claim 6, wherein determining the first classification of at least the first clip of images comprises:

determining a first plurality of scores based at least in part on the first clip of images, wherein each of the first plurality of scores represents one of a probability that the first clip of images depicts a taking event, a probability that the first clip of images depicts a return event, or a probability that the first clip of images does not depict a taking event or a return event; and determining the first classification based at least in part on a greatest one of the first plurality of scores, wherein determining the second classification of at least the second clip of images comprises:

determining a second plurality of scores based at least in part on the second clip of images, wherein each of the second plurality of scores represents one of a probability that the second clip of images depicts a taking event, a probability that the second clip of images depicts a return event, or a probability that the second clip of images does not depict a taking event or a return event; and determining the second classification based at least in part on a greatest one of the second plurality of scores, and wherein generating the sequence of features comprises:

concatenating at least the first set of features and the second set of features, wherein the first hypothesis is generated based at least in part on the concatenated first set of features and second set of features.

8. The method of claim 5, wherein generating the first set of features from the first clip of images comprises:

providing each of the images of the first clip as inputs to an encoder comprising a convolutional neural network backbone; and receiving outputs from the encoder in response to the inputs, wherein each of the outputs is a feature map corresponding to one of the images of the first clip, and wherein each of the first set of features is generated based at least in part on one of the feature maps.

9. The method of claim 8, wherein the encoder further comprises a hand attention module, and wherein one of the first set of features is an action feature generated based at least in part on the feature maps corresponding to the images of the first clip and the positions of the at least one hand of the first actor over the first period of time.

10. The method of claim 8, further comprising:

identifying portions of the first plurality of images depicting at least the first product space and the second product space, wherein one of the first set of features is a region feature generated based at least in part on the feature maps corresponding to the images of the first clip and the portions of the first plurality of images depicting at least the first product space and the second product space, and wherein the region feature represents an action performed at one of the first product space or the second product space.

11. The method of claim 8, further comprising:

generating a trajectory of the at least one hand based at least in part on the positions of the at least one hand over the first period of time, wherein one of the first set of features is a hand feature generated based at least in part on the feature maps corresponding to the images of the first clip and the trajectory of the at least one hand.

12. The method of claim 4, wherein selecting the first center point comprises:

calculating first scores for each of the first plurality of images captured over the first period of time based at least in part on the positions of the at least one hand of the first actor over the first period of time, wherein each of the first scores is representative of an overlap of the at least one hand and the first product space;

calculating second scores for each of the first plurality of images captured over the first period of time based at least in part on the positions of the at least one hand of the first actor over the first period of time, wherein each of the second scores is representative of an overlap of the at least one hand and the second product space; and determining the first center point based at least in part on the first scores, the second scores, the first position and the second position.

13. The method of claim 4, wherein each of the first plurality of images is six hundred forty pixels by four hundred eighty pixels, and wherein the window is one hundred sixty pixels by one hundred sixty pixels.

14. The method of claim 4, wherein each of the first clip of images comprises a plurality of pixels, and wherein the method further comprises:

stacking each of the first clip of images with channels representing hands and items, wherein each of the plurality of pixels is represented by:

a plurality of color channels representing a color of one of the plurality of pixels;

a channel indicating whether the one of the plurality of pixels depicts a portion of a hand; and a channel indicating whether the one of the plurality of pixels depicts an item within the portion of the hand.

15. The method of claim 5, wherein generating the first set of features comprises:

providing each of the first clip of images as inputs to a model comprising:

a feature encoder having a convolutional neural network backbone, an action encoder, a region encoder and a hand encoder;

a feature queue configured to define a sequence of clips based at least in part on features received from the feature encoder; and a sequence head comprising an action head, an item head, an actor head and a quantity head, wherein the sequence head is configured to generate a hypothesis based on a sequence of clips defined by the feature queue.

16. The method of claim 4, further comprising:

determining positions of at least one hand of a second actor over a second period of time;

selecting a second center point for cropping at least some of the first plurality of images captured over the second period of time, wherein the second center point is selected based at least in part on the first position, the second position and the positions of the at least one hand of the second actor over the second period of time;

generating a second clip of images, wherein each of the images of the second clip is one of the first plurality of images captured over the second period of time cropped by a window about the second center point;

generating a second hypothesis based at least in part on the second clip of images, wherein the second hypothesis identifies:

a second event, wherein the second event is one of a taking event, a return event or neither a taking event nor a return event;

the second actor; and a second item associated with one of the first product space or the second product space; and associating at least a second quantity of the second item with the second actor based at least in part on the second hypothesis.

17. The method of claim 4, further comprising:

capturing at least a second plurality of images by a second camera having a second field of view, wherein at least a portion of the fixture is within the second field of view;

determining positions of the at least one hand of the first actor over at least a second period of time;

selecting a second center point for cropping at least some of the second plurality of images captured over the second period of time, wherein the second center point is selected based at least in part on the first position, the second position and the positions of the at least one hand of the first actor over the second period of time;

generating a second clip of images, wherein each of the images of the second clip is one of the second plurality of images captured over the second period of time cropped by a window about the second center point; and generating a second hypothesis based at least in part on the second clip of images, wherein the second hypothesis identifies:

the first event or a second event, wherein the second event is one of a taking event, a return event or neither a taking event nor a return event;

the first actor; and the first item or a second item associated with one of the first product space or the second product space, wherein the first quantity is associated with the first actor based at least in part on the first hypothesis and the second hypothesis.

18. The method of claim 17, further comprising:

determining, by a computer system, that the first actor executed one of the first event or the second based at least in part on the first hypothesis and the second hypothesis.

19. The method of claim 4, further comprising:

determining positions of the at least one hand of the first actor over a second period of time;

selecting a second center point for cropping at least some of the first plurality of images captured over the second period of time, wherein the second center point is selected based at least in part on the first position, the second position and the positions of the at least one hand of the first actor over the second period of time; and generating a second clip of images, wherein each of the images of the second clip is one of the first plurality of images captured over the second period of time cropped by a window about the second center point;

wherein the first hypothesis is generated based at least in part on the first clip of images and the second clip of images.

20. A computer system comprising at least one processor and at least one data store, wherein the computer system is in communication with a plurality of cameras, and wherein the computer system is programmed with one or more sets of instructions that, when executed by the at least one processor, cause the computer system to execute a method comprising:

generating a first sequence of features based at least in part on a first set of images, wherein each of the images of the first set is cropped from a second set of images about a cropping window defined from a crop center, wherein each of the images of the second set is captured by a first camera of the plurality of cameras, wherein each of the images of the first set is a multi-channel image including, for each pixel of such images, a plurality of channels corresponding to color values, a channel corresponding to a mask for a hand, and a channel corresponding to a mask for a product, and wherein each of the first set of images has been classified as depicting at least one event at one product space by a first model configured to generate a feature map based at least in part on a sequence of features derived from sets of images and a hypothesis of a type of an event and a location of the event based at least in part on a feature map and a first plurality of positional embeddings, and wherein each of the first plurality of positional embeddings corresponds to one of a plurality of product spaces;

generating a second sequence of features based at least in part on a third set of images, wherein each of the images of the third set is cropped from a fourth set of images about a cropping window defined from a crop center, wherein each of the images of the fourth set is captured by a second camera, wherein each of the images of the third set is a multi-channel image including, for each pixel of such images, a plurality of channels corresponding to color values, a channel corresponding to a mask for a hand, and a channel corresponding to a mask for a product, and wherein each of the third set of images has been classified as depicting at least one event at one product space by a second model configured to generate a feature map based at least in part on a sequence of features derived from sets of images and a hypothesis of a type of an event and a location of the event based at least in part on a feature map and a second plurality of positional embeddings, wherein each of the second plurality of positional embeddings corresponds to one of a plurality of product spaces;

determining that an actor executed at least one of a taking event, a return event or an event that is neither the taking event nor the return event with an item associated with a product space based at least in part on the first sequence of features and the second sequence of features; and storing information regarding the at least one of the taking event, the return event or the event that is neither the taking event nor the return event in association with the actor in the at least one data store.

\* \* \* \* \*